United States Patent
Tan et al.

(10) Patent No.: US 12,506,177 B2
(45) Date of Patent: *Dec. 23, 2025

(54) ELECTROLYTES, ELECTRODES MATERIALS, AND MANUFACTURING THEREOF

(71) Applicant: UNIGRID, Inc., San Diego, CA (US)

(72) Inventors: Darren Huan Shen Tan, San Diego, CA (US); Erik Austin Wu, San Diego, CA (US); Bingyu Lu, San Diego, CA (US)

(73) Assignee: UNIGRID, Inc., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/648,247

(22) Filed: Apr. 26, 2024

(65) Prior Publication Data

US 2025/0046875 A1    Feb. 6, 2025

Related U.S. Application Data

(63) Continuation of application No. 18/230,590, filed on Aug. 4, 2023, now Pat. No. 12,002,927.

(51) Int. Cl.
| | | |
|---|---|---|
| *H01M 10/0569* | (2010.01) |
| *H01M 4/02* | (2006.01) |
| *H01M 4/133* | (2010.01) |
| *H01M 4/134* | (2010.01) |
| *H01M 4/38* | (2006.01) |
| *H01M 4/587* | (2010.01) |
| *H01M 10/054* | (2010.01) |
| *H01M 10/0568* | (2010.01) |
| *H01M 10/42* | (2006.01) |

(52) U.S. Cl.
CPC ....... *H01M 10/0569* (2013.01); *H01M 4/133* (2013.01); *H01M 4/134* (2013.01); *H01M 4/387* (2013.01); *H01M 4/587* (2013.01); *H01M 10/054* (2013.01); *H01M 10/0568* (2013.01); *H01M 2004/021* (2013.01); *H01M 2004/027* (2013.01); *H01M 2010/4292* (2013.01); *H01M 2300/0028* (2013.01)

(58) Field of Classification Search
CPC .................................................. Y02E 60/10
See application file for complete search history.

(56) References Cited

U.S. PATENT DOCUMENTS

| | | | |
|---|---|---|---|
| 6,287,720 B1 | 9/2001 | Yamashita et al. |
| 12,002,927 B1 | 6/2024 | Tan et al. |
| 2010/0035157 A1 | 2/2010 | Nakamura et al. |
| 2015/0303517 A1 | 10/2015 | Kageura et al. |
| 2018/0069234 A1 | 3/2018 | Friend et al. |
| 2019/0233388 A1 | 8/2019 | Amine et al. |
| 2024/0405210 A1* | 12/2024 | Tan ..................... H01M 10/054 |

FOREIGN PATENT DOCUMENTS

| | | |
|---|---|---|
| CN | 109671936 A | 4/2019 |
| CN | 112310381 A | 6/2021 |
| DE | 69836514 T2 | 9/2007 |
| EP | 0317351 A2 | 5/1989 |
| JP | 2014192093 A | 10/2014 |
| JP | 2014199803 A | 10/2014 |
| JP | 6459795 B2 | 1/2019 |
| KR | 1020040058082 A | 7/2004 |
| KR | 20180068117 A | 6/2018 |
| WO | 2020125562 A1 | 6/2020 |

OTHER PUBLICATIONS

Diethyl ether, available online at https://en.wikipedia.org/wiki/Diethyl_ether, date unknown.*
Dibutyl ether, available online at https://en.wikipedia.org/wiki/Dibutyl_ether, date unknown.*
Benzyl ether, available online at https://www.sigmaaldrich.com/US/en/product/aldrich/108014?msockid=1237b70f69cc6049101aa2d368db616f, date unknown.*
ISR and Written Opinion for PCT/US2024/032127 dated Aug. 22, 2024, 13 pages.
Deysher et al., Evaluating Electrolyte—Anode Interface Stability in Sodium All-Solid-State Batteries, Applied Materials & Interfaces, vol. 14, Oct. 14, 2022. pp. 47706-47715.
ISR and Written Opinion for PCT/US2024/041006, dated Oct. 28, 2024, 8 pages.
Zhang, et al. - Microslzed Sn as Advanced Pnodes In Gly me-Based Electrolyte for Na-ton Batteries. Advanced Materia Is. 2016: < entire document. In particular pp. 4, 7. 10, Figures S13-S14>; < DOI: 10.1002/adma .. 201603212>.
Westman, et al. Diglyme based electrolytes for sodium-Ion batteries. ACS Applied Energy Materials vol. 1(6). 2018; pp. 9,31; p. S-3, figure S-4; DOI:10.1021/acsaem.8B00360.
Microparticles, availble online at https://en.wikipedia.org/wiki/Microparticle#:-:text=Microparticles%20are%20particles%20between %200.1, %2C%20flour%2C%20and%20powdered%20sugar., date unknown.
Machine translation of CN 109371936, published on Apr. 23, 2019 (Year: 2019).

* cited by examiner

*Primary Examiner* — Anca Eoff
(74) *Attorney, Agent, or Firm* — PROCOPIO, CORY, HARGREAVES & SAVITCH LLP

(57) ABSTRACT

The present disclosure is related to an electrolyte for a sodium secondary battery, wherein the electrolyte comprises a compound having a chemical structure including an oxygen molecule covalently bound to R1 and R2 groups (R1-O—R2), wherein each of R1 and R2 is an alkyl group or an aryl group.

20 Claims, 17 Drawing Sheets

ELECTROLYTES, ELECTRODES MATERIALS, AND MANUFACTURING THEREOF

RELATED APPLICATIONS

This application is a continuation application of U.S. application Ser. No. 18/230,590, filed Aug. 4, 2023, which was issued into U.S. Pat. No. 12,002,927 on Jun. 4, 2024.

FIELD OF THE INVENTION

The field relates to electrolytes and electrolyte material, cells and batteries comprising the same, and the manufacturing thereof.

BACKGROUND OF THE INVENTION

Batteries comprise one or more electrochemical cell, such cells generally comprising a cathode, an anode and an electrolyte. Sodium ion secondary batteries may use a sodium transition metal oxide, transition metal phosphate, or ferrocyanide positive electrode active material and a metal alloy-based (e.g. tin or Sn) or hard carbon-based negative electrode active material, or a mixture or combination thereof, and may use different types of electrolytes such as an electrolyte in sold or liquid form and an organic or inorganic electrolyte, to ensure sodium ionic conductivity between the positive electrode and the negative electrode.

SUMMARY OF THE INVENTION

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

The present disclosure is related to a sodium secondary battery comprising a negative electrode, a positive electrode and an electrolyte including a compound having a chemical structure including an oxygen molecule covalently bound to R1 and R2 groups (R1-O—R2), wherein each of R1 and R2 is an alkyl group or an aryl group, wherein the negative electrode includes a plurality of tin (Sn) particles, wherein the plurality of Sn particles has an average particle size equal to or larger than about 1.3 μm.

In some embodiments, the negative electrode includes a negative electrode material layer, and
a negative electrode active material layer, wherein the negative electrode material layer and the negative electrode active material layer include the plurality of Sn particles, wherein the plurality of Sn particles has an average particle size of from about 1.5 μm to about 200 μm.

In some embodiments, the plurality of Sn particles has an average particle diameter of from about 2 μm to about 150 μm. In some embodiments, the plurality of Sn particles has an average particle diameter of from about 2 μm to about 120 μm. In some embodiments, the plurality of Sn particles has an average particle diameter of from about 2 μm to about 100 μm. In some embodiments, the plurality of Sn particles has an average particle diameter of from about 2 μm to about 90 μm. In some embodiments, the plurality of Sn particles has an average particle diameter of from about 2 μm to about 80 μm. In some embodiments, the plurality of Sn particles has an average particle diameter of from about 2 μm to about 75 μm. In some embodiments, the plurality of Sn particles has an average particle diameter of from about 2 μm to about 70 μm.

In some embodiments, the plurality of Sn particles has an average particle diameter of from about 3 μm to about 200 μm. In some embodiments, the plurality of Sn particles has an average particle diameter of from about 3 μm to about 150 μm. In some embodiments, the plurality of Sn particles has an average particle diameter of from about 3 μm to about 120 μm. In some embodiments, the plurality of Sn particles has an average particle diameter of from about 3 μm to about 100 μm. In some embodiments, the plurality of Sn particles has an average particle diameter of from about 3 μm to about 90 μm. In some embodiments, the plurality of Sn particles has an average particle diameter of from about 3 μm to about 80 μm. In some embodiments, the plurality of Sn particles has an average particle diameter of from about 3 μm to about 75 μm. In some embodiments, the plurality of Sn particles has an average particle diameter of from about 3 μm to about 70 μm.

In some embodiments, the plurality of Sn particles has an average particle diameter of from about 5 μm to about 70 μm. In some embodiments, the plurality of Sn particles has an average particle diameter of from about 5 μm to about 70 μm. In some embodiments, the plurality of Sn particles has an average particle diameter of from about 5 μm to about 65 μm. In some embodiments, the plurality of Sn particles has an average particle diameter of from about 5 μm to about 60 μm. In some embodiments, the plurality of Sn particles has an average particle diameter of from about 5 μm to about 55 μm. In some embodiments, the plurality of Sn particles has an average particle diameter of from about 5 μm to about 50 μm. In some embodiments, the plurality of Sn particles has an average particle diameter of from about 2 μm to about 20 μm. In some embodiments, the plurality of Sn particles has an average particle diameter of from about 2 μm to about 15 μm. In some embodiments, the plurality of Sn particles has an average particle diameter of from about 3 μm to about 10 μm. In some embodiments, the plurality of Sn particles has an average particle diameter of from about 4 μm to about 6 μm.

In some embodiments, the plurality of Sn particles has an average particle diameter of from about 20 μm to about 200 μm. In some embodiments, the plurality of Sn particles has an average particle diameter of from about 20 μm to about 150 μm. In some embodiments, the plurality of Sn particles has an average particle diameter of from about 25 μm to about 105 μm. In some embodiments, the plurality of Sn particles has an average particle diameter of from about 30 μm to about 90 μm. In some embodiments, the plurality of Sn particles has an average particle diameter of from about 35 μm to about 75 μm. In some embodiments, the plurality of Sn particles has an average particle diameter of from about 40 μm to about 60 μm. In some embodiments, the plurality of Sn particles has an average particle diameter of from about 45 μm to about 55 μm. In some embodiments, the negative electrode active material layer further comprises at least one other active material including hard carbon.

In some embodiments, the negative electrode comprises a current collector, and the negative electrode active material layer is formed on at least one surface of the current collector. In some embodiments, the negative electrode active material layer may include the tin (Sn) in an amount of 1 wt % or more, based on 100 wt % of the negative electrode active material layer. In some embodiments, the tin (Sn) containing negative electrode active material layer further comprises a binder resin, a conductive material or a solid electrolyte. In some embodiments, the electrolyte is a liquid electrolyte.

In some embodiments, the R1 and R2 groups together form a ring. In some embodiments, the electrolyte comprises at least one selected from the following solvents, Dimethoxyethane (glyme), Diethylene glycol dimethyl ether (diglyme), Triethylene glycol dimethyl ether (triglyme), Ethylene glycol Ethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane.

In some embodiments, the electrolyte comprises at least one solvent free of any C=O carbon double bonded to oxygen, sulfur, benzene ring, phosphates, double or triple bonded carbon C=C/C≡C, or halogen containing functional groups.

In some embodiments, the electrolyte comprises $NaPF_6$, $NaBF_4$, $NaClO_4$, $NaCF_3SO_3$, sodium closo-borate salts (e.g. $NaCB_9H_{10}$, $NaCB_{11}H_{12}$, $Na_2B_{12}H_{12}$, $Na_2B_{10}H_{10}$, $Na[7\text{-}CB_{10}H_{13}]$, $Na[7,8\text{-}C_2B_9H_{12}]$, $Na[7,9\text{-}C_2B_9H_{12}]$), Sodium bis-(fluorosulfonyl)imide (NaFSI), Sodium trifluoro-methane-sulfonimide (NaTFSI), Sodium Bis(oxalato)borate (NaBOB), Sodium-difluoro(oxalato)borate (NaDFOB), or a combination thereof.

In some embodiments, the total dissolved salt concentration in the electrolyte with respect to the total amount of solvents used in the electrolyte is from about 0.01 M to about 10.0 M. In some embodiments, the total dissolved salt concentration in the electrolyte with respect to the total amount of solvents used in the electrolyte is from about 0.03 M to about 9.0 M. In some embodiments, the total dissolved salt concentration in the electrolyte with respect to the total amount of solvents used in the electrolyte is from about 0.05 M to about 8.0 M. In some embodiments, the total dissolved salt concentration in the electrolyte with respect to the total amount of solvents used in the electrolyte is from about 0.1 M to about 7.0 M. In some embodiments, the total dissolved salt concentration in the electrolyte with respect to the total amount of solvents used in the electrolyte is from about 0.2 M to about 5.0 M. In some embodiments, the total dissolved salt concentration in the electrolyte with respect to the total amount of solvents used in the electrolyte is from about 0.3 M to about 4.0 M. In some embodiments, the total dissolved salt concentration in the electrolyte with respect to the total amount of solvents used in the electrolyte is from about 0.4 M to about 3.0 M. In some embodiments, the total dissolved salt concentration in the electrolyte with respect to the total amount of solvents used in the electrolyte is from about 0.5 M to about 2.0 M.

In some embodiments, the total dissolved salt concentration in the electrolyte with respect to the total amount of solvents used in the electrolyte is from about 0.1 M to about 10.0 M. In some embodiments, the electrolyte exhibits an ionic conductivity of from about $10^{-5}$ mS cm$^{-1}$ to about 100 mS cm$^{-1}$ at room temperature. In some embodiments, the electrolyte exhibits an ionic conductivity of from about $10^{-4}$ mS cm$^{-1}$ to about $10^0$ mS cm$^{-1}$ at room temperature. In some embodiments, the electrolyte exhibits an ionic conductivity of from about $10^{-3}$ mS cm$^{-1}$ to about $10^0$ mS cm$^{-1}$ at room temperature. In some embodiments, the electrolyte exhibits an ionic conductivity of from about $10^{-2}$ mS cm$^{-1}$ to about $10^0$ mS cm$^{-1}$ at room temperature. In some embodiments, the electrolyte exhibits an ionic conductivity of from about $10^{-1}$ mS cm$^{-1}$ to about $10^0$ mS cm$^{-1}$ at room temperature. In some embodiments, the electrolyte exhibits an ionic conductivity of from about 0.18 mS cm$^{-1}$ to about 8 mS cm$^{-1}$ at room temperature.

In some embodiments, the electrolyte exhibits an ionic conductivity of from about 1 mS cm$^{-1}$ to about 7 mS cm$^{-1}$ at room temperature. In some embodiments, the electrolyte exhibits an ionic conductivity of from about 2 mS cm$^{-1}$ to about 6 mS cm$^{-1}$ at room temperature. In some embodiments, the electrolyte exhibits an ionic conductivity of from about 2.5 mS cm$^{-1}$ to about 5 mS cm-1 at room temperature. In some embodiments, the electrolyte exhibits an ionic conductivity of from about $10^{-1}$ mS cm$^{-1}$ to about $10^0$ mS cm$^{-1}$ at below room temperature between about −60° C. to about 20° C.

In some embodiments, the electrolyte exhibits an ionic conductivity of from about $10^{-4}$ mS cm$^{-1}$ to about $10^0$ mS cm$^{-1}$ at below room temperature between about −60° C. to about 20° C. In some embodiments, the electrolyte exhibits an ionic conductivity of from about $10^{-3}$ mS cm$^{-1}$ to about $10^0$ mS cm$^{-1}$ at below room temperature between about −60° C. to about 20° C. In some embodiments, the electrolyte exhibits an ionic conductivity of from about $10^{-2}$ mS cm$^{-1}$ to about $10^0$ mS cm$^{-1}$ at below room temperature between about −60° C. to about 20° C. In some embodiments, the electrolyte exhibits an ionic conductivity of from about $10^{-1}$ mS cm$^{-1}$ to about $10^0$ mS cm$^{-1}$ at below room temperature between about −60° C. to about 20° C. In some embodiments, the electrolyte exhibits an ionic conductivity of from about 0.18 mS cm$^{-1}$ to about 8 mS cm$^{-1}$ at below room temperature between about −60° C. to about 20° C. In some embodiments, the electrolyte exhibits an ionic conductivity of from about 1 mS cm$^{-1}$ to about 7 mS cm$^{-1}$ at below room temperature between about −60° C. to about 20° C. In some embodiments, the electrolyte exhibits an ionic conductivity of from about 2 mS cm$^{-1}$ to about 6 mS cm$^{-1}$ at below room temperature between about −60° C. to about 20° C. In some embodiments, the electrolyte exhibits an ionic conductivity of from about 2.5 mS cm$^{-1}$ to about 5 mS cm$^{-1}$ at below room temperature between about −60° C. to about 20° C.

In some embodiments, the electrolyte exhibits an oxidative electrochemical stability window of more than about 3.0V vs Na/Na$^+$, based on the onset of the oxidative peak in the linear sweep voltammetry. In some embodiments, the electrolyte exhibits an oxidative electrochemical stability window of more than about 3.3 V vs Na/Na$^+$, based on the onset of the oxidative peak in the linear sweep voltammetry. In some embodiments, the electrolyte exhibits an oxidative electrochemical stability window of more than about 3.5 V vs Na/Na$^+$, based on the onset of the oxidative peak in the linear sweep voltammetry. In some embodiments, the electrolyte exhibits an oxidative electrochemical stability window of more than about 3.7 V vs Na/Na$^+$, based on the onset of the oxidative peak in the linear sweep voltammetry. In some embodiments, the electrolyte exhibits an oxidative electrochemical stability window of more than about 4.0 V vs Na/Na$^+$, based on the onset of the oxidative peak in the linear sweep voltammetry. In some embodiments, the electrolyte exhibits an oxidative electrochemical stability window of more than about 4.3 V vs Na/Na$^+$, based on the onset of the oxidative peak in the linear sweep voltammetry. In some embodiments, the electrolyte exhibits an oxidative electrochemical stability window of more than about 4.5 V vs Na/Na$^+$, based on the onset of the oxidative peak in the linear sweep voltammetry. In some embodiments, the electrolyte exhibits an oxidative electrochemical stability window of more than about 4.7 V vs Na/Na$^+$, based on the onset of the oxidative peak in the linear sweep voltammetry. In some embodiments, the electrolyte exhibits an oxidative electrochemical stability window of more than about 5.0 V vs Na/Na$^+$, based on the onset of the oxidative peak in the linear sweep voltammetry.

In some embodiments, the electrolyte exhibits a reductive electrochemical stability window of less than about 2.5 V vs Na/Na$^+$, based on the onset of the reductive peak in the linear sweep voltammetry. In some embodiments, the electrolyte exhibits a reductive electrochemical stability window of less than about 2.3 V vs Na/Na$^+$, based on the onset of the reductive peak in the linear sweep voltammetry. In some embodiments, the electrolyte exhibits a reductive electrochemical stability window of less than about 2.0 V vs Na/Na$^+$, based on the onset of the reductive peak in the linear sweep voltammetry. In some embodiments, the electrolyte exhibits a reductive electrochemical stability window of less than about 1.7 V vs Na/Na$^+$, based on the onset of the reductive peak in the linear sweep voltammetry. In some embodiments, the electrolyte exhibits a reductive electrochemical stability window of less than about 1.5 V vs Na/Na$^+$, based on the onset of the reductive peak in the linear sweep voltammetry. In some embodiments, the electrolyte exhibits a reductive electrochemical stability window of less than about 1.2 V vs Na/Na$^+$, based on the onset of the reductive peak in the linear sweep voltammetry. In some embodiments, the electrolyte exhibits a reductive electrochemical stability window of less than about 1.0 V vs Na/Na$^+$, based on the onset of the reductive peak in the linear sweep voltammetry. In some embodiments, the electrolyte exhibits a reductive electrochemical stability window of less than about 0.8 V vs Na/Na$^+$, based on the onset of the reductive peak in the linear sweep voltammetry. In some embodiments, the electrolyte exhibits a reductive electrochemical stability window of less than about 0.7 V vs Na/Na$^+$, based on the onset of the reductive peak in the linear sweep voltammetry. In some embodiments, the electrolyte exhibits a reductive electrochemical stability window of less than about 0.6 V vs Na/Na$^+$, based on the onset of the reductive peak in the linear sweep voltammetry. In some embodiments, the electrolyte exhibits a reductive electrochemical stability window of less than about 0.5 V vs Na/Na$^+$, based on the onset of the reductive peak in the linear sweep voltammetry. In some embodiments, the electrolyte exhibits a reductive electrochemical stability window of less than about 0.4 V vs Na/Na$^+$, based on the onset of the reductive peak in the linear sweep voltammetry. In some embodiments, the electrolyte exhibits a reductive electrochemical stability window of less than about 0.3 V vs Na/Na$^+$, based on the onset of the reductive peak in the linear sweep voltammetry. In some embodiments, the electrolyte exhibits a reductive electrochemical stability window of less than about 0.2 V vs Na/Na$^+$, based on the onset of the reductive peak in the linear sweep voltammetry. In some embodiments, the electrolyte exhibits a reductive electrochemical stability window of less than about 0.1 V vs Na/Na$^+$, based on the onset of the reductive peak in the linear sweep voltammetry. In some embodiments, the electrolyte exhibits a reductive electrochemical stability window of less than about 0.05 V vs Na/Na$^+$, based on the onset of the reductive peak in the linear sweep voltammetry. In some embodiments, the electrolyte exhibits a reductive electrochemical stability window of less than about 0.03 V vs Na/Na$^+$, based on the onset of the reductive peak in the linear sweep voltammetry. In some embodiments, the electrolyte exhibits a reductive electrochemical stability window of less than about 0.01 V vs Na/Na$^+$, based on the onset of the reductive peak in the linear sweep voltammetry. In some embodiments, the electrolyte exhibits a reductive electrochemical stability window of less than about 0.001 V vs Na/Na$^+$, based on the onset of the reductive peak in the linear sweep voltammetry.

In some embodiments, the positive electrode comprises a positive electrode active material layer, the positive electrode active material layer comprises sodium transition metal oxide, sodium transition metal polyanionic oxide, sodium transition metal phosphate, or sodium ferrocyanide as a positive electrode active material, and the transition metal in the sodium transition metal oxide, the sodium transition metal phosphate, or the sodium transition metal polyanionic oxide comprises Ni, Cr, Mn, Fe, V, or a combination thereof. In some embodiments, the positive electrode active material layer further comprises a binder resin, a conductive material, a solid electrolyte, or a combination thereof. In some embodiments, the negative or positive electrode active material layer is obtained using the negative or positive electrode active material, the conductive material and the binder resin by a manufacturing method according to a dry mixing process without a solvent. In some embodiments, the battery has an NP ratio of 0.1 to 30.0.

In some embodiments, the battery has a Coulombic efficiency of at least 60%, preferably at least 90%, more preferably at least 95%, more preferably at least 100% for the first 80 cycles. In some embodiments, the battery has a Coulombic efficiency of at least 60%, preferably at least 90%, and more preferably at least 95% for the first 70 cycles. In some embodiments, the battery has a Coulombic efficiency of at least 60%, preferably at least 90%, and more preferably at least 95% for the first 60 cycles. In some embodiments, the battery has a Coulombic efficiency of at least 60%, preferably at least 90%, and more preferably at least 95% for the first 50 cycles. In some embodiments, the battery has a Coulombic efficiency of at least 60%, preferably at least 90%, and more preferably at least 95% for the first 40 cycles. In some embodiments, the battery has a Coulombic efficiency of at least 60%, preferably at least 90%, and more preferably at least 95% for the first 30 cycles.

In some embodiments, the battery has a Coulombic efficiency of at least 60%, preferably at least 90%, and more preferably at least 95% for the first 3 cycles. In some embodiments, the battery has a Coulombic efficiency of at least 60%, preferably at least 90%, and more preferably at least 95% for the first cycle.

The present disclosure is related to an electrolyte for a sodium secondary battery comprising a compound having a chemical structure including an oxygen molecule covalently bound to R1 and R2 groups (R1-O—R2), wherein each of R1 and R2 is an alkyl group or an aryl group, wherein the electrolyte comprises at least one selected from the following solvents, Dimethoxyethane (glyme), Triethylene glycol dimethyl ether (triglyme), Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, 2-Methyltetrahydrofuran, 3-Methyltetrahydrofuran, Oxacyclohexane, Oxacyclopropane, 1,3-Dioxolane, 1,4 Dioxane, Trioxane.

In some embodiments, the electrolyte is a liquid electrolyte. In some embodiments, the R1 and R2 groups together form a ring. In some embodiments, the electrolyte comprises at least one solvent free of any C=O carbon double bonded to oxygen, sulfur, benzene ring, phosphates, double or triple bonded carbon C=C/C≡C, or halogen containing functional groups.

In some embodiments, the electrolyte comprises $NaPF_6$, $NaBF_4$, $NaClO_4$, $NaCF_3SO_3$, sodium closo-borate salts (e.g. $NaCB_9H_{10}$, $NaCB_{11}H_{12}$, $Na_2B_{12}H_{12}$, $Na_2B_{10}H_{10}$, $Na[7\text{-}CB_{10}H_{13}]$, $Na[7,8\text{-}C_2B_9H_{12}]$, $Na[7,9\text{-}C_2B_9H_{12}]$), Sodium bis-(fluorosulfonyl)imide (NaFSI), Sodium trifluoro-methane-sulfonimide (NaTFSI), Sodium Bis(oxalato)borate (NaBOB), Sodium-difluoro(oxalato)borate (NaDFOB), or a combination thereof.

In some embodiments, the total dissolved salt concentration in the electrolyte with respect to the total amount of solvents used in the electrolyte is from about 0.01 M to about 10.0 M. In some embodiments, the total dissolved salt concentration in the electrolyte with respect to the total amount of solvents used in the electrolyte is from about 0.03 M to about 9.0 M. In some embodiments, the total dissolved salt concentration in the electrolyte with respect to the total amount of solvents used in the electrolyte is from about 0.05 M to about 8.0 M. In some embodiments, the total dissolved salt concentration in the electrolyte with respect to the total amount of solvents used in the electrolyte is from about 0.1 M to about 7.0 M. In some embodiments, the total dissolved salt concentration in the electrolyte with respect to the total amount of solvents used in the electrolyte is from about 0.2 M to about 5.0 M. In some embodiments, the total dissolved salt concentration in the electrolyte with respect to the total amount of solvents used in the electrolyte is from about 0.3 M to about 4.0 M.

In some embodiments, the total dissolved salt concentration in the electrolyte with respect to the total amount of solvents used in the electrolyte is from about 0.4 M to about 3.0 M. In some embodiments, the total dissolved salt concentration in the electrolyte with respect to the total amount of solvents used in the electrolyte is from about 0.5 M to about 2.0 M. In some embodiments, the total dissolved salt concentration in the electrolyte with respect to the total amount of solvents used in the electrolyte is from about 0.1 M to about 10 M. In some embodiments, the electrolyte exhibits an ionic conductivity of from about $10^{-5}$ mS cm$^{-1}$ to about $10^0$ mS cm$^{-1}$ at room temperature. In some embodiments, the electrolyte exhibits an ionic conductivity of from about $10^{-4}$ mS cm$^{-1}$ to about 100 mS cm$^{-1}$ at room temperature. In some embodiments, the electrolyte exhibits an ionic conductivity of from about $10^{-3}$ mS cm$^{-1}$ to about $10^0$ mS cm$^{-1}$ at room temperature.

In some embodiments, the electrolyte exhibits an ionic conductivity of from about $10^{-2}$ mS cm$^{-1}$ to about $10^0$ mS cm$^{-1}$ at room temperature. In some embodiments, the electrolyte exhibits an ionic conductivity of from about $10^{-1}$ mS cm$^{-1}$ to about $10^0$ mS cm$^{-1}$ at room temperature. In some embodiments, the electrolyte exhibits an ionic conductivity of from about 0.18 mS cm$^{-1}$ to about 8 mS cm$^{-1}$ at room temperature. In some embodiments, the electrolyte exhibits an ionic conductivity of from about 1 mS cm$^{-1}$ to about 7 mS cm$^{-1}$ at room temperature. In some embodiments, the electrolyte exhibits an ionic conductivity of from about 2 mS cm$^{-1}$ to about 6 mS cm$^{-1}$ at room temperature. In some embodiments, the electrolyte exhibits an ionic conductivity of from about 2.5 mS cm$^{-1}$ to about 5 mS cm$^{-1}$ at room temperature.

In some embodiments, the electrolyte exhibits an ionic conductivity of from about $10^{-1}$ mS cm$^{-1}$ to about $10^0$ mS cm$^{-1}$ at below room temperature between about −60° C. to about 20° C. In some embodiments, the electrolyte exhibits an ionic conductivity of from about $10^{-4}$ mS cm$^{-1}$ to about 100 mS cm$^{-1}$ at below room temperature between about −60° C. to about 20° C. In some embodiments, the electrolyte exhibits an ionic conductivity of from about $10^{-3}$ mS cm$^{-1}$ to about $10^0$ mS cm$^{-1}$ at below room temperature between about −60° C. to about 20° C. In some embodiments, the electrolyte exhibits an ionic conductivity of from about $10^{-2}$ mS cm$^{-1}$ to about $10^0$ mS cm$^{-1}$ at below room temperature between about −60° C. to about 20° C. In some embodiments, the electrolyte exhibits an ionic conductivity of from about $10^{-1}$ mS cm$^{-1}$ to about $10^0$ mS cm$^{-1}$ at below room temperature between about −60° C. to about 20° C. In some embodiments, the electrolyte exhibits an ionic conductivity of from about 0.18 mS cm$^{-1}$ to about 8 mS cm$^{-1}$ at below room temperature between about −60° C. to about 20° C. In some embodiments, the electrolyte exhibits an ionic conductivity of from about 1 mS cm$^{-1}$ to about 7 mS cm$^{-1}$ at below room temperature between about −60° C. to about 20° C.

In some embodiments, the electrolyte exhibits an ionic conductivity of from about 2 mS cm$^{-1}$ to about 6 mS cm$^{-1}$ at below room temperature between about −60° C. to about 20° C. In some embodiments, the electrolyte exhibits an ionic conductivity of from about 2.5 mS cm$^{-1}$ to about 5 mS cm$^{-1}$ at below room temperature between about −60° C. to about 20° C.

In some embodiments, the electrolyte exhibits an oxidative electrochemical stability window of more than about 3.0V vs Na/Na$^+$, based on the onset of the oxidative peak in the linear sweep voltammetry. In some embodiments, the electrolyte exhibits an oxidative electrochemical stability window of more than about 3.3 V vs Na/Na$^+$, based on the onset of the oxidative peak in the linear sweep voltammetry. In some embodiments, the electrolyte exhibits an oxidative electrochemical stability window of more than about 3.5 V vs Na/Na$^+$, based on the onset of the oxidative peak in the linear sweep voltammetry. In some embodiments, the electrolyte exhibits an oxidative electrochemical stability window of more than about 3.7 V vs Na/Na$^+$, based on the onset of the oxidative peak in the linear sweep voltammetry. In some embodiments, the electrolyte exhibits an oxidative electrochemical stability window of more than about 4.0 V vs Na/Na$^+$, based on the onset of the oxidative peak in the linear sweep voltammetry. In some embodiments, the electrolyte exhibits an oxidative electrochemical stability window of more than about 4.3 V vs Na/Na$^+$, based on the onset of the oxidative peak in the linear sweep voltammetry. In some embodiments, the electrolyte exhibits an oxidative electrochemical stability window of more than about 4.5 V vs Na/Na$^+$, based on the onset of the oxidative peak in the linear sweep voltammetry. In some embodiments, the electrolyte exhibits an oxidative electrochemical stability window of more than about 4.7 V vs Na/Na$^+$, based on the onset of the oxidative peak in the linear sweep voltammetry. In some embodiments, the electrolyte exhibits an oxidative electrochemical stability window of more than about 5.0 V vs Na/Na$^+$, based on the onset of the oxidative peak in the linear sweep voltammetry.

In some embodiments, the electrolyte exhibits a reductive electrochemical stability window of less than about 2.5 V vs Na/Na$^+$, based on the onset of the reductive peak in the linear sweep voltammetry. In some embodiments, the electrolyte exhibits a reductive electrochemical stability window of less than about 2.3 V vs Na/Na$^+$, based on the onset of the reductive peak in the linear sweep voltammetry. In some embodiments, the electrolyte exhibits a reductive electrochemical stability window of less than about 2.0 V vs Na/Na$^+$, based on the onset of the reductive peak in the linear sweep voltammetry. In some embodiments, the electrolyte exhibits a reductive electrochemical stability window of less than about 1.7 V vs Na/Na$^+$, based on the onset of the reductive peak in the linear sweep voltammetry. In some embodiments, the electrolyte exhibits a reductive electrochemical stability window of less than about 1.5 V vs Na/Na$^+$, based on the onset of the reductive peak in the linear sweep voltammetry. In some embodiments, the electrolyte exhibits a reductive electrochemical stability window of less than about 1.2 V vs Na/Na$^+$, based on the onset of the reductive peak in the linear sweep voltammetry. In some embodiments, the electrolyte exhibits a reductive electrochemical stability window of less than about 1.0 V vs Na/Na$^+$, based on the onset of the reductive peak in the linear sweep voltammetry. In some embodiments, the electrolyte exhibits a reductive electrochemical stability window of less than about 0.8 V vs Na/Na$^+$, based on the onset of the reductive peak in the linear sweep voltammetry.

In some embodiments, the electrolyte exhibits a reductive electrochemical stability window of less than about 0.7 V vs Na/Na$^+$, based on the onset of the reductive peak in the linear sweep voltammetry. In some embodiments, the electrolyte exhibits a reductive electrochemical stability window of less than about 0.6 V vs Na/Na$^+$, based on the onset of the reductive peak in the linear sweep voltammetry. In some embodiments, the electrolyte exhibits a reductive electrochemical stability window of less than about 0.5 V vs Na/Na$^+$, based on the onset of the reductive peak in the linear sweep voltammetry. In some embodiments, the electrolyte exhibits a reductive electrochemical stability window of less than about 0.4 V vs Na/Na$^+$, based on the onset of the reductive peak in the linear sweep voltammetry. In some embodiments, the electrolyte exhibits a reductive electrochemical stability window of less than about 0.3 V vs Na/Na$^+$, based on the onset of the reductive peak in the linear sweep voltammetry. In some embodiments, the electrolyte exhibits a reductive electrochemical stability window of less than about 0.2 V vs Na/Na$^+$, based on the onset of the reductive peak in the linear sweep voltammetry. In some embodiments, the electrolyte exhibits a reductive electrochemical stability window of less than about 0.1 V vs Na/Na$^+$, based on the onset of the reductive peak in the linear sweep voltammetry. In some embodiments, the electrolyte exhibits a reductive electrochemical stability window of less than about 0.05 V vs Na/Na$^+$, based on the onset of the reductive peak in the linear sweep voltammetry. In some embodiments, the electrolyte exhibits a reductive electrochemical stability window of less than about 0.03 V vs Na/Na$^+$, based on the onset of the reductive peak in the linear sweep voltammetry. In some embodiments, the electrolyte exhibits a reductive electrochemical stability window of less than about 0.01 V vs Na/Na$^+$, based on the onset of the reductive peak in the linear sweep voltammetry. In some embodiments, the electrolyte exhibits a reductive electrochemical stability window of less than about 0.001 V vs Na/Na$^+$, based on the onset of the reductive peak in the linear sweep voltammetry.

The present disclosure is related to an electrolyte for a sodium secondary battery, comprising: a compound having a chemical structure including an oxygen molecule covalently bound to R1 and R2 groups (R1-O—R2), wherein each of R1 and R2 is an alkyl group or an aryl group, wherein the electrolyte comprises NaBF$_4$, NaClO$_4$, NaCF$_3$SO$_3$, sodium closo-borate salts (e.g. NaCB$_9$H$_{10}$, NaCB$_{11}$H$_{12}$, Na$_2$B$_{12}$H$_{12}$, Na$_2$B$_{10}$H$_{10}$, Na[7-CB$_{10}$H$_{13}$], Na[7,8-C$_2$B$_9$H$_{12}$], Na[7,9-C$_2$B$_9$H$_{12}$]), Sodium bis-(fluorosulfonyl)imide (NaFSI), Sodium trifluoro-methane-sulfonimide (NaTFSI), Sodium Bis(oxalato)borate (NaBOB), Sodium-difluoro(oxalato)borate (NaDFOB), or a combination thereof.

In some embodiments, the electrolyte is a liquid electrolyte.

In some embodiments, the electrolyte is formed by dispersing the sodium salt in at least one solvent including the compound.

In some embodiments, the R1 and R2 groups together form a ring. In some embodiments, the electrolyte comprises at least one selected from the following solvents, Dimethoxyethane (glyme), Diethylene glycol dimethyl ether (diglyme), Triethylene glycol dimethyl ether (triglyme), Ethylene glycol diethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane. In some embodiments, the electrolyte comprises at least one solvent free of any C=O carbon double bonded to oxygen, sulfur, benzene ring, phosphates, double or triple bonded carbon C=C/C≡C, or halogen containing functional groups.

In some embodiments, the total dissolved salt concentration in the electrolyte with respect to the total amount of solvents used in the electrolyte is from about 0.01 M to about 10.0 M. In some embodiments, the total dissolved salt concentration in the electrolyte with respect to the total amount of solvents used in the electrolyte is from about 0.03 M to about 9.0 M. In some embodiments, the total dissolved salt concentration in the electrolyte with respect to the total amount of solvents used in the electrolyte is from about 0.05 M to about 8.0 M. In some embodiments, the total dissolved salt concentration in the electrolyte with respect to the total amount of solvents used in the electrolyte is from about 0.1 M to about 7.0 M. In some embodiments, the total dissolved salt concentration in the electrolyte with respect to the total amount of solvents used in the electrolyte is from about 0.2 M to about 5.0 M. In some embodiments, the total dissolved salt concentration in the electrolyte with respect to the total amount of solvents used in the electrolyte is from about 0.3 M to about 4.0 M.

In some embodiments, the total dissolved salt concentration in the electrolyte with respect to the total amount of solvents used in the electrolyte is from about 0.4 M to about 3.0 M. In some embodiments, the total dissolved salt concentration in the electrolyte with respect to the total amount of solvents used in the electrolyte is from about 0.5 M to about 2.0 M. In some embodiments, the total dissolved salt concentration in the electrolyte with respect to the total amount of solvents used in the electrolyte is from about 0.1 M to about 10 M.

In some embodiments, the electrolyte exhibits an ionic conductivity of from about $10^{-5}$ mS cm-1 to about $10^0$ mS cm$^{-1}$ at room temperature. In some embodiments, the electrolyte exhibits an ionic conductivity of from about $10^{-4}$ mS cm$^{-1}$ to about $10^0$ mS cm$^{-1}$ at room temperature. In some embodiments, the electrolyte exhibits an ionic conductivity of from about $10^{-3}$ mS cm$^{-1}$ to about 100 mS cm-1 at room temperature. In some embodiments, the electrolyte exhibits an ionic conductivity of from about $10^{-2}$ mS cm$^{-1}$ to about $10^0$ mS cm$^{-1}$ at room temperature. In some embodiments, the electrolyte exhibits an ionic conductivity of from about $10^{-1}$ mS cm$^{-1}$ to about $10^0$ mS cm$^{-1}$ at room temperature. In some embodiments, the electrolyte exhibits an ionic conductivity of from about 0.18 mS cm-1 to about 8 mS cm$^{-1}$ at room temperature. In some embodiments, the electrolyte exhibits an ionic conductivity of from about 1 mS cm$^{-1}$ to about 7 mS cm$^{-1}$ at room temperature. In some embodiments, the electrolyte exhibits an ionic conductivity of from about 2 mS cm-1 to about 6 mS cm-1 at room temperature. In some embodiments, the electrolyte exhibits an ionic conductivity of from about 2.5 mS cm-1 to about 5 mS cm-1 at room temperature.

In some embodiments, the electrolyte exhibits an ionic conductivity of from about 10$^{-5}$ mS cm$^{-1}$ to about 10$^0$ mS cm$^{-1}$ at below room temperature between about –60° C. to about 20° C. In some embodiments, the electrolyte exhibits an ionic conductivity of from about 10$^{-4}$ mS cm$^{-1}$ to about 100 mS cm-1 at below room temperature between about –60° C. to about 20° C. In some embodiments, the electrolyte exhibits an ionic conductivity of from about 10$^{-3}$ mS cm$^{-1}$ to about 10$^0$ mS cm$^{-1}$ at below room temperature between about –60° C. to about 20° C. In some embodiments, the electrolyte exhibits an ionic conductivity of from about 10$^{-2}$ mS cm$^{-1}$ to about 10$^0$ mS cm$^{-1}$ at below room temperature between about –60° C. to about 20° C. In some embodiments, the electrolyte exhibits an ionic conductivity of from about 10$^{-1}$ mS cm$^{-1}$ to about 10$^0$ mS cm$^{-1}$ at below room temperature between about –60° C. to about 20° C. In some embodiments, the electrolyte exhibits an ionic conductivity of from about 0.18 mS cm$^{-1}$ to about 8 mS cm$^{-1}$ at below room temperature between about –60° C. to about 20° C. In some embodiments, the electrolyte exhibits an ionic conductivity of from about 1 mS cm$^{-1}$ to about 7 mS cm$^{-1}$ at below room temperature between about –60° C. to about 20° C. In some embodiments, the electrolyte exhibits an ionic conductivity of from about 2 mS cm$^{-1}$ to about 6 mS cm$^{-1}$ at below room temperature between about –60° C. to about 20° C. In some embodiments, the electrolyte exhibits an ionic conductivity of from about 2.5 mS cm$^{-1}$ to about 5 mS cm$^{-1}$ at below room temperature between about –60° C. to about 20° C.

In some embodiments, the electrolyte exhibits an oxidative electrochemical stability window of more than about 3.0V vs Na/Na$^+$, based on the onset of the oxidative peak in the linear sweep voltammetry. In some embodiments, the electrolyte exhibits an oxidative electrochemical stability window of more than about 3.3 V vs Na/Na$^+$, based on the onset of the oxidative peak in the linear sweep voltammetry. In some embodiments, the electrolyte exhibits an oxidative electrochemical stability window of more than about 3.5 V vs Na/Na$^+$, based on the onset of the oxidative peak in the linear sweep voltammetry. In some embodiments, the electrolyte exhibits an oxidative electrochemical stability window of more than about 3.7 V vs Na/Na$^+$, based on the onset of the oxidative peak in the linear sweep voltammetry. In some embodiments, the electrolyte exhibits an oxidative electrochemical stability window of more than about 4.0 V vs Na/Na$^+$, based on the onset of the oxidative peak in the linear sweep voltammetry. In some embodiments, the electrolyte exhibits an oxidative electrochemical stability window of more than about 4.3 V vs Na/Na$^+$, based on the onset of the oxidative peak in the linear sweep voltammetry. In some embodiments, the electrolyte exhibits an oxidative electrochemical stability window of more than about 4.5 V vs Na/Na$^+$, based on the onset of the oxidative peak in the linear sweep voltammetry. In some embodiments, the electrolyte exhibits an oxidative electrochemical stability window of more than about 4.7 V vs Na/Na$^+$, based on the onset of the oxidative peak in the linear sweep voltammetry. In some embodiments, the electrolyte exhibits an oxidative electrochemical stability window of more than about 5.0 V vs Na/Na$^+$, based on the onset of the oxidative peak in the linear sweep voltammetry.

In some embodiments, the electrolyte exhibits a reductive electrochemical stability window of less than about 2.5 V vs Na/Na$^+$, based on the onset of the reductive peak in the linear sweep voltammetry. In some embodiments, the electrolyte exhibits a reductive electrochemical stability window of less than about 2.3 V vs Na/Na$^+$, based on the onset of the reductive peak in the linear sweep voltammetry. In some embodiments, the electrolyte exhibits a reductive electrochemical stability window of less than about 2.0 V vs Na/Na$^+$, based on the onset of the reductive peak in the linear sweep voltammetry. In some embodiments, the electrolyte exhibits a reductive electrochemical stability window of less than about 1.7 V vs Na/Na$^+$, based on the onset of the reductive peak in the linear sweep voltammetry. In some embodiments, the electrolyte exhibits a reductive electrochemical stability window of less than about 1.5 V vs Na/Na$^+$, based on the onset of the reductive peak in the linear sweep voltammetry. In some embodiments, the electrolyte exhibits a reductive electrochemical stability window of less than about 1.2 V vs Na/Na$^+$, based on the onset of the reductive peak in the linear sweep voltammetry.

In some embodiments, the electrolyte exhibits a reductive electrochemical stability window of less than about 1.0 V vs Na/Na$^+$, based on the onset of the reductive peak in the linear sweep voltammetry. In some embodiments, the electrolyte exhibits a reductive electrochemical stability window of less than about 0.8 V vs Na/Na$^+$, based on the onset of the reductive peak in the linear sweep voltammetry. In some embodiments, the electrolyte exhibits a reductive electrochemical stability window of less than about 0.7 V vs Na/Na$^+$, based on the onset of the reductive peak in the linear sweep voltammetry. In some embodiments, the electrolyte exhibits a reductive electrochemical stability window of less than about 0.6 V vs Na/Na$^+$, based on the onset of the reductive peak in the linear sweep voltammetry. In some embodiments, the electrolyte exhibits a reductive electrochemical stability window of less than about 0.5 V vs Na/Na$^+$, based on the onset of the reductive peak in the linear sweep voltammetry. In some embodiments, the electrolyte exhibits a reductive electrochemical stability window of less than about 0.4 V vs Na/Na$^+$, based on the onset of the reductive peak in the linear sweep voltammetry. In some embodiments, the electrolyte exhibits a reductive electrochemical stability window of less than about 0.3 V vs Na/Na$^+$, based on the onset of the reductive peak in the linear sweep voltammetry.

In some embodiments, the electrolyte exhibits a reductive electrochemical stability window of less than about 0.2 V vs Na/Na$^+$, based on the onset of the reductive peak in the linear sweep voltammetry. In some embodiments, the electrolyte exhibits a reductive electrochemical stability window of less than about 0.1 V vs Na/Na$^+$, based on the onset of the reductive peak in the linear sweep voltammetry. In some embodiments, the electrolyte exhibits a reductive electrochemical stability window of less than about 0.05 V vs Na/Na$^+$, based on the onset of the reductive peak in the linear sweep voltammetry. In some embodiments, the electrolyte exhibits a reductive electrochemical stability window of less than about 0.03 V vs Na/Na$^+$, based on the onset of the reductive peak in the linear sweep voltammetry. In some embodiments, the electrolyte exhibits a reductive electrochemical stability window of less than about 0.01 V vs Na/Na$^+$, based on the onset of the reductive peak in the linear sweep voltammetry. In some embodiments, the electrolyte exhibits a reductive electrochemical stability window of less than about 0.001 V vs Na/Na$^+$, based on the onset of the reductive peak in the linear sweep voltammetry.

The present disclosure is related to an electrolyte for a sodium secondary battery comprising a compound having a chemical structure including an oxygen molecule covalently bound to R1 and R2 groups (R1-O—R2), wherein each of R1 and R2 is an alkyl group or an aryl group; and a salt, wherein the total dissolved salt concentration in the electrolyte with respect to the total amount of solvents used in the electrolyte is from about 0.01 M to about 0.9 M or from about 1.1 M to about 10.0 M.

In some embodiments, the electrolyte is a liquid electrolyte.

In some embodiments, the R1 and R2 groups together form a ring.

In some embodiments, the electrolyte comprises at least one selected from the following solvents, Dimethoxyethane (glyme), Diethylene glycol dimethyl ether (diglyme), Triethylene glycol dimethyl ether (triglyme), Ethylene glycol Ethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane. In some embodiments, the electrolyte comprises at least one solvent free of any C=O carbon double bonded to oxygen, sulfur, benzene ring, phosphates, double or triple bonded carbon C=C/C≡C, or halogen containing functional groups.

In some embodiments, the electrolyte comprises NaPF$_6$, NaBF$_4$, NaClO$_4$, NaCF$_3$SO$_3$, sodium closo-borate salts (e.g. NaCB$_9$H$_{10}$, NaCB$_{11}$H$_{12}$, Na$_2$B$_{12}$H$_{12}$, Na$_2$B$_{10}$H$_{10}$, Na[7-CB$_{10}$H$_{13}$], Na[7,8-C$_2$B$_9$H$_{12}$], Na[7,9-C$_2$B$_9$H$_{12}$]), Sodium bis-(fluorosulfonyl)imide (NaFSI), Sodium trifluoro-methane-sulfonimide (NaTFSI), Sodium Bis(oxalato)borate (NaBOB), Sodium-difluoro(oxalato)borate (NaDFOB), or a combination thereof.

In some embodiments, the total dissolved salt concentration in the electrolyte with respect to the total amount of solvents used in the electrolyte is from about 0.01 M to about 0.9 M. In some embodiments, the total dissolved salt concentration in the electrolyte with respect to the total amount of solvents used in the electrolyte is from about 0.03 M to about 0.9 M. In some embodiments, the total dissolved salt concentration in the electrolyte with respect to the total amount of solvents used in the electrolyte is from about 0.05 M to about 0.9 M. In some embodiments, the total dissolved salt concentration in the electrolyte with respect to the total amount of solvents used in the electrolyte is from about 0.1 M to about 0.9 M. In some embodiments, the total dissolved salt concentration in the electrolyte with respect to the total amount of solvents used in the electrolyte is from about 0.2 M to about 0.9 M. In some embodiments, the total dissolved salt concentration in the electrolyte with respect to the total amount of solvents used in the electrolyte is from about 0.3 M to about 0.9 M. In some embodiments, the total dissolved salt concentration in the electrolyte with respect to the total amount of solvents used in the electrolyte is from about 0.4 M to about 0.9 M. In some embodiments, the total dissolved salt concentration in the electrolyte with respect to the total amount of solvents used in the electrolyte is from about 0.5 M to about 0.9 M.

In some embodiments, the total dissolved salt concentration in the electrolyte with respect to the total amount of solvents used in the electrolyte is from about 1.1 M to about 10.0 M. In some embodiments, the total dissolved salt concentration in the electrolyte with respect to the total amount of solvents used in the electrolyte is from about 1.1 M to about 9.0 M. In some embodiments, the total dissolved salt concentration in the electrolyte with respect to the total amount of solvents used in the electrolyte is from about 1.1 M to about 8.0 M. In some embodiments, the total dissolved salt concentration in the electrolyte with respect to the total amount of solvents used in the electrolyte is from about 1.1 M to about 7.0 M. In some embodiments, the total dissolved salt concentration in the electrolyte with respect to the total amount of solvents used in the electrolyte is from about 1.1 M to about 5.0 M. In some embodiments, the total dissolved salt concentration in the electrolyte with respect to the total amount of solvents used in the electrolyte is from about 1.1 M to about 4.0 M. In some embodiments, the total dissolved salt concentration in the electrolyte with respect to the total amount of solvents used in the electrolyte is from about 1.1 M to about 3.0 M. In some embodiments, the total dissolved salt concentration in the electrolyte with respect to the total amount of solvents used in the electrolyte is from about 1.1 M to about 2.0 M.

In some embodiments, the electrolyte exhibits an ionic conductivity of from about $10^{-1}$ mS cm$^{-1}$ to about $10^0$ mS cm$^{-1}$ at room temperature. In some embodiments, the electrolyte exhibits an ionic conductivity of from about $10^{-4}$ mS cm$^{-1}$ to about $10^0$ mS cm$^{-1}$ at room temperature. In some embodiments, the electrolyte exhibits an ionic conductivity of from about $10^{-3}$ mS cm$^{-1}$ to about 100 mS cm$^{-1}$ at room temperature. In some embodiments, the electrolyte exhibits an ionic conductivity of from about $10^{-2}$ mS cm$^{-1}$ to about $10^0$ mS cm$^{-1}$ at room temperature. In some embodiments, the electrolyte exhibits an ionic conductivity of from about $10^{-1}$ mS cm$^{-1}$ to about $10^0$ mS cm$^{-1}$ at room temperature. In some embodiments, the electrolyte exhibits an ionic conductivity of from about 0.18 mS cm$^{-1}$ to about 8 mS cm$^{-1}$ at room temperature. In some embodiments, the electrolyte exhibits an ionic conductivity of from about 1 mS cm$^{-1}$ to about 7 mS cm$^{-1}$ at room temperature. In some embodiments, the electrolyte exhibits an ionic conductivity of from about 2 mS cm$^{-1}$ to about 6 mS cm$^{-1}$ at room temperature. In some embodiments, the electrolyte exhibits an ionic conductivity of from about 2.5 mS cm$^{-1}$ to about 5 mS cm$^{-1}$ at room temperature.

In some embodiments, the electrolyte exhibits an ionic conductivity of from about $10^{-5}$ mS cm$^{-1}$ to about $10^0$ mS cm$^{-1}$ at below room temperature between about −60° C. to about 20° C. In some embodiments, the electrolyte exhibits an ionic conductivity of from about $10^{-4}$ mS cm$^{-1}$ to about 100 mS cm$^{-1}$ at below room temperature between about −60° C. to about 20° C. In some embodiments, the electrolyte exhibits an ionic conductivity of from about $10^{-3}$ mS cm$^{-1}$ to about $10^0$ mS cm$^{-1}$ at below room temperature between about −60° C. to about 20° C. In some embodiments, the electrolyte exhibits an ionic conductivity of from about $10^{-2}$ mS cm$^{-1}$ to about $10^0$ mS cm$^{-1}$ at below room temperature between about −60° C. to about 20° C. In some embodiments, the electrolyte exhibits an ionic conductivity of from about $10^{-1}$ mS cm$^{-1}$ to about $10^0$ mS cm$^{-1}$ at below room temperature between about −60° C. to about 20° C. In some embodiments, the electrolyte exhibits an ionic conductivity of from about 0.18 mS cm$^{-1}$ to about 8 mS cm$^{-1}$ at below room temperature between about −60° C. to about 20° C. In some embodiments, the electrolyte exhibits an ionic conductivity of from about 1 mS cm$^{-1}$ to about 7 mS cm$^{-1}$ at below room temperature between about −60° C. to about 20° C. In some embodiments, the electrolyte exhibits an ionic conductivity of from about 2 mS cm$^{-1}$ to about 6 mS cm$^{-1}$ at below room temperature between about −60° C. to about 20° C. In some embodiments, the electrolyte exhibits an ionic conductivity of from about 2.5 mS cm$^{-1}$ to about 5 mS cm$^{-1}$ at below room temperature between about −60° C. to about 20° C.

In some embodiments, the electrolyte exhibits an oxidative electrochemical stability window of more than about 3.0 V vs Na/Na$^+$, based on the onset of the oxidative peak in the linear sweep voltammetry. In some embodiments, the electrolyte exhibits an oxidative electrochemical stability window of more than about 3.3 V vs Na/Na$^+$, based on the onset of the oxidative peak in the linear sweep voltammetry. In some embodiments, the electrolyte exhibits an oxidative electrochemical stability window of more than about 3.5 V vs Na/Na$^+$, based on the onset of the oxidative peak in the linear sweep voltammetry. In some embodiments, the electrolyte exhibits an oxidative electrochemical stability window of more than about 3.7 V vs Na/Na$^+$, based on the onset of the oxidative peak in the linear sweep voltammetry. In some embodiments, the electrolyte exhibits an oxidative electrochemical stability window of more than about 4.0 V vs Na/Na$^+$, based on the onset of the oxidative peak in the linear sweep voltammetry. In some embodiments, the electrolyte exhibits an oxidative electrochemical stability window of more than about 4.3 V vs Na/Na$^+$, based on the onset of the oxidative peak in the linear sweep voltammetry. In some embodiments, the electrolyte exhibits an oxidative electrochemical stability window of more than about 4.5 V vs Na/Na$^+$, based on the onset of the oxidative peak in the linear sweep voltammetry. In some embodiments, the electrolyte exhibits an oxidative electrochemical stability window of more than about 4.7 V vs Na/Na$^+$, based on the onset of the oxidative peak in the linear sweep voltammetry. In some embodiments, the electrolyte exhibits an oxidative electrochemical stability window of more than about 5.0 V vs Na/Na$^+$, based on the onset of the oxidative peak in the linear sweep voltammetry.

In some embodiments, the electrolyte exhibits a reductive electrochemical stability window of less than about 2.5 V vs Na/Na$^+$, based on the onset of the reductive peak in the linear sweep voltammetry. In some embodiments, the electrolyte exhibits a reductive electrochemical stability window of less than about 2.3 V vs Na/Na$^+$, based on the onset of the reductive peak in the linear sweep voltammetry. In some embodiments, the electrolyte exhibits a reductive electrochemical stability window of less than about 2.0 V vs Na/Na$^+$, based on the onset of the reductive peak in the linear sweep voltammetry. In some embodiments, the electrolyte exhibits a reductive electrochemical stability window of less than about 1.7 V vs Na/Na$^+$, based on the onset of the reductive peak in the linear sweep voltammetry. In some embodiments, the electrolyte exhibits a reductive electrochemical stability window of less than about 1.5 V vs Na/Na$^+$, based on the onset of the reductive peak in the linear sweep voltammetry. In some embodiments, the electrolyte exhibits a reductive electrochemical stability window of less than about 1.2 V vs Na/Na$^+$, based on the onset of the reductive peak in the linear sweep voltammetry. In some embodiments, the electrolyte exhibits a reductive electrochemical stability window of less than about 1.0 V vs Na/Na$^+$, based on the onset of the reductive peak in the linear sweep voltammetry. In some embodiments, the electrolyte exhibits a reductive electrochemical stability window of less than about 0.8 V vs Na/Na$^+$, based on the onset of the reductive peak in the linear sweep voltammetry. In some embodiments, the electrolyte exhibits a reductive electrochemical stability window of less than about 0.7 V vs Na/Na$^+$, based on the onset of the reductive peak in the linear sweep voltammetry. In some embodiments, the electrolyte exhibits a reductive electrochemical stability window of less than about 0.6 V vs Na/Na$^+$, based on the onset of the reductive peak in the linear sweep voltammetry.

In some embodiments, the electrolyte exhibits a reductive electrochemical stability window of less than about 0.5 V vs Na/Na$^+$, based on the onset of the reductive peak in the linear sweep voltammetry. In some embodiments, the electrolyte exhibits a reductive electrochemical stability window of less than about 0.4 V vs Na/Na$^+$, based on the onset of the reductive peak in the linear sweep voltammetry. In some embodiments, the electrolyte exhibits a reductive electrochemical stability window of less than about 0.3 V vs Na/Na$^+$, based on the onset of the reductive peak in the linear sweep voltammetry. In some embodiments, the electrolyte exhibits a reductive electrochemical stability window of less than about 0.2 V vs Na/Na$^+$, based on the onset of the reductive peak in the linear sweep voltammetry. In some embodiments, the electrolyte exhibits a reductive electrochemical stability window of less than about 0.1 V vs Na/Na$^+$, based on the onset of the reductive peak in the linear sweep voltammetry. In some embodiments, the electrolyte exhibits a reductive electrochemical stability window of less than about 0.05 V vs Na/Na$^+$, based on the onset of the reductive peak in the linear sweep voltammetry. In some embodiments, the electrolyte exhibits a reductive electrochemical stability window of less than about 0.03 V vs Na/Na$^+$, based on the onset of the reductive peak in the linear sweep voltammetry. In some embodiments, the electrolyte exhibits a reductive electrochemical stability window of less than about 0.01 V vs Na/Na$^+$, based on the onset of the reductive peak in the linear sweep voltammetry. In some embodiments, the electrolyte exhibits a reductive electrochemical stability window of less than about 0.001 V vs Na/Na$^+$, based on the onset of the reductive peak in the linear sweep voltammetry.

BRIEF DESCRIPTION OF THE DRAWINGS

It is to be expressly understood that the drawings are for the purpose of illustration and description only and are not intended as a definition of the limits of the invention.

DETAILED DESCRIPTION OF THE INVENTION

Figure 1:
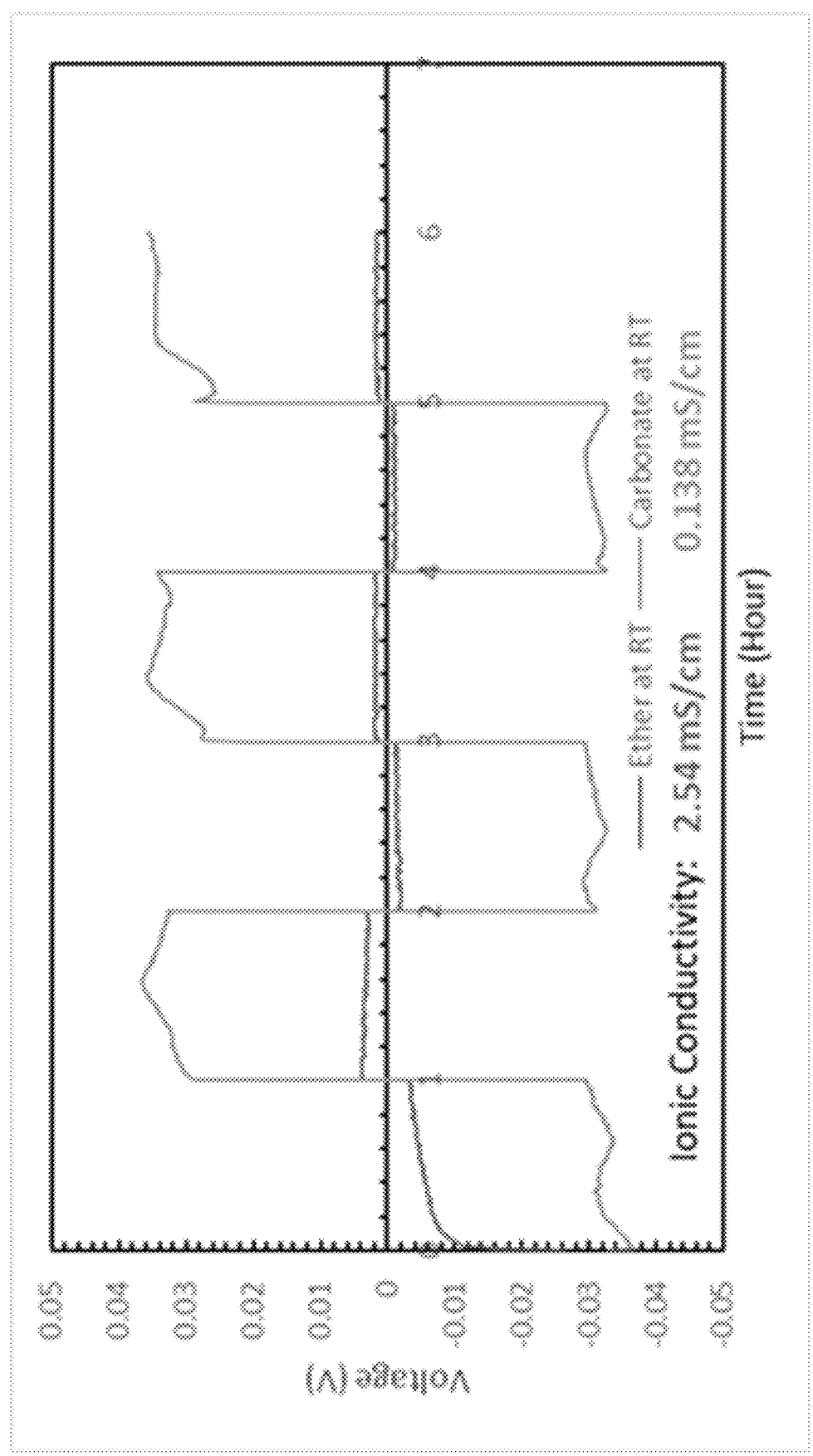
FIG. 1 illustrates Na||Na symmetric cell measurements of the ether based organic electrolyte type A at room temperature and a reference commercial carbonate-based electrolyte for comparison in some embodiments.

Hereinafter, the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the embodiments described herein and the elements shown in the drawings is just a most preferred embodiment of the present disclosure, but not intended to fully describe the technical aspects of the present disclosure, so it should be understood that other equivalents and modifications could have been made thereto at the time the application was filed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The terms "about" and "essentially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

"A and/or B" when used in this specification, specifies "either A or B or both".

The present disclosure relates to electrolytes containing an ether-based compound.

The present disclosure is related to high energy density sodium-based batteries. The present disclosure is related to, for example, batteries for electric vehicles, portable devices, and stationary energy storage devices.

A sodium ion secondary battery uses a sodium transition metal oxide, sodium transition metal polyanionic oxide, sodium transition metal phosphate, or ferrocyanide positive electrode active material and a hard carbon-based or a metal alloy-based negative electrode active material and uses an organic liquid electrolyte to ensure sodium ionic conductivity between the positive electrode and the negative electrode. The vast majority of the organic liquid electrolytes used for both commercial lithium and sodium ion batteries are carbonate-based electrolytes, which are well established to operate well with carbon-based anodes such as graphite or hard carbon.

In the literature, there are several reports of higher capacity negative electrode active material such as tin (Sn) as an alternative to the hard carbon-based negative electrode active material.

The tin (Sn) anode undergoes an alloying reaction with sodium to form sodium-tin alloy, $15Na+4Sn\rightarrow Na_{15}Sn_4$. Tin (Sn) has high electrical conductivity and exhibits higher capacity characteristics than the hard carbon-based active material, additionally, it has a much higher density compared to carbon.

So, when tin (Sn) is applied as the negative electrode active material, it is possible to achieve higher battery capacity and smaller battery size than the existing batteries including the hard carbon-based negative electrode.

In some embodiments, tin (Sn) may exhibit a low first cycle reversible coulombic efficiency, along with poor capacity retention as it is continuously charged and discharged during battery operation. In some embodiments, as the carbonate-based electrolytes typically used in sodium secondary batteries are not intrinsically stable at the reducing environments of the anode, it may undergo a reduction decomposition process forming a solid electrolyte interface (SEI). In carbon-based anodes, due to the limited volume change during charge and discharge, the SEI is formed at the $1^{st}$ cycle and is passivated, allowing for continued stable cell operation. In some embodiments, in tin (Sn) based anodes, large volume changes during charge and discharge can continuously expose new surfaces to the electrolyte, inducing repeated electrolyte decomposition and continuous consumption of sodium reservoir, resulting in the reduced battery capacity. This process is similar to lithium analogous counterpart, silicon alloys that undergo large volume expansion during lithium-silicon alloy formation (15Li+ 4Si→$Li_{15}Si_4$).

In lithium systems, volume change and poor reversibility has been reportedly mitigated by adopting various compositional modifications to the liquid carbonate electrolytes used, such as using, sulfone based, nitrile or fluorine-based additives, fluorine-based diluents and specialized lithium salts, which together form more stable and robust SEI. It has been hypothesized that the fluorine containing additives results in the formation of LiF as a major SEI component, which is believed to bring favorable properties to the SEI. Such strategies have brought some improvements to the overall cycle life and performance of the silicon anode. As a result, silicon anode uses in lithium-ion batteries have proliferated.

In some embodiments, similar strategies can be also attempted for tin (Sn) anodes in high energy anodes in sodium secondary batteries in the past. However, these efforts have been unsuccessful in sodium systems to date. The reasons why such strategies are unsuccessful in sodium anodes are still unclear. One prevailing explanation is due to the high reactivity and reaction kinetics of sodium compared to lithium. As a result, the amount of SEI and fast decomposition reaction kinetics of the carbonate-based electrolytes causes severe degradation of the sodium batteries, even if only a few percentage points by mass ratio of tin (Sn) are used in the anode. Another prevailing explanation is due to the formation of NaF as a major component of the SEI composition, contrary to the lithium case, is not desirable for sodium systems. Thus, there are relatively few reports on Sn based anodes in the sodium battery literature.

The present disclosure is directed to providing a sodium secondary battery containing tin (Sn) as a negative electrode active material, that is enabled by an ether-based organic liquid electrolyte to overcome the existing challenges faced in the prior art that used commercial carbonate-based electrolytes. In some embodiments, contrary to carbonate-based electrolytes, the tin (Sn) negative electrode can be enabled in this invention by the ether-based electrolyte, which has a wider electrochemical stability window compared to carbonate-based electrolytes. In some embodiments, this indicates that SEI is formed to a much smaller degree on the surface of the tin (Sn) anode when ethers are used instead of carbonates, despite the large volume changes undergone. In some embodiments, the SEI formed on the tin (Sn) can be also extremely stable, avoiding degradation effects of sodium consumption and capacity loss.

The present disclosure is directed to providing a sodium secondary battery having good electrochemical properties including stability toward tin anodes, a high electrolyte ionic conductivity, high-rate capability, wide operating temperature range, high energy density, life characteristics and coulombic efficiency. It will be readily appreciated that these and other objects and advantages of the present disclosure may be realized by means or methods described in the appended claims and a combination thereof.

The present disclosure relates to a sodium secondary battery, and the battery comprises a negative electrode, a positive electrode and an electrolyte that provides ionic transport pathway between the negative electrode and the positive electrode, wherein the electrolyte comprises an ether based organic liquid electrolyte. The electrolyte may also contain other materials such as sodium salts, additives, or diluents in a mixture.

The present disclosure relates to the sodium secondary battery in the first aspect wherein the ether based organic liquid electrolyte is used in the battery where the negative electrode comprises an active material layer comprising tin (Sn) as a negative electrode active material, the negative electrode active material layer comprises the tin (Sn) in an amount of 1 wt % or more based on 100 wt % of the negative electrode active material layer.

The present disclosure relates to the sodium secondary battery in any one of the first to second aspects wherein the ether based organic liquid electrolyte comprises at least one selected from a solvent, such as Dimethoxyethane (glyme), Diethylene glycol dimethyl ether (diglyme), Triethylene glycol dimethyl ether (triglyme), Ethylene glycol Ethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane.

The present disclosure relates to the sodium secondary battery in the first to third aspect wherein the ether based organic liquid electrolyte used in the battery comprises at least one selected from a salt, such as $NaPF_6$, $NaBF_4$, $NaClO_4$, $NaCF_3SO_3$, sodium closo-borate salts (e.g. $NaCB_9H_{10}$, $NaCB_{11}H_{12}$, $Na_2B_{12}H_{12}$, $Na_2B_{10}H_{10}$, $Na[7-CB_{10}H_{13}]$, $Na[7,8-C_2B_9H_{12}]$, $Na[7,9-C_2B_9H_{12}]$), Sodium bis-(fluorosulfonyl)imide (NaFSI), Sodium trifluoro-methane-sulfonimide (NaTFSI), Sodium Bis(oxalato)borate (Na-BOB), Sodium-difluoro(oxalato)borate (NaDFOB).

The present disclosure relates to the sodium secondary battery in the first to fourth aspect wherein the ether based organic liquid electrolyte used in the battery comprises sodium salt in a total dissolved concentration of 0.1 M to 10 M with respect to the total amount of solvents used.

The present disclosure relates to the sodium secondary battery in the first to fifth aspect wherein the ether based organic liquid electrolyte used in the battery exhibits an electronic conductivity of between ~$10^{-5}$ to $10^0$ S $cm^{-1}$ at room temperature.

The present disclosure relates to the sodium secondary battery in the first to fifth aspect wherein the ether based organic liquid electrolyte used in the battery exhibits an electronic conductivity of between ~$10^{-5}$ to $10^0$ S $cm^{-1}$ at below room temperature between −60° C. to 20° C.

The present disclosure relates to the sodium secondary battery in any one of the first to seventh aspects wherein the ether based organic liquid electrolyte is used with a battery containing a negative electrode material layer with negative electrode active material layer comprises the tin (Sn), where tin (Sn) has an average particle size between 5 μm and 70 μm.

The present disclosure relates to the sodium secondary battery in any one of the first to eighth aspects wherein the negative electrode material layer further comprises at least one other active material, such as hard carbon, and the negative electrode comprises a current collector, and the negative electrode active material layer is formed on at least one surface of the current collector.

The present disclosure relates to the sodium secondary battery in any one of the first to tenth aspects wherein the positive electrode comprises a positive electrode active material layer, the positive electrode active material layer comprises sodium transition metal oxide, sodium transition metal polyanionic oxide, sodium transition metal phosphate, or sodium ferrocyanide as a positive electrode active material, and the transition metal comprises at least one of Ni, Cr, Mn, Fe or V.

The present disclosure relates to the sodium secondary battery in the eleventh aspect wherein the positive electrode active material layer further comprises at least one of a binder resin, a conductive material or a solid electrolyte.

The present disclosure relates to the sodium secondary battery in any one of the first to thirteenth aspects wherein the battery has a negative electrode capacity to positive electrode capacity (N/P) ratio of 0.1 to 30.0.

Non-Limiting Example Effects

In some embodiments, the sodium secondary battery according to the present disclosure has a high energy density and a long cycle life due to the tin (Sn) enabled by the ether-based electrolyte. The ether-based electrolyte allows a high-capacity utilization of more than 95% of the tin (Sn) theoretical capacity. In some embodiments, the negative electrode exhibits an extremely high-rate capability, able to achieve a higher room temperature and low temperature ionic conductivity not achievable by conventional carbonate-based electrolytes. Attributed to the wide stability window of the ether-based electrolyte compared to conventional carbonates, the ether-based electrolyte can remain stable at both high oxidative environments at the cathode and high reductive environments at the anode. In some embodiments, selection of ethers with low flammability also offer improved safety factors compared to carbonate based electrolytes. In some embodiments, With features in some embodiments, the battery according to the present disclosure has good reversibility and electrochemical properties including high charge rate capability, high energy density, long durability and high coulombic efficiency.

The present disclosure relates to a sodium secondary battery comprising an ether based organic liquid electrolyte material as an electrolyte. In some embodiments, examples of the sodium secondary battery include any type of primary battery, secondary battery, fuel cell, solar cell or capacitor such as a super capacitor. In particular, the secondary battery is, to be specific, a sodium ion secondary battery.

In some embodiments, the sodium secondary battery according to the present disclosure may comprise a negative electrode, a positive electrode and an ether based organic liquid electrolyte connected between the negative electrode and the positive electrode, and the negative electrode comprises a negative electrode active material layer including tin (Sn) as a negative electrode active material.

In some embodiments, when commercial carbonate-based electrolyte is used as the electrolyte, the life and performance characteristics are poor, due to the limited electrochemical stability and excessive SEI formation at the tin anode, resulting in poor competitive advantages for tin (Sn) based sodium secondary batteries. In some embodiments, when ether-based electrolyte is used for the negative electrode, the wide electrochemical stability and reduced SEI formation prevents continuous sodium inventory losses and electrolyte consumption, promoting long cycle life and improved performance characteristics. In some embodiments, a battery, according to the present disclosure, can solve the above-described challenges facing commercial adoption of high energy density tin (Sn) based anodes.

In some embodiments, the ether-based electrolyte, can be an electrolyte that contains one or more sodium salts in a total dissolved concentration of 0.1 to 10 M dissolved in one or more ether-based solvent, the ether-based solvents mainly containing C—O carbon single bonded to oxygen, in the absence of any C=O carbon double bonded to oxygen. The ether-based solvent should not contain and sulfur, benzene ring, phosphates, double or triple bonded carbon C=C/C≡C, or halogen containing functional groups. In some embodiments, the ether solvents types A, B, and C refer to glyme, diglyme and triglyme as examples. By contrast, a commercial carbonate-based electrolyte reference is an electrolyte that contains $NaPF_6$ salt in a concentration of 1 M dissolved in a 50:50 mixture of ethylene carbonate and diethyl carbonate solvent. Within the above-described ether-based electrolyte, it is advantageous vs the commercial carbonate-based electrolyte in terms of rate capability, performance, ionic conductivity and safety.

In some embodiments, the negative electrode active material layer may include the tin (Sn) in an amount of 1 wt % or more, based on 100 wt % of the negative electrode active material layer. It may be used in a composite with hard carbon, which can serve both as an active material and conductive additive, along with a binder.

In some embodiments, it can be that and can be preferred that the ether-based electrolyte is compatible with all other materials in the sodium ion battery. This is because the organic liquid electrolyte flows and is in contact with all components in the cell, including the negative electrode, positive electrode and other additives. In some embodiments, the electrolyte needs to be positive electrode agnostic, and be able to allow reversible cycling of any positive electrode paired with the tin (Sn) anode.

In some embodiments, the ether based organic liquid electrolyte may comprise at least one selected from a solvent, such as Dimethoxyethane (glyme), Diethylene glycol dimethyl ether (diglyme), Triethylene glycol dimethyl ether (triglyme), Ethylene glycol Ethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane.

In some embodiments, the ether based organic liquid electrolyte may comprise at least one selected from a salt, such as $NaPF_6$, $NaBF_4$, $NaClO_4$, $NaCF_3SO_3$, sodium closoborate salts (e.g. $NaCB_9H_{10}$, $NaCB_{11}H_{12}$, $Na_2B_{12}H_{12}$, $Na_2B_{10}H_{10}$, $Na[7\text{-}CB_{10}H_{13}]$, $Na[7,8\text{-}C_2B_9H_{12}]$, $Na[7,9\text{-}C_2B_9H_{12}]$), Sodium bis-(fluorosulfonyl)imide (NaFSI), Sodium trifluoro-methane-sulfonimide (NaTFSI), Sodium Bis(oxalato)borate (NaBOB), Sodium-difluoro(oxalato)borate (NaDFOB).

In some embodiments, comprises sodium salt in a total dissolved concentration of 0.1 M to 10 M with respect to the total amount of solvents used.

In some embodiments, the ether properties of the electrolyte, mainly containing C—O carbon single bonded to oxygen has an important technical significance in improving the electrochemical properties and SEI stability and sodium ion transport properties of the tin (Sn) anode according to the present disclosure. Carbonate based electrolytes containing C=O carbon double bonded to oxygen have a detrimental effect on the tin (Sn) anode.

In some embodiments, the negative electrode active material layer may be manufactured, for example, by the following method.

In some embodiments, the ether-based electrolyte may be obtained by dispersing the $NaPF_6$ sodium salt in Dimethoxyethane solvent until the salt is fully dissolved with a concentration ranging from 0.1M to 10 M. A mixture of various salts and co-solvents may be used. In some embodiments, the ether-based electrolyte can be paired with the tin (Sn) negative electrode. The negative electrode active material layer may be obtained by dispersing tin (Sn) powder in a water solvent to prepare a slurry, subsequently applying the slurry to an appropriate negative electrode current collector and drying. The solvent may further comprise another active material, a conductive carbon material and a binder resin, where the amount of the binder resin may be adjusted to an amount of less than 10 wt %, based on 100 wt % of the finally obtained negative electrode active material layer.

In some embodiments, The co-solvents added to the electrolyte mixture may include diluents that may not solvate the salt, or salt additives that are in the form of an ionic liquid.

In some embodiments, To prepare the cell, the tin (Sn) active material layer can be paired against a positive cathode electrode in the case of a full cell or a reference sodium metal electrode in the case of a half cell, separated by a polyolefin separator. The as-prepared ether-based electrolyte can then be added, ensuring that both electrodes along with the separator is fully wet by the electrolyte.

The polyolefin separator may be coated one side with a ceramic layer to improve its mechanical strength and wettability toward the ether based electrolyte.

In some embodiments, the positive electrode may comprise a positive electrode active material layer comprising a positive electrode active material, a positive electrode conductive material.

The positive electrode active material layer may further comprise a binder resin for the positive electrode if necessary. Additionally, the positive electrode comprises a current collector if necessary, and the positive electrode active material layer may be positioned on at least one surface of the current collector.

In some embodiments, the positive electrode active material may comprise at least one of sodium chromium oxide ($NaCrO_2$), sodium manganese ferrocyanide ($Na_2MnFe(CN)_6$), sodium iron ferrocyanide ($Na_2Fe_2(CN)_6$), sodium vanadium phosphate (($Na_3V_2(PO_4)_3$), sodium vanadium fluorophosphate (($Na_3V_2(PO_4)2F_3$), sodium nickel iron manganese oxide $Na(Ni_{1/3}Fe_{1/3}Mn_{1/3})O_2$ or $NaNi_{0.4}Fe_{0.2}Mn_{0.4}O_2$, sodium iron manganese oxide $Na_{2/3}(Fe_{1/2}Mn_{1/2})O_2$, sodium nickel manganese oxide $NaNi_{0.5}Mn_{1.5}O_4$.

In the present disclosure, the representative positive electrode active material may comprise sodium nickel iron manganese oxide $Na(Ni_{1/3}Fe_{1/3}Mn_{1/3})O_2$. The invention can also be paired with any other positive electrode active material.

In some embodiments, the negative or positive electrode conductive additive material may be, for example, at least one conductive material selected from the group consisting of graphite, carbon black, carbon fibers or metal fibers, carbon nano tubes, metal powder, conductive whiskers, conductive metal oxide, activated carbon or polyphenylene derivatives. More specifically, the negative or positive electrode conductive additive material may be at least one conductive material selected from the group consisting of natural graphite, artificial graphite, super-p, acetylene black, ketjen black, carbon nanotubes, carbon fibers or metal fibers, channel black, furnace black, lamp black, thermal black, denka black.

In some embodiments, the current collector is not limited to a particular type and may include those having high electrical conductivity without causing a chemical change in the corresponding battery, for example, stainless steel, copper, aluminum, nickel, titanium, sintered carbon, or aluminum or stainless steel treated with carbon, nickel, titanium and silver on the surface.

In some embodiments, the negative or positive electrode binder resin may include polymer for electrode commonly used in the technical field. Non-limiting examples of the binder resin may include, but are not limited to, polyvinylidene difluoride, polyvinylidene fluoride-co-hexafluoropropylene, styrene-butadiene rubber, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose.

In some embodiments, the positive electrode active material is preferably included in the positive electrode in an amount of 30 wt % or more based on 100 wt % of the positive electrode active material layer.

In some embodiments, the negative or positive electrode active material layer may be obtained by adding the negative or positive electrode active material composite to an appropriate solvent to prepare a slurry and casting the slurry, or may be obtained by a manufacturing method according to a dry mixing process without a solvent.

In some embodiments, the method of manufacturing the negative or positive electrode active material layer by the dry mixing method may include, for example, one or more steps below.

First, the negative or positive electrode materials comprising the negative or positive electrode active material, the conductive material and the binder resin are put into a mixing device and mixed by a mechanical method to obtain a mixture. The mixing device includes any type of device that can form a comparatively homogeneous mixture phase such as a well-known mixer agitator, and is not limited to a particular type of device. Meanwhile, In some embodiments, to improve the dispersion of solids and induce the fibrous form of the binder resin in the mixing process, a temperature rising process may be included. In the temperature rising process, the temperature may be appropriately controlled in the range of about 30° C. to 100° C. Subsequently, the negative or positive electrode active material layer may be formed by extracting the mixture into the shape of an electrode (a wide film shape) using an extruder, and adjusting the thickness through a pressing process. The negative or positive electrode active material layer may be applied to the electrode with no current collector, or if necessary, the current collector may be attached to the obtained negative or positive electrode active material layer.

In some embodiments, the sodium secondary battery according to the present disclosure may be manufactured, for example, by the following method. As described above, the negative electrode, and the positive electrode are prepared, or ether-based liquid electrolyte-soaked porous separator is sandwiched between them.

In some embodiments, the battery according to the present disclosure may have the NP ratio ranging from 0.1 to 30. Within the above-described range of NP ratio, stable and constant electrical and chemical properties are provided. The NP ratio may range, for example, from 0.5 to 10, from 0.8 to 10, from 1.0 to 10, or from 1.0 to 5, and the NP ratio ranging from 1.0 to 1.5 is advantageous in terms of battery energy density.

In some embodiments, The secondary battery according to the present disclosure comprises of ether-based organic solvents mainly containing C—O carbon single bonded to oxygen, in the absence of any C=O carbon double bonded to oxygen, the solvent does not contain and sulfur, benzene ring, phosphates, double or triple bonded carbon C=C/C≡C, or halogen containing functional groups. The negative electrode contains tin (Sn) as an active material in an amount of 1 wt % or more, based on 100 wt % of the negative electrode active material layer. The ether-based electrolyte with the described properties are necessary to enable long term, high rate and stable reversibility of the high energy tin (Sn) anode. As a result, the sodium secondary battery according to the present disclosure can achieve a high energy density, address the capacity degradation and cycle life reduction problems occurring when conventional carbonate-based electrolytes are used.

NON-LIMITING EMBODIMENTS

The present disclosure is also described by way of the following non-limiting embodiment. However, the use of these and other embodiments anywhere in the specification is illustrative only and in no way limits the scope and meaning of the disclosure. Likewise, the disclosure is not limited to any particular preferred embodiment or aspect described herein. Indeed, modifications and variations may be apparent to those skilled in the art upon reading this specification, and such variations can be made without departing from the disclosure in spirit or in scope.

1. A sodium secondary battery comprising a negative electrode, a positive electrode and an electrolyte including a compound having a chemical structure including an oxygen molecule covalently bound to R1 and R2 groups (R1-O—R2), wherein each of R1 and R2 is an alkyl group or an aryl group,
wherein the negative electrode includes a plurality of tin (Sn) particles,
wherein the plurality of Sn particles has an average particle size equal to or larger than about 1.3 μm.
2. The sodium secondary battery according to Embodiment 1, wherein the negative electrode includes:
a negative electrode material layer, and
a negative electrode active material layer,
wherein the negative electrode material layer and the negative electrode active material layer include the plurality of Sn particles,
wherein the plurality of Sn particles has an average particle size of from about 1.5 μm to about 200 μm.
3. The sodium secondary battery of Embodiment 2, wherein the plurality of Sn particles has an average particle diameter of from about 2 μm to about 150 μm.
4. The sodium secondary battery of Embodiment 2, wherein the plurality of Sn particles has an average particle diameter of from about 2 μm to about 120 μm.
5. The sodium secondary battery of Embodiment 2, wherein the plurality of Sn particles has an average particle diameter of from about 2 μm to about 100 μm.
6. The sodium secondary battery of Embodiment 2, wherein the plurality of Sn particles has an average particle diameter of from about 2 μm to about 90 μm.
7. The sodium secondary battery of Embodiment 2, wherein the plurality of Sn particles has an average particle diameter of from about 2 μm to about 80 μm.
8. The sodium secondary battery of Embodiment 2, wherein the plurality of Sn particles has an average particle diameter of from about 2 μm to about 75 μm.
9. The sodium secondary battery of Embodiment 2, wherein the plurality of Sn particles has an average particle diameter of from about 2 μm to about 70 μm.
10. The sodium secondary battery of Embodiment 2, wherein the plurality of Sn particles has an average particle diameter of from about 3 μm to about 200 μm.
11. The sodium secondary battery of Embodiment 2, wherein the plurality of Sn particles has an average particle diameter of from about 3 μm to about 150 μm.
12. The sodium secondary battery of Embodiment 2, wherein the plurality of Sn particles has an average particle diameter of from about 3 μm to about 120 μm.
13. The sodium secondary battery of Embodiment 2, wherein the plurality of Sn particles has an average particle diameter of from about 3 μm to about 100 μm.
14. The sodium secondary battery of Embodiment 2, wherein the plurality of Sn particles has an average particle diameter of from about 3 μm to about 90 μm.
15. The sodium secondary battery of Embodiment 2, wherein the plurality of Sn particles has an average particle diameter of from about 3 μm to about 80 μm.
16. The sodium secondary battery of Embodiment 2, wherein the plurality of Sn particles has an average particle diameter of from about 3 μm to about 75 μm.
17. The sodium secondary battery of Embodiment 2, wherein the plurality of Sn particles has an average particle diameter of from about 3 μm to about 70 μm.
18. The sodium secondary battery of Embodiment 2, wherein the plurality of Sn particles has an average particle diameter of from about 5 μm to about 70 μm.
19. The sodium secondary battery of Embodiment 2, wherein the plurality of Sn particles has an average particle diameter of from about 5 μm to about 70 μm.
20. The sodium secondary battery of Embodiment 2, wherein the plurality of Sn particles has an average particle diameter of from about 5 μm to about 65 μm.
21. The sodium secondary battery of Embodiment 2, wherein the plurality of Sn particles has an average particle diameter of from about 5 μm to about 60 μm.
22. The sodium secondary battery of Embodiment 2, wherein the plurality of Sn particles has an average particle diameter of from about 5 μm to about 55 μm.
23. The sodium secondary battery of Embodiment 2, wherein the plurality of Sn particles has an average particle diameter of from about 5 μm to about 50 μm.
24. The sodium secondary battery of Embodiment 2, wherein the plurality of Sn particles has an average particle diameter of from about 2 μm to about 20 μm.
25. The sodium secondary battery of Embodiment 2, wherein the plurality of Sn particles has an average particle diameter of from about 2 μm to about 15 μm.
26. The sodium secondary battery of Embodiment 2, wherein the plurality of Sn particles has an average particle diameter of from about 3 μm to about 10 μm.

27. The sodium secondary battery of Embodiment 2, wherein the plurality of Sn particles has an average particle diameter of from about 4 μm to about 6 μm.
28. The sodium secondary battery of Embodiment 2, wherein the plurality of Sn particles has an average particle diameter of from about 20 μm to about 200 μm.
29. The sodium secondary battery of Embodiment 2, wherein the plurality of Sn particles has an average particle diameter of from about 20 μm to about 150 μm.
30. The sodium secondary battery of Embodiment 2, wherein the plurality of Sn particles has an average particle diameter of from about 25 μm to about 105 μm.
31. The sodium secondary battery of Embodiment 2, wherein the plurality of Sn particles has an average particle diameter of from about 30 μm to about 90 μm.
32. The sodium secondary battery of Embodiment 2, wherein the plurality of Sn particles has an average particle diameter of from about 35 μm to about 75 μm.
33. The sodium secondary battery of Embodiment 2, wherein the plurality of Sn particles has an average particle diameter of from about 40 μm to about 60 μm.
34. The sodium secondary battery of Embodiment 2, wherein the plurality of Sn particles has an average particle diameter of from about 45 μm to about 55 μm.
35. The sodium secondary battery according to Embodiment 2-34, wherein the negative electrode active material layer further comprises at least one other active material including hard carbon.
36. The sodium secondary battery according to Embodiment 2-35, wherein the negative electrode comprises a current collector, and the negative electrode active material layer is formed on at least one surface of the current collector.
37. The sodium secondary battery according to Embodiment 35-36, wherein the negative electrode active material layer may include the tin (Sn) in an amount of 1 wt % or more, based on 100 wt % of the negative electrode active material layer 38. The sodium secondary battery according to Embodiment 1-37, wherein the tin (Sn) containing negative electrode active material layer further comprises a binder resin, a conductive material or a solid electrolyte.
39. The sodium secondary battery of Embodiment 1-38, wherein the electrolyte is a liquid electrolyte.
40. The sodium secondary battery of Embodiment 1-39, wherein the R1 and R2 groups together form a ring.
41. The sodium secondary battery according to Embodiment 1-40, wherein the electrolyte comprises at least one selected from the following solvents, Dimethoxyethane (glyme), Diethylene glycol dimethyl ether (diglyme), Triethylene glycol dimethyl ether (triglyme), Ethylene glycol Ethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane.
42. The sodium secondary battery according to Embodiment 1-41, wherein the electrolyte comprises at least one solvent free of any C=O carbon double bonded to oxygen, sulfur, benzene ring, phosphates, double or triple bonded carbon C=C/C≡C, or halogen containing functional groups.
43. The sodium secondary battery according to Embodiment 1-42, wherein the electrolyte comprises $NaPF_6$, $NaBF_4$, $NaClO_4$, $NaCF_3SO_3$, sodium closo-borate salts, $NaCB_9H_{10}$, $NaCB_{11}H_{12}$, $Na_2B_{12}H_{12}$, $Na_2B_{10}H_{10}$, $Na[7\text{-}CB_{10}H_{13}]$, $Na[7,8\text{-}C_2B_9H_{12}]$, $Na[7,9\text{-}C_2B_9H_{12}]$, Sodium bis-(fluorosulfonyl)imide (NaFSI), Sodium trifluoro-methane-sulfonimide (NaTFSI), Sodium Bis (oxalato)borate (NaBOB), Sodium-difluoro(oxalato) borate (NaDFOB), or a combination thereof.
44. The sodium secondary battery according to Embodiment 1-43, wherein the total dissolved salt concentration in the electrolyte with respect to the total amount of solvents used in the electrolyte is from about 0.01 M to about 10.0 M.
45. The sodium secondary battery according to Embodiment 1-43, wherein the total dissolved salt concentration in the electrolyte with respect to the total amount of solvents used in the electrolyte is from about 0.03 M to about 9.0 M.
46. The sodium secondary battery according to Embodiment 1-43, wherein the total dissolved salt concentration in the electrolyte with respect to the total amount of solvents used in the electrolyte is from about 0.05 M to about 8.0 M.
47. The sodium secondary battery according to Embodiment 1-43, wherein the total dissolved salt concentration in the electrolyte with respect to the total amount of solvents used in the electrolyte is from about 0.1 M to about 7.0 M.
48. The sodium secondary battery according to Embodiment 1-43, wherein the total dissolved salt concentration in the electrolyte with respect to the total amount of solvents used in the electrolyte is from about 0.2 M to about 5.0 M.
49. The sodium secondary battery according to Embodiment 1-43, wherein the total dissolved salt concentration in the electrolyte with respect to the total amount of solvents used in the electrolyte is from about 0.3 M to about 4.0 M.
50. The sodium secondary battery according to Embodiment 1-43, wherein the total dissolved salt concentration in the electrolyte with respect to the total amount of solvents used in the electrolyte is from about 0.4 M to about 3.0 M.
51. The sodium secondary battery according to Embodiment 1-43, wherein the total dissolved salt concentration in the electrolyte with respect to the total amount of solvents used in the electrolyte is from about 0.5 M to about 2.0 M.
52. The sodium secondary battery according to Embodiment 1-43, wherein the total dissolved salt concentration in the electrolyte with respect to the total amount of solvents used in the electrolyte is from about 0.1 M to about 10.0 M.
53. The sodium secondary battery according to Embodiment 1-52, wherein the electrolyte exhibits an ionic conductivity of from about $10^{-5}$ mS cm$^{-1}$ to about $10^0$ mS cm$^{-1}$ at room temperature.
54. The sodium secondary battery according to Embodiment 1-52, wherein the electrolyte exhibits an ionic conductivity of from about $10^4$ mS cm$^{-1}$ to about $10^0$ mS cm$^{-1}$ at room temperature.
55. The sodium secondary battery according to Embodiment 1-52, wherein the electrolyte exhibits an ionic conductivity of from about $10^{-3}$ mS cm$^{-1}$ to about $10^0$ mS cm$^{-1}$ at room temperature.

56. The sodium secondary battery according to Embodiment 1-52, wherein the electrolyte exhibits an ionic conductivity of from about $10^{-2}$ mS cm$^{-1}$ to about $10^0$ mS cm$^{-1}$ at room temperature.
57. The sodium secondary battery according to Embodiment 1-52, wherein the electrolyte exhibits an ionic conductivity of from about $10^{-1}$ mS cm$^{-1}$ to about $10^0$ mS cm$^{-1}$ at room temperature.
58. The sodium secondary battery according to Embodiment 1-52, wherein the electrolyte exhibits an ionic conductivity of from about 0.18 mS cm$^{-1}$ to about 8 mS cm$^{-1}$ at room temperature.
59. The sodium secondary battery according to Embodiment 1-52, wherein the electrolyte exhibits an ionic conductivity of from about 1 mS cm$^{-1}$ to about 7 mS cm$^{-1}$ at room temperature.
60. The sodium secondary battery according to Embodiment 1-52, wherein the electrolyte exhibits an ionic conductivity of from about 2 mS cm$^{-1}$ to about 6 mS cm$^{-1}$ at room temperature.
61. The sodium secondary battery according to Embodiment 1-52, wherein the electrolyte exhibits an ionic conductivity of from about 2.5 mS cm$^{-1}$ to about 5 mS cm-1 at room temperature.
62. The sodium secondary battery according to Embodiment 1-61, wherein the electrolyte exhibits an ionic conductivity of from about $10^{-5}$ mS cm$^{-1}$ to about $10^0$ mS cm$^{-1}$ at below room temperature between about $-60°$ C. to about 20° C.
63. The sodium secondary battery according to Embodiment 1-61, wherein the electrolyte exhibits an ionic conductivity of from about $10^4$ mS cm$^{-1}$ to about $10^0$ mS cm$^{-1}$ at below room temperature between about $-60°$ C. to about 20° C.
64. The sodium secondary battery according to Embodiment 1-61, wherein the electrolyte exhibits an ionic conductivity of from about $10^{-3}$ mS cm$^{-1}$ to about $10^0$ mS cm$^{-1}$ at below room temperature between about $-60°$ C. to about 20° C.
65. The sodium secondary battery according to Embodiment 1-61, wherein the electrolyte exhibits an ionic conductivity of from about $10^{-2}$ mS cm$^{-1}$ to about $10^0$ mS cm$^{-1}$ at below room temperature between about $-60°$ C. to about 20° C.
66. The sodium secondary battery according to Embodiment 1-61, wherein the electrolyte exhibits an ionic conductivity of from about $10^{-1}$ mS cm$^{-1}$ to about $10^0$ mS cm$^{-1}$ at below room temperature between about $-60°$ C. to about 20° C.
67. The sodium secondary battery according to Embodiment 1-61, wherein the electrolyte exhibits an ionic conductivity of from about 0.18 mS cm$^{-1}$ to about 8 mS cm$^{-1}$ at below room temperature between about $-60°$ C. to about 20° C.
68. The sodium secondary battery according to Embodiment 1-61, wherein the electrolyte exhibits an ionic conductivity of from about 1 mS cm$^{-1}$ to about 7 mS cm$^{-1}$ at below room temperature between about $-60°$ C. to about 20° C.
69. The sodium secondary battery according to Embodiment 1-61, wherein the electrolyte exhibits an ionic conductivity of from about 2 mS cm$^{-1}$ to about 6 mS cm$^{-1}$ at below room temperature between about $-60°$ C. to about 20° C.
70. The sodium secondary battery according to Embodiment 1-61, wherein the electrolyte exhibits an ionic conductivity of from about 2.5 mS cm$^{-1}$ to about 5 mS cm$^{-1}$ at below room temperature between about $-60°$ C. to about 20° C.
71. The sodium secondary battery according to Embodiment 1-70, wherein the electrolyte exhibits an oxidative electrochemical stability window of more than about 3.0V vs Na/Na$^+$, based on the onset of the oxidative peak in the linear sweep voltammetry.
72. The sodium secondary battery according to Embodiment 1-70, wherein the electrolyte exhibits an oxidative electrochemical stability window of more than about 3.3 V vs Na/Na$^+$, based on the onset of the oxidative peak in the linear sweep voltammetry.
73. The sodium secondary battery according to Embodiment 1-70, wherein the electrolyte exhibits an oxidative electrochemical stability window of more than about 3.5 V vs Na/Na$^+$, based on the onset of the oxidative peak in the linear sweep voltammetry.
74. The sodium secondary battery according to Embodiment 1-70, wherein the electrolyte exhibits an oxidative electrochemical stability window of more than about 3.7 V vs Na/Na$^+$, based on the onset of the oxidative peak in the linear sweep voltammetry.
75. The sodium secondary battery according to Embodiment 1-70, wherein the electrolyte exhibits an oxidative electrochemical stability window of more than about 4.0 V vs Na/Na$^+$, based on the onset of the oxidative peak in the linear sweep voltammetry.
76. The sodium secondary battery according to Embodiment 1-70, wherein the electrolyte exhibits an oxidative electrochemical stability window of more than about 4.3 V vs Na/Na$^+$, based on the onset of the oxidative peak in the linear sweep voltammetry.
77. The sodium secondary battery according to Embodiment 1-70, wherein the electrolyte exhibits an oxidative electrochemical stability window of more than about 4.5 V vs Na/Na$^+$, based on the onset of the oxidative peak in the linear sweep voltammetry.
78. The sodium secondary battery according to Embodiment 1-70, wherein the electrolyte exhibits an oxidative electrochemical stability window of more than about 4.7 V vs Na/Na$^+$, based on the onset of the oxidative peak in the linear sweep voltammetry.
79. The sodium secondary battery according to Embodiment 1-70, wherein the electrolyte exhibits an oxidative electrochemical stability window of more than about 5.0 V vs Na/Na$^+$, based on the onset of the oxidative peak in the linear sweep voltammetry.
80. The sodium secondary battery according to Embodiment 1-79, wherein the electrolyte exhibits a reductive electrochemical stability window of less than about 2.5 V vs Na/Na$^+$, based on the onset of the reductive peak in the linear sweep voltammetry.
81. The sodium secondary battery according to Embodiment 1-79, wherein the electrolyte exhibits a reductive electrochemical stability window of less than about 2.3 V vs Na/Na$^+$, based on the onset of the reductive peak in the linear sweep voltammetry.
82. The sodium secondary battery according to Embodiment 1-79, wherein the electrolyte exhibits a reductive electrochemical stability window of less than about 2.0 V vs Na/Na$^+$, based on the onset of the reductive peak in the linear sweep voltammetry.
83. The sodium secondary battery according to Embodiment 1-79, wherein the electrolyte exhibits a reductive electrochemical stability window of less than about 1.7

V vs Na/Na$^+$, based on the onset of the reductive peak in the linear sweep voltammetry.
84. The sodium secondary battery according to Embodiment 1-79, wherein the electrolyte exhibits a reductive electrochemical stability window of less than about 1.5 V vs Na/Na$^+$, based on the onset of the reductive peak in the linear sweep voltammetry.
85. The sodium secondary battery according to Embodiment 1-79, wherein the electrolyte exhibits a reductive electrochemical stability window of less than about 1.2 V vs Na/Na$^+$, based on the onset of the reductive peak in the linear sweep voltammetry.
86. The sodium secondary battery according to Embodiment 1-79, wherein the electrolyte exhibits a reductive electrochemical stability window of less than about 1.0 V vs Na/Na$^+$, based on the onset of the reductive peak in the linear sweep voltammetry.
87. The sodium secondary battery according to Embodiment 1-79, wherein the electrolyte exhibits a reductive electrochemical stability window of less than about 0.8 V vs Na/Na$^+$, based on the onset of the reductive peak in the linear sweep voltammetry.
88. The sodium secondary battery according to Embodiment 1-79, wherein the electrolyte exhibits a reductive electrochemical stability window of less than about 0.7 V vs Na/Na$^+$, based on the onset of the reductive peak in the linear sweep voltammetry.
89. The sodium secondary battery according to Embodiment 1-79, wherein the electrolyte exhibits a reductive electrochemical stability window of less than about 0.6 V vs Na/Na$^+$, based on the onset of the reductive peak in the linear sweep voltammetry.
90. The sodium secondary battery according to Embodiment 1-79, wherein the electrolyte exhibits a reductive electrochemical stability window of less than about 0.5 V vs Na/Na$^+$, based on the onset of the reductive peak in the linear sweep voltammetry.
91. The sodium secondary battery according to Embodiment 1-79, wherein the electrolyte exhibits a reductive electrochemical stability window of less than about 0.4 V vs Na/Na$^+$, based on the onset of the reductive peak in the linear sweep voltammetry.
92. The sodium secondary battery according to Embodiment 1-79, wherein the electrolyte exhibits a reductive electrochemical stability window of less than about 0.3 V vs Na/Na$^+$, based on the onset of the reductive peak in the linear sweep voltammetry.
93. The sodium secondary battery according to Embodiment 1-79, wherein the electrolyte exhibits a reductive electrochemical stability window of less than about 0.2 V vs Na/Na$^+$, based on the onset of the reductive peak in the linear sweep voltammetry.
94. The sodium secondary battery according to Embodiment 1-79, wherein the electrolyte exhibits a reductive electrochemical stability window of less than about 0.1 V vs Na/Na$^+$, based on the onset of the reductive peak in the linear sweep voltammetry.
95. The sodium secondary battery according to Embodiment 1-79, wherein the electrolyte exhibits a reductive electrochemical stability window of less than about 0.05 V vs Na/Na$^+$, based on the onset of the reductive peak in the linear sweep voltammetry.
96. The sodium secondary battery according to Embodiment 1-79, wherein the electrolyte exhibits a reductive electrochemical stability window of less than about 0.03 V vs Na/Na$^+$, based on the onset of the reductive peak in the linear sweep voltammetry.
97. The sodium secondary battery according to Embodiment 1-79, wherein the electrolyte exhibits a reductive electrochemical stability window of less than about 0.01 V vs Na/Na$^+$, based on the onset of the reductive peak in the linear sweep voltammetry.
98. The sodium secondary battery according to Embodiment 1-79, wherein the electrolyte exhibits a reductive electrochemical stability window of less than about 0.001 V vs Na/Na$^+$, based on the onset of the reductive peak in the linear sweep voltammetry.
99. The sodium secondary battery according to Embodiment 1-98, wherein the positive electrode comprises a positive electrode active material layer, the positive electrode active material layer comprises sodium transition metal oxide, sodium transition metal polyanionic oxide, sodium transition metal phosphate, or sodium ferrocyanide as a positive electrode active material, and the transition metal in the sodium transition metal oxide, sodium transition metal phosphate, or the sodium transition metal polyanionic oxide comprises Ni, Cr, Mn, Fe, V, or a combination thereof.
100. The sodium secondary battery according to Embodiment 99, wherein the positive electrode active material layer further comprises a binder resin, a conductive material, a solid electrolyte, or a combination thereof.
101. The sodium secondary battery according to Embodiment 100, wherein the negative or positive electrode active material layer is obtained using the negative or positive electrode active material, the conductive material and the binder resin by a manufacturing method according to a dry mixing process without a solvent.
102. The sodium secondary battery according to Embodiment 1-101, wherein the battery has an N/P ratio of 0.1 to 30.0.
103. The battery of Embodiment 1-102, wherein the battery has a Coulombic efficiency of at least 60%, preferably at least 90%, more preferably at least 95%, more preferably at least 100% for the first 80 cycles.
104. The battery of Embodiment 1-102, wherein the battery has a Coulombic efficiency of at least 60%, preferably at least 90%, and more preferably at least 95% for the first 70 cycles.
105. The battery of Embodiment 1-102, wherein the battery has a Coulombic efficiency of at least 60%, preferably at least 90%, and more preferably at least 95% for the first 60 cycles.
106. The battery of Embodiment 1-102, wherein the battery has a Coulombic efficiency of at least 60%, preferably at least 90%, and more preferably at least 95% for the first 50 cycles.
107. The battery of Embodiment 1-102, wherein the battery has a Coulombic efficiency of at least 60%, preferably at least 90%, and more preferably at least 95% for the first 40 cycles.
108. The battery of Embodiment 1-102, wherein the battery has a Coulombic efficiency of at least 60%, preferably at least 90%, and more preferably at least 95% for the first 30 cycles.
109. The battery of Embodiment 1-102, wherein the battery has a Coulombic efficiency of at least 60%, preferably at least 90%, and more preferably at least 95% for the first 3 cycles.
110. The battery of Embodiment 1-102, wherein the battery has a Coulombic efficiency of at least 60%, preferably at least 90%, and more preferably at least 95% for the first cycle.

111. An electrolyte for a sodium secondary battery, comprising:
a compound having a chemical structure including an oxygen molecule covalently bound to R1 and R2 groups (R1-O—R2), wherein each of R1 and R2 is an alkyl group or an aryl group,
wherein the electrolyte comprises at least one selected from the following solvents, Dimethoxyethane (glyme), Triethylene glycol dimethyl ether (triglyme), Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, 2-Methyltetrahydrofuran, 3-Methyltetrahydrofuran, Oxacyclohexane, Oxacyclopropane, 1,3-Dioxolane, 1,4 Dioxane, Trioxane.

112. The electrolyte of Embodiment 111, wherein the electrolyte is a liquid electrolyte.

113. The electrolyte of Embodiment 111-112, wherein the R1 and R2 groups together form a ring.

114. The electrolyte according to Embodiment 111-113, wherein the electrolyte comprises at least one solvent free of any C=O carbon double bonded to oxygen, sulfur, benzene ring, phosphates, double or triple bonded carbon C=C/C≡C, or halogen containing functional groups.

115. The electrolyte according to Embodiment 111-114, wherein the electrolyte comprises $NaPF_6$, $NaBF_4$, $NaClO_4$, $NaCF_3SO_3$, sodium closo-borate salts, $NaCB_9H_{10}$, $NaCB_{11}H_{12}$, $Na_2B_{12}H_{12}$, $Na_2B_{10}H_{10}$, $Na[7-CB_{10}H_{13}]$, $Na[7,8-C_2B_9H_{12}]$, $Na[7,9-C_2B_9H_{12}]$, Sodium bis-(fluorosulfonyl)imide (NaFSI), Sodium trifluoro-methane-sulfonimide (NaTFSI), Sodium Bis (oxalato)borate (NaBOB), Sodium-difluoro(oxalato) borate (NaDFOB), or a combination thereof.

116. The electrolyte according to Embodiment 111-115, wherein the total dissolved salt concentration in the electrolyte with respect to the total amount of solvents used in the electrolyte is from about 0.01 M to about 10.0 M.

117. The electrolyte according to Embodiment 111-115, wherein the total dissolved salt concentration in the electrolyte with respect to the total amount of solvents used in the electrolyte is from about 0.03 M to about 9.0 M.

118. The electrolyte according to Embodiment 111-115, wherein the total dissolved salt concentration in the electrolyte with respect to the total amount of solvents used in the electrolyte is from about 0.05 M to about 8.0 M.

119. The electrolyte according to Embodiment 111-115, wherein the total dissolved salt concentration in the electrolyte with respect to the total amount of solvents used in the electrolyte is from about 0.1 M to about 7.0 M.

120. The electrolyte according to Embodiment 111-115, wherein the total dissolved salt concentration in the electrolyte with respect to the total amount of solvents used in the electrolyte is from about 0.2 M to about 5.0 M.

121. The electrolyte according to Embodiment 111-115, wherein the total dissolved salt concentration in the electrolyte with respect to the total amount of solvents used in the electrolyte is from about 0.3 M to about 4.0 M.

122. The electrolyte according to Embodiment 111-115, wherein the total dissolved salt concentration in the electrolyte with respect to the total amount of solvents used in the electrolyte is from about 0.4 M to about 3.0 M.

123. The electrolyte according to Embodiment 111-115, wherein the total dissolved salt concentration in the electrolyte with respect to the total amount of solvents used in the electrolyte is from about 0.5 M to about 2.0 M.

124. The electrolyte according to Embodiment 111-115, wherein the total dissolved salt concentration in the electrolyte with respect to the total amount of solvents used in the electrolyte is from about 0.1 M to about 10 M.

125. The electrolyte according to Embodiment 111-124, wherein the electrolyte exhibits an ionic conductivity of from about $10^{-5}$ mS $cm^{-1}$ to about $10^0$ mS $cm^{-1}$ at room temperature.

126. The electrolyte according to Embodiment 111-124, wherein the electrolyte exhibits an ionic conductivity of from about $10^4$ mS $cm^{-1}$ to about $10^0$ mS $cm^{-1}$ at room temperature.

127. The electrolyte according to Embodiment 111-124, wherein the electrolyte exhibits an ionic conductivity of from about $10^{-3}$ mS $cm^{-1}$ to about $10^0$ mS $cm^{-1}$ at room temperature.

128. The electrolyte according to Embodiment 111-124, wherein the electrolyte exhibits an ionic conductivity of from about $10^{-2}$ mS $cm^{-1}$ to about $10^0$ mS $cm^{-1}$ at room temperature.

129. The electrolyte according to Embodiment 111-124, wherein the electrolyte exhibits an ionic conductivity of from about $10^{-1}$ mS $cm^{-1}$ to about $10^0$ mS $cm^{-1}$ at room temperature.

130. The electrolyte according to Embodiment 111-124, wherein the electrolyte exhibits an ionic conductivity of from about 0.18 mS $cm^{-1}$ to about 8 mS $cm^{-1}$ at room temperature.

131. The electrolyte according to Embodiment 111-124, wherein the electrolyte exhibits an ionic conductivity of from about 1 mS $cm^{-1}$ to about 7 mS $cm^{-1}$ at room temperature.

132. The electrolyte according to Embodiment 111-124, wherein the electrolyte exhibits an ionic conductivity of from about 2 mS $cm^{-1}$ to about 6 mS $cm^{-1}$ at room temperature.

133. The electrolyte according to Embodiment 111-124, wherein the electrolyte exhibits an ionic conductivity of from about 2.5 mS $cm^{-1}$ to about 5 mS $cm^{-1}$ at room temperature.

134. The electrolyte according to Embodiment 111-133, wherein the electrolyte exhibits an ionic conductivity of from about $10^{-5}$ mS $cm^{-1}$ to about $10^0$ mS $cm^{-1}$ at below room temperature between about −60° C. to about 20° C.

135. The electrolyte according to Embodiment 111-133, wherein the electrolyte exhibits an ionic conductivity of from about $10^{-4}$ mS $cm^{-1}$ to about $10^0$ mS $cm^{-1}$ at below room temperature between about −60° C. to about 20° C.

136. The electrolyte according to Embodiment 111-133, wherein the electrolyte exhibits an ionic conductivity of from about $10^{-3}$ mS $cm^{-1}$ to about $10^0$ mS $cm^{-1}$ at below room temperature between about −60° C. to about 20° C.

137. The electrolyte according to Embodiment 111-133, wherein the electrolyte exhibits an ionic conductivity of from about $10^{-2}$ mS cm$^{-1}$ to about $10^0$ mS cm$^{-1}$ at below room temperature between about −60° C. to about 20° C.

138. The electrolyte according to Embodiment 111-133, wherein the electrolyte exhibits an ionic conductivity of from about $10^{-1}$ mS cm$^{-1}$ to about $10^0$ mS cm$^{-1}$ at below room temperature between about −60° C. to about 20° C.

139. The electrolyte according to Embodiment 111-133, wherein the electrolyte exhibits an ionic conductivity of from about 0.18 mS cm$^{-1}$ to about 8 mS cm$^{-1}$ at below room temperature between about −60° C. to about 20° C.

140. The electrolyte according to Embodiment 111-133, wherein the electrolyte exhibits an ionic conductivity of from about 1 mS cm$^{-1}$ to about 7 mS cm$^{-1}$ at below room temperature between about −60° C. to about 20° C.

141. The electrolyte according to Embodiment 111-133, wherein the electrolyte exhibits an ionic conductivity of from about 2 mS cm$^{-1}$ to about 6 mS cm$^{-1}$ at below room temperature between about −60° C. to about 20° C.

142. The electrolyte according to Embodiment 111-133, wherein the electrolyte exhibits an ionic conductivity of from about 2.5 mS cm$^{-1}$ to about 5 mS cm$^{-1}$ at below room temperature between about −60° C. to about 20° C.

143. The electrolyte according to Embodiment 111-142, wherein the electrolyte exhibits an oxidative electrochemical stability window of more than about 3.0V vs Na/Na$^+$, based on the onset of the oxidative peak in the linear sweep voltammetry.

144. The electrolyte according to Embodiment 111-142, wherein the electrolyte exhibits an oxidative electrochemical stability window of more than about 3.3 V vs Na/Na$^+$, based on the onset of the oxidative peak in the linear sweep voltammetry.

145. The electrolyte according to Embodiment 111-142, wherein the electrolyte exhibits an oxidative electrochemical stability window of more than about 3.5 V vs Na/Na$^+$, based on the onset of the oxidative peak in the linear sweep voltammetry.

146. The electrolyte according to Embodiment 111-142, wherein the electrolyte exhibits an oxidative electrochemical stability window of more than about 3.7 V vs Na/Na$^+$, based on the onset of the oxidative peak in the linear sweep voltammetry.

147. The electrolyte according to Embodiment 111-142, wherein the electrolyte exhibits an oxidative electrochemical stability window of more than about 4.0 V vs Na/Na$^+$, based on the onset of the oxidative peak in the linear sweep voltammetry.

148. The electrolyte according to Embodiment 111-142, wherein the electrolyte exhibits an oxidative electrochemical stability window of more than about 4.3 V vs Na/Na$^+$, based on the onset of the oxidative peak in the linear sweep voltammetry.

149. The electrolyte according to Embodiment 111-142, wherein the electrolyte exhibits an oxidative electrochemical stability window of more than about 4.5 V vs Na/Na$^+$, based on the onset of the oxidative peak in the linear sweep voltammetry.

150. The electrolyte according to Embodiment 111-142, wherein the electrolyte exhibits an oxidative electrochemical stability window of more than about 4.7 V vs Na/Na$^+$, based on the onset of the oxidative peak in the linear sweep voltammetry.

151. The electrolyte according to Embodiment 111-142, wherein the electrolyte exhibits an oxidative electrochemical stability window of more than about 5.0 V vs Na/Na$^+$, based on the onset of the oxidative peak in the linear sweep voltammetry.

152. The electrolyte according to Embodiment 111-151, wherein the electrolyte exhibits a reductive electrochemical stability window of less than about 2.5 V vs Na/Na$^+$, based on the onset of the reductive peak in the linear sweep voltammetry.

153. The electrolyte according to Embodiment 111-151, wherein the electrolyte exhibits a reductive electrochemical stability window of less than about 2.3 V vs Na/Na$^+$, based on the onset of the reductive peak in the linear sweep voltammetry.

154. The electrolyte according to Embodiment 111-151, wherein the electrolyte exhibits a reductive electrochemical stability window of less than about 2.0 V vs Na/Na$^+$, based on the onset of the reductive peak in the linear sweep voltammetry.

155. The electrolyte according to Embodiment 111-151, wherein the electrolyte exhibits a reductive electrochemical stability window of less than about 1.7 V vs Na/Na$^+$, based on the onset of the reductive peak in the linear sweep voltammetry.

156. The electrolyte according to Embodiment 111-151, wherein the electrolyte exhibits a reductive electrochemical stability window of less than about 1.5 V vs Na/Na$^+$, based on the onset of the reductive peak in the linear sweep voltammetry.

157. The electrolyte according to Embodiment 111-151, wherein the electrolyte exhibits a reductive electrochemical stability window of less than about 1.2 V vs Na/Na$^+$, based on the onset of the reductive peak in the linear sweep voltammetry.

158. The electrolyte according to Embodiment 111-151, wherein the electrolyte exhibits a reductive electrochemical stability window of less than about 1.0 V vs Na/Na$^+$, based on the onset of the reductive peak in the linear sweep voltammetry.

159. The electrolyte according to Embodiment 111-151, wherein the electrolyte exhibits a reductive electrochemical stability window of less than about 0.8 V vs Na/Na$^+$, based on the onset of the reductive peak in the linear sweep voltammetry.

160. The electrolyte according to Embodiment 111-151, wherein the electrolyte exhibits a reductive electrochemical stability window of less than about 0.7 V vs Na/Na$^+$, based on the onset of the reductive peak in the linear sweep voltammetry.

161. The electrolyte according to Embodiment 111-151, wherein the electrolyte exhibits a reductive electrochemical stability window of less than about 0.6 V vs Na/Na$^+$, based on the onset of the reductive peak in the linear sweep voltammetry.

162. The electrolyte according to Embodiment 111-151, wherein the electrolyte exhibits a reductive electrochemical stability window of less than about 0.5 V vs Na/Na$^+$, based on the onset of the reductive peak in the linear sweep voltammetry.

163. The electrolyte according to Embodiment 111-151, wherein the electrolyte exhibits a reductive electrochemical stability window of less than about 0.4 V vs Na/Na$^+$, based on the onset of the reductive peak in the linear sweep voltammetry.

164. The electrolyte according to Embodiment 111-151, wherein the electrolyte exhibits a reductive electrochemical stability window of less than about 0.3 V vs Na/Na$^+$, based on the onset of the reductive peak in the linear sweep voltammetry.

165. The electrolyte according to Embodiment 111-151, wherein the electrolyte exhibits a reductive electrochemical stability window of less than about 0.2 V vs Na/Na$^+$, based on the onset of the reductive peak in the linear sweep voltammetry.

166. The electrolyte according to Embodiment 111-151, wherein the electrolyte exhibits a reductive electrochemical stability window of less than about 0.1 V vs Na/Na$^+$, based on the onset of the reductive peak in the linear sweep voltammetry.

167. The electrolyte according to Embodiment 111-151, wherein the electrolyte exhibits a reductive electrochemical stability window of less than about 0.05 V vs Na/Na$^+$, based on the onset of the reductive peak in the linear sweep voltammetry.

168. The electrolyte according to Embodiment 111-151, wherein the electrolyte exhibits a reductive electrochemical stability window of less than about 0.03 V vs Na/Na$^+$, based on the onset of the reductive peak in the linear sweep voltammetry.

169. The electrolyte according to Embodiment 111-151, wherein the electrolyte exhibits a reductive electrochemical stability window of less than about 0.01 V vs Na/Na$^+$, based on the onset of the reductive peak in the linear sweep voltammetry.

170. The electrolyte according to Embodiment 111-151, wherein the electrolyte exhibits a reductive electrochemical stability window of less than about 0.001 V vs Na/Na$^+$, based on the onset of the reductive peak in the linear sweep voltammetry.

171. An electrolyte for a sodium secondary battery, comprising:
a compound having a chemical structure including an oxygen molecule covalently bound to R1 and R2 groups (R1-O—R2), wherein each of R1 and R2 is an alkyl group or an aryl group,
wherein the electrolyte comprises NaBF$_4$, NaClO$_4$, NaCF$_3$SO$_3$, sodium closo-borate salts, NaCB$_9$H$_{10}$, NaCB$_{11}$H$_{12}$, Na$_2$B$_{12}$H$_{12}$, Na$_2$B$_{10}$H$_{10}$, Na[7-CB$_{10}$H$_{13}$], Na[7,8-C$_2$B$_9$H$_{12}$], Na[7,9-C$_2$B$_9$H$_{12}$], Sodium bis-(fluorosulfonyl)imide (NaFSI), Sodium trifluoro-methane-sulfonimide (NaTFSI), Sodium Bis(oxalato)borate (NaBOB), Sodium-difluoro(oxalato)borate (NaDFOB), or a combination thereof.

172. The electrolyte of Embodiment 171, wherein the electrolyte is a liquid electrolyte.

173. The electrolyte according to Embodiment 171-172, wherein the electrolyte is formed by dispersing the sodium salt in at least one solvent including the compound.

174. The electrolyte of Embodiment 171-173, wherein the R1 and R2 groups together form a ring.

175. The electrolyte according to Embodiment 171-174, wherein the electrolyte comprises at least one selected from the following solvents, Dimethoxyethane (glyme), Diethylene glycol dimethyl ether (diglyme), Triethylene glycol dimethyl ether (triglyme), Ethylene glycol Ethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane.

176. The electrolyte according to Embodiment 171-175, wherein the electrolyte comprises at least one solvent free of any C=O carbon double bonded to oxygen, sulfur, benzene ring, phosphates, double or triple bonded carbon C=C/C≡C, or halogen containing functional groups.

177. The electrolyte according to Embodiment 171-176, wherein the total dissolved salt concentration in the electrolyte with respect to the total amount of solvents used in the electrolyte is from about 0.01 M to about 10.0 M.

178. The electrolyte according to Embodiment 171-176, wherein the total dissolved salt concentration in the electrolyte with respect to the total amount of solvents used in the electrolyte is from about 0.03 M to about 9.0 M.

179. The electrolyte according to Embodiment 171-176, wherein the total dissolved salt concentration in the electrolyte with respect to the total amount of solvents used in the electrolyte is from about 0.05 M to about 8.0 M.

180. The electrolyte according to Embodiment 171-176, wherein the total dissolved salt concentration in the electrolyte with respect to the total amount of solvents used in the electrolyte is from about 0.1 M to about 7.0 M.

181. The electrolyte according to Embodiment 171-176, wherein the total dissolved salt concentration in the electrolyte with respect to the total amount of solvents used in the electrolyte is from about 0.2 M to about 5.0 M.

182. The electrolyte according to Embodiment 171-176, wherein the total dissolved salt concentration in the electrolyte with respect to the total amount of solvents used in the electrolyte is from about 0.3 M to about 4.0 M.

183. The electrolyte according to Embodiment 171-176, wherein the total dissolved salt concentration in the electrolyte with respect to the total amount of solvents used in the electrolyte is from about 0.4 M to about 3.0 M.

184. The electrolyte according to Embodiment 171-176, wherein the total dissolved salt concentration in the electrolyte with respect to the total amount of solvents used in the electrolyte is from about 0.5 M to about 2.0 M.

185. The electrolyte according to Embodiment 171-176, wherein the total dissolved salt concentration in the electrolyte with respect to the total amount of solvents used in the electrolyte is from about 0.1 M to about 10 M.

186. The electrolyte according to Embodiment 171-185, wherein the electrolyte exhibits an ionic conductivity of from about $10^{-5}$ mS cm$^{-1}$ to about $10^0$ mS cm$^{-1}$ at room temperature.

187. The electrolyte according to Embodiment 171-185, wherein the electrolyte exhibits an ionic conductivity of from about $10^4$ mS cm$^{-1}$ to about $10^0$ mS cm$^{-1}$ at room temperature.

188. The electrolyte according to Embodiment 171-185, wherein the electrolyte exhibits an ionic conductivity of from about $10^{-3}$ mS cm$^{-1}$ to about $10^0$ mS cm$^{-1}$ at room temperature.

189. The electrolyte according to Embodiment 171-185, wherein the electrolyte exhibits an ionic conductivity of from about $10^{-2}$ mS cm$^{-1}$ to about $10^0$ mS cm$^{-1}$ at room temperature.

190. The electrolyte according to Embodiment 171-185, wherein the electrolyte exhibits an ionic conductivity of from about $10^{-1}$ mS cm$^{-1}$ to about $10^0$ mS cm$^{-1}$ at room temperature.

191. The electrolyte according to Embodiment 171-185, wherein the electrolyte exhibits an ionic conductivity of from about 0.18 mS cm$^{-1}$ to about 8 mS cm$^{-1}$ at room temperature.

192. The electrolyte according to Embodiment 171-185, wherein the electrolyte exhibits an ionic conductivity of from about 1 mS cm$^{-1}$ to about 7 mS cm$^{-1}$ at room temperature.

193. The electrolyte according to Embodiment 171-185, wherein the electrolyte exhibits an ionic conductivity of from about 2 mS cm$^{-1}$ to about 6 mS cm$^{-1}$ at room temperature.

194. The electrolyte according to Embodiment 171-185, wherein the electrolyte exhibits an ionic conductivity of from about 2.5 mS cm$^{-1}$ to about 5 mS cm$^{-1}$ at room temperature.

195. The electrolyte according to Embodiment 171-194, wherein the electrolyte exhibits an ionic conductivity of from about $10^{-5}$ mS cm$^{-1}$ to about $10^0$ mS cm$^{-1}$ at below room temperature between about −60° C. to about 20° C.

196. The electrolyte according to Embodiment 171-194, wherein the electrolyte exhibits an ionic conductivity of from about $10^{-4}$ mS cm$^{-1}$ to about $10^0$ mS cm$^{-1}$ at below room temperature between about −60° C. to about 20° C.

197. The electrolyte according to Embodiment 171-194, wherein the electrolyte exhibits an ionic conductivity of from about $10^{-3}$ mS cm$^{-1}$ to about $10^0$ mS cm$^{-1}$ at below room temperature between about −60° C. to about 20° C.

198. The electrolyte according to Embodiment 171-194, wherein the electrolyte exhibits an ionic conductivity of from about $10^{-2}$ mS cm$^{-1}$ to about $10^0$ mS cm$^{-1}$ at below room temperature between about −60° C. to about 20° C.

199. The electrolyte according to Embodiment 171-194, wherein the electrolyte exhibits an ionic conductivity of from about $10^{-1}$ mS cm$^{-1}$ to about $10^0$ mS cm$^{-1}$ at below room temperature between about −60° C. to about 20° C.

200. The electrolyte according to Embodiment 171-194, wherein the electrolyte exhibits an ionic conductivity of from about 0.18 mS cm$^{-1}$ to about 8 mS cm$^{-1}$ at below room temperature between about −60° C. to about 20° C.

201. The electrolyte according to Embodiment 171-194, wherein the electrolyte exhibits an ionic conductivity of from about 1 mS cm$^{-1}$ to about 7 mS cm$^{-1}$ at below room temperature between about −60° C. to about 20° C.

202. The electrolyte according to Embodiment 171-194, wherein the electrolyte exhibits an ionic conductivity of from about 2 mS cm$^{-1}$ to about 6 mS cm$^{-1}$ at below room temperature between about −60° C. to about 20° C.

203. The electrolyte according to Embodiment 171-194, wherein the electrolyte exhibits an ionic conductivity of from about 2.5 mS cm$^{-1}$ to about 5 mS cm$^{-1}$ at below room temperature between about −60° C. to about 20° C.

204. The electrolyte according to Embodiment 171-203, wherein the electrolyte exhibits an oxidative electrochemical stability window of more than about 3.0V vs Na/Na$^+$, based on the onset of the oxidative peak in the linear sweep voltammetry.

205. The electrolyte according to Embodiment 171-203, wherein the electrolyte exhibits an oxidative electrochemical stability window of more than about 3.3 V vs Na/Na$^+$, based on the onset of the oxidative peak in the linear sweep voltammetry.

206. The electrolyte according to Embodiment 171-203, wherein the electrolyte exhibits an oxidative electrochemical stability window of more than about 3.5 V vs Na/Na$^+$, based on the onset of the oxidative peak in the linear sweep voltammetry.

207. The electrolyte according to Embodiment 171-203, wherein the electrolyte exhibits an oxidative electrochemical stability window of more than about 3.7 V vs Na/Na$^+$, based on the onset of the oxidative peak in the linear sweep voltammetry.

208. The electrolyte according to Embodiment 171-203, wherein the electrolyte exhibits an oxidative electrochemical stability window of more than about 4.0 V vs Na/Na$^+$, based on the onset of the oxidative peak in the linear sweep voltammetry.

209. The electrolyte according to Embodiment 171-203, wherein the electrolyte exhibits an oxidative electrochemical stability window of more than about 4.3 V vs Na/Na$^+$, based on the onset of the oxidative peak in the linear sweep voltammetry.

210. The electrolyte according to Embodiment 171-203, wherein the electrolyte exhibits an oxidative electrochemical stability window of more than about 4.5 V vs Na/Na$^+$, based on the onset of the oxidative peak in the linear sweep voltammetry.

211. The electrolyte according to Embodiment 171-203, wherein the electrolyte exhibits an oxidative electrochemical stability window of more than about 4.7 V vs Na/Na$^+$, based on the onset of the oxidative peak in the linear sweep voltammetry.

212. The electrolyte according to Embodiment 171-203, wherein the electrolyte exhibits an oxidative electrochemical stability window of more than about 5.0 V vs Na/Na$^+$, based on the onset of the oxidative peak in the linear sweep voltammetry.

213. The electrolyte according to Embodiment 171-212, wherein the electrolyte exhibits a reductive electrochemical stability window of less than about 2.5 V vs Na/Na$^+$, based on the onset of the reductive peak in the linear sweep voltammetry.

214. The electrolyte according to Embodiment 171-212, wherein the electrolyte exhibits a reductive electrochemical stability window of less than about 2.3 V vs Na/Na$^+$, based on the onset of the reductive peak in the linear sweep voltammetry.

215. The electrolyte according to Embodiment 171-212, wherein the electrolyte exhibits a reductive electrochemical stability window of less than about 2.0 V vs Na/Na$^+$, based on the onset of the reductive peak in the linear sweep voltammetry.

216. The electrolyte according to Embodiment 171-212, wherein the electrolyte exhibits a reductive electrochemical stability window of less than about 1.7 V vs Na/Na$^+$, based on the onset of the reductive peak in the linear sweep voltammetry.

217. The electrolyte according to Embodiment 171-212, wherein the electrolyte exhibits a reductive electrochemical stability window of less than about 1.5 V vs Na/Na$^+$, based on the onset of the reductive peak in the linear sweep voltammetry.

218. The electrolyte according to Embodiment 171-212, wherein the electrolyte exhibits a reductive electrochemical stability window of less than about 1.2 V vs Na/Na$^+$, based on the onset of the reductive peak in the linear sweep voltammetry.

219. The electrolyte according to Embodiment 171-212, wherein the electrolyte exhibits a reductive electrochemical stability window of less than about 1.0 V vs Na/Na$^+$, based on the onset of the reductive peak in the linear sweep voltammetry.

220. The electrolyte according to Embodiment 171-212, wherein the electrolyte exhibits a reductive electrochemical stability window of less than about 0.8 V vs Na/Na$^+$, based on the onset of the reductive peak in the linear sweep voltammetry.

221. The electrolyte according to Embodiment 171-212, wherein the electrolyte exhibits a reductive electrochemical stability window of less than about 0.7 V vs Na/Na$^+$, based on the onset of the reductive peak in the linear sweep voltammetry.

222. The electrolyte according to Embodiment 171-212, wherein the electrolyte exhibits a reductive electrochemical stability window of less than about 0.6 V vs Na/Na$^+$, based on the onset of the reductive peak in the linear sweep voltammetry.

223. The electrolyte according to Embodiment 171-212, wherein the electrolyte exhibits a reductive electrochemical stability window of less than about 0.5 V vs Na/Na$^+$, based on the onset of the reductive peak in the linear sweep voltammetry.

224. The electrolyte according to Embodiment 171-212, wherein the electrolyte exhibits a reductive electrochemical stability window of less than about 0.4 V vs Na/Na$^+$, based on the onset of the reductive peak in the linear sweep voltammetry.

225. The electrolyte according to Embodiment 171-212, wherein the electrolyte exhibits a reductive electrochemical stability window of less than about 0.3 V vs Na/Na$^+$, based on the onset of the reductive peak in the linear sweep voltammetry.

226. The electrolyte according to Embodiment 171-212, wherein the electrolyte exhibits a reductive electrochemical stability window of less than about 0.2 V vs Na/Na$^+$, based on the onset of the reductive peak in the linear sweep voltammetry.

227. The electrolyte according to Embodiment 171-212, wherein the electrolyte exhibits a reductive electrochemical stability window of less than about 0.1 V vs Na/Na$^+$, based on the onset of the reductive peak in the linear sweep voltammetry.

228. The electrolyte according to Embodiment 171-212, wherein the electrolyte exhibits a reductive electrochemical stability window of less than about 0.05 V vs Na/Na$^+$, based on the onset of the reductive peak in the linear sweep voltammetry.

229. The electrolyte according to Embodiment 171-212, wherein the electrolyte exhibits a reductive electrochemical stability window of less than about 0.03 V vs Na/Na$^+$, based on the onset of the reductive peak in the linear sweep voltammetry.

230. The electrolyte according to Embodiment 171-212, wherein the electrolyte exhibits a reductive electrochemical stability window of less than about 0.01 V vs Na/Na$^+$, based on the onset of the reductive peak in the linear sweep voltammetry.

231. The electrolyte according to Embodiment 171-212, wherein the electrolyte exhibits a reductive electrochemical stability window of less than about 0.001 V vs Na/Na$^+$, based on the onset of the reductive peak in the linear sweep voltammetry.

232. An electrolyte for a sodium secondary battery, comprising:
a compound having a chemical structure including an oxygen molecule covalently bound to R1 and R2 groups (R1-O—R2), wherein each of R1 and R2 is an alkyl group or an aryl group; and
a salt
wherein the total dissolved salt concentration in the electrolyte with respect to the total amount of solvents used in the electrolyte is from about 0.01 M to about 0.9 M or from about 1.1 M to about 10.0 M.

233. The electrolyte of Embodiment 232, wherein the electrolyte is a liquid electrolyte.

234. The electrolyte of Embodiment 232-233, wherein the R1 and R2 groups together form a ring.

235. The electrolyte according to Embodiment 232-234, wherein the electrolyte comprises at least one selected from the following solvents, Dimethoxyethane (glyme), Diethylene glycol dimethyl ether (diglyme), Triethylene glycol dimethyl ether (triglyme), Ethylene glycol Ethyl ether, Propyl ether, Butyl ether, Diphenyl ether, Dimethyl ether, Diethyl ether, Diisopropyl ether, Dibenzyl ether, Isoamyl ether, Diethlene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane.

236. The electrolyte according to Embodiment 232-235, wherein the electrolyte comprises at least one solvent free of any C=O carbon double bonded to oxygen, sulfur, benzene ring, phosphates, double or triple bonded carbon C=C/C≡C, or halogen containing functional groups.

237. The electrolyte according to Embodiment 232-236, wherein the electrolyte comprises NaPF$_6$, NaBF$_4$, NaClO$_4$, NaCF$_3$SO$_3$, sodium closo-borate salts, NaCB$_9$H$_{10}$, NaCB$_{11}$H$_{12}$, Na$_2$B$_{12}$H$_{12}$, Na$_2$B$_{10}$H$_{10}$, Na[7-CB$_{10}$H$_{13}$], Na[7,8-C$_2$B$_9$H$_{12}$], Na[7,9-C$_2$B$_9$H$_{12}$], Sodium bis-(fluorosulfonyl)imide (NaFSI), Sodium trifluoro-methane-sulfonimide (NaTFSI), Sodium Bis (oxalato)borate (NaBOB), Sodium-difluoro(oxalato) borate (NaDFOB), or a combination thereof.

238. The electrolyte according to Embodiment 232-237, wherein the total dissolved salt concentration in the electrolyte with respect to the total amount of solvents used in the electrolyte is from about 0.01 M to about 0.9 M.

239. The electrolyte according to Embodiment 232-237, wherein the total dissolved salt concentration in the electrolyte with respect to the total amount of solvents used in the electrolyte is from about 0.03 M to about 0.9 M.

240. The electrolyte according to Embodiment 232-237, wherein the total dissolved salt concentration in the electrolyte with respect to the total amount of solvents used in the electrolyte is from about 0.05 M to about 0.9 M.

241. The electrolyte according to Embodiment 232-237, wherein the total dissolved salt concentration in the electrolyte with respect to the total amount of solvents used in the electrolyte is from about 0.1 M to about 0.9 M.

242. The electrolyte according to Embodiment 232-237, wherein the total dissolved salt concentration in the electrolyte with respect to the total amount of solvents used in the electrolyte is from about 0.2 M to about 0.9 M.

243. The electrolyte according to Embodiment 232-237, wherein the total dissolved salt concentration in the electrolyte with respect to the total amount of solvents used in the electrolyte is from about 0.3 M to about 0.9 M.

244. The electrolyte according to Embodiment 232-237, wherein the total dissolved salt concentration in the electrolyte with respect to the total amount of solvents used in the electrolyte is from about 0.4 M to about 0.9 M.

245. The electrolyte according to Embodiment 232-237, wherein the total dissolved salt concentration in the electrolyte with respect to the total amount of solvents used in the electrolyte is from about 0.5 M to about 0.9 M.

246. The electrolyte according to Embodiment 232-237, wherein the total dissolved salt concentration in the electrolyte with respect to the total amount of solvents used in the electrolyte is from about 1.1 M to about 10.0 M.

247. The electrolyte according to Embodiment 232-237, wherein the total dissolved salt concentration in the electrolyte with respect to the total amount of solvents used in the electrolyte is from about 1.1 M to about 9.0 M.

248. The electrolyte according to Embodiment 232-237, wherein the total dissolved salt concentration in the electrolyte with respect to the total amount of solvents used in the electrolyte is from about 1.1 M to about 8.0 M.

249. The electrolyte according to Embodiment 232-237, wherein the total dissolved salt concentration in the electrolyte with respect to the total amount of solvents used in the electrolyte is from about 1.1 M to about 7.0 M.

250. The electrolyte according to Embodiment 232-237, wherein the total dissolved salt concentration in the electrolyte with respect to the total amount of solvents used in the electrolyte is from about 1.1 M to about 5.0 M.

251. The electrolyte according to Embodiment 232-237, wherein the total dissolved salt concentration in the electrolyte with respect to the total amount of solvents used in the electrolyte is from about 1.1 M to about 4.0 M.

252. The electrolyte according to Embodiment 232-237, wherein the total dissolved salt concentration in the electrolyte with respect to the total amount of solvents used in the electrolyte is from about 1.1 M to about 3.0 M.

253. The electrolyte according to Embodiment 232-237, wherein the total dissolved salt concentration in the electrolyte with respect to the total amount of solvents used in the electrolyte is from about 1.1 M to about 2.0 M.

254. The electrolyte according to Embodiment 232-253, wherein the electrolyte exhibits an ionic conductivity of from about $10^{-5}$ mS cm$^{-1}$ to about $10^0$ mS cm$^{-1}$ at room temperature.

255. The electrolyte according to Embodiment 232-253, wherein the electrolyte exhibits an ionic conductivity of from about $10^{-4}$ mS cm$^{-1}$ to about $10^0$ mS cm$^{-1}$ at room temperature.

256. The electrolyte according to Embodiment 232-253, wherein the electrolyte exhibits an ionic conductivity of from about $10^{-3}$ mS cm$^{-1}$ to about $10^0$ mS cm$^{-1}$ at room temperature.

257. The electrolyte according to Embodiment 232-253, wherein the electrolyte exhibits an ionic conductivity of from about $10^{-2}$ mS cm$^{-1}$ to about $10^0$ mS cm$^{-1}$ at room temperature.

258. The electrolyte according to Embodiment 232-253, wherein the electrolyte exhibits an ionic conductivity of from about $10^{-1}$ mS cm$^{-1}$ to about $10^0$ mS cm$^{-1}$ at room temperature.

259. The electrolyte according to Embodiment 232-253, wherein the electrolyte exhibits an ionic conductivity of from about 0.18 mS cm$^{-1}$ to about 8 mS cm$^{-1}$ at room temperature.

260. The electrolyte according to Embodiment 232-253, wherein the electrolyte exhibits an ionic conductivity of from about 1 mS cm$^{-1}$ to about 7 mS cm$^{-1}$ at room temperature.

261. The electrolyte according to Embodiment 232-253, wherein the electrolyte exhibits an ionic conductivity of from about 2 mS cm$^{-1}$ to about 6 mS cm$^{-1}$ at room temperature.

262. The electrolyte according to Embodiment 232-253, wherein the electrolyte exhibits an ionic conductivity of from about 2.5 mS cm$^{-1}$ to about 5 mS cm$^{-1}$ at room temperature.

263. The electrolyte according to Embodiment 232-262, wherein the electrolyte exhibits an ionic conductivity of from about $10^{-5}$ mS cm$^{-1}$ to about $10^0$ mS cm$^{-1}$ at below room temperature between about −60° C. to about 20° C.

264. The electrolyte according to Embodiment 232-262, wherein the electrolyte exhibits an ionic conductivity of from about $10^{-4}$ mS cm$^{-1}$ to about $10^0$ mS cm$^{-1}$ at below room temperature between about −60° C. to about 20° C.

265. The electrolyte according to Embodiment 232-262, wherein the electrolyte exhibits an ionic conductivity of from about $10^{-3}$ mS cm$^{-1}$ to about $10^0$ mS cm$^{-1}$ at below room temperature between about −60° C. to about 20° C.

266. The electrolyte according to Embodiment 232-262, wherein the electrolyte exhibits an ionic conductivity of from about $10^{-2}$ mS cm$^{-1}$ to about $10^0$ mS cm$^{-1}$ at below room temperature between about −60° C. to about 20° C.

267. The electrolyte according to Embodiment 232-262, wherein the electrolyte exhibits an ionic conductivity of from about $10^{-1}$ mS cm$^{-1}$ to about $10^0$ mS cm$^{-1}$ at below room temperature between about −60° C. to about 20° C.

268. The electrolyte according to Embodiment 232-262, wherein the electrolyte exhibits an ionic conductivity of from about 0.18 mS cm$^{-1}$ to about 8 mS cm$^{-1}$ at below room temperature between about −60° C. to about 20° C.

269. The electrolyte according to Embodiment 232-262, wherein the electrolyte exhibits an ionic conductivity of from about 1 mS cm$^{-1}$ to about 7 mS cm$^{-1}$ at below room temperature between about −60° C. to about 20° C.

270. The electrolyte according to Embodiment 232-262, wherein the electrolyte exhibits an ionic conductivity of from about 2 mS cm$^{-1}$ to about 6 mS cm$^{-1}$ at below room temperature between about −60° C. to about 20° C.

271. The electrolyte according to Embodiment 232-262, wherein the electrolyte exhibits an ionic conductivity of from about 2.5 mS cm$^{-1}$ to about 5 mS cm$^{-1}$ at below room temperature between about −60° C. to about 20° C.

272. The electrolyte according to Embodiment 232-271, wherein the electrolyte exhibits an oxidative electrochemical stability window of more than about 3.0 V vs Na/Na$^+$, based on the onset of the oxidative peak in the linear sweep voltammetry.

273. The electrolyte according to Embodiment 232-271, wherein the electrolyte exhibits an oxidative electrochemical stability window of more than about 3.3 V vs Na/Na$^+$, based on the onset of the oxidative peak in the linear sweep voltammetry.

274. The electrolyte according to Embodiment 232-271, wherein the electrolyte exhibits an oxidative electrochemical stability window of more than about 3.5 V vs Na/Na$^+$, based on the onset of the oxidative peak in the linear sweep voltammetry.

275. The electrolyte according to Embodiment 232-271, wherein the electrolyte exhibits an oxidative electrochemical stability window of more than about 3.7 V vs Na/Na$^+$, based on the onset of the oxidative peak in the linear sweep voltammetry.

276. The electrolyte according to Embodiment 232-271, wherein the electrolyte exhibits an oxidative electrochemical stability window of more than about 4.0 V vs Na/Na$^+$, based on the onset of the oxidative peak in the linear sweep voltammetry.

277. The electrolyte according to Embodiment 232-271, wherein the electrolyte exhibits an oxidative electrochemical stability window of more than about 4.3 V vs Na/Na$^+$, based on the onset of the oxidative peak in the linear sweep voltammetry.

278. The electrolyte according to Embodiment 232-271, wherein the electrolyte exhibits an oxidative electrochemical stability window of more than about 4.5 V vs Na/Na$^+$, based on the onset of the oxidative peak in the linear sweep voltammetry.

279. The electrolyte according to Embodiment 232-271, wherein the electrolyte exhibits an oxidative electrochemical stability window of more than about 4.7 V vs Na/Na$^+$, based on the onset of the oxidative peak in the linear sweep voltammetry.

280. The electrolyte according to Embodiment 232-271, wherein the electrolyte exhibits an oxidative electrochemical stability window of more than about 5.0 V vs Na/Na$^+$, based on the onset of the oxidative peak in the linear sweep voltammetry.

281. The electrolyte according to Embodiment 232-280, wherein the electrolyte exhibits a reductive electrochemical stability window of less than about 2.5 V vs Na/Na$^+$, based on the onset of the reductive peak in the linear sweep voltammetry.

282. The electrolyte according to Embodiment 232-280, wherein the electrolyte exhibits a reductive electrochemical stability window of less than about 2.3 V vs Na/Na$^+$, based on the onset of the reductive peak in the linear sweep voltammetry.

283. The electrolyte according to Embodiment 232-280, wherein the electrolyte exhibits a reductive electrochemical stability window of less than about 2.0 V vs Na/Na$^+$, based on the onset of the reductive peak in the linear sweep voltammetry.

284. The electrolyte according to Embodiment 232-280, wherein the electrolyte exhibits a reductive electrochemical stability window of less than about 1.7 V vs Na/Na$^+$, based on the onset of the reductive peak in the linear sweep voltammetry.

285. The electrolyte according to Embodiment 232-280, wherein the electrolyte exhibits a reductive electrochemical stability window of less than about 1.5 V vs Na/Na$^+$, based on the onset of the reductive peak in the linear sweep voltammetry.

286. The electrolyte according to Embodiment 232-280, wherein the electrolyte exhibits a reductive electrochemical stability window of less than about 1.2 V vs Na/Na$^+$, based on the onset of the reductive peak in the linear sweep voltammetry.

287. The electrolyte according to Embodiment 232-280, wherein the electrolyte exhibits a reductive electrochemical stability window of less than about 1.0 V vs Na/Na$^+$, based on the onset of the reductive peak in the linear sweep voltammetry.

288. The electrolyte according to Embodiment 232-280, wherein the electrolyte exhibits a reductive electrochemical stability window of less than about 0.8 V vs Na/Na$^+$, based on the onset of the reductive peak in the linear sweep voltammetry.

289. The electrolyte according to Embodiment 232-280, wherein the electrolyte exhibits a reductive electrochemical stability window of less than about 0.7 V vs Na/Na$^+$, based on the onset of the reductive peak in the linear sweep voltammetry.

290. The electrolyte according to Embodiment 232-280, wherein the electrolyte exhibits a reductive electrochemical stability window of less than about 0.6 V vs Na/Na$^+$, based on the onset of the reductive peak in the linear sweep voltammetry.

291. The electrolyte according to Embodiment 232-280, wherein the electrolyte exhibits a reductive electrochemical stability window of less than about 0.5 V vs Na/Na$^+$, based on the onset of the reductive peak in the linear sweep voltammetry.

292. The electrolyte according to Embodiment 232-280, wherein the electrolyte exhibits a reductive electrochemical stability window of less than about 0.4 V vs Na/Na$^+$, based on the onset of the reductive peak in the linear sweep voltammetry.

293. The electrolyte according to Embodiment 232-280, wherein the electrolyte exhibits a reductive electrochemical stability window of less than about 0.3 V vs Na/Na⁺, based on the onset of the reductive peak in the linear sweep voltammetry.

294. The electrolyte according to Embodiment 232-280, wherein the electrolyte exhibits a reductive electrochemical stability window of less than about 0.2 V vs Na/Na⁺, based on the onset of the reductive peak in the linear sweep voltammetry.

295. The electrolyte according to Embodiment 232-280, wherein the electrolyte exhibits a reductive electrochemical stability window of less than about 0.1 V vs Na/Na⁺, based on the onset of the reductive peak in the linear sweep voltammetry.

296. The electrolyte according to Embodiment 232-280, wherein the electrolyte exhibits a reductive electrochemical stability window of less than about 0.05 V vs Na/Na⁺, based on the onset of the reductive peak in the linear sweep voltammetry.

297. The electrolyte according to Embodiment 232-280, wherein the electrolyte exhibits a reductive electrochemical stability window of less than about 0.03 V vs Na/Na⁺, based on the onset of the reductive peak in the linear sweep voltammetry.

298. The electrolyte according to Embodiment 232-280, wherein the electrolyte exhibits a reductive electrochemical stability window of less than about 0.01 V vs Na/Na⁺, based on the onset of the reductive peak in the linear sweep voltammetry.

299. The electrolyte according to Embodiment 232-280, wherein the electrolyte exhibits a reductive electrochemical stability window of less than about 0.001 V vs Na/Na⁺, based on the onset of the reductive peak in the linear sweep voltammetry.

NON-LIMITING EXAMPLES

The following Examples are detailed by way of illustration only and are not to be construed as limiting in spirit or in scope, many modifications both in materials and in methods will be apparent to those skilled in the art.

Example 1—Conductivity

To demonstrate the conductivity of the disclosed electrolyte compound and composition, various example electrolyte compounds/compositions were evaluated.

FIG. 1 illustrates Na∥Na symmetric cell measurements of the ether based organic electrolyte type A at room temperature and a reference commercial carbonate-based electrolyte for comparison in some embodiments. FIG. 1 shows superior ionic conductivity of the ether based organic electrolyte resulting in a lower overpotential during Na plating and stripping.

Figure 2:
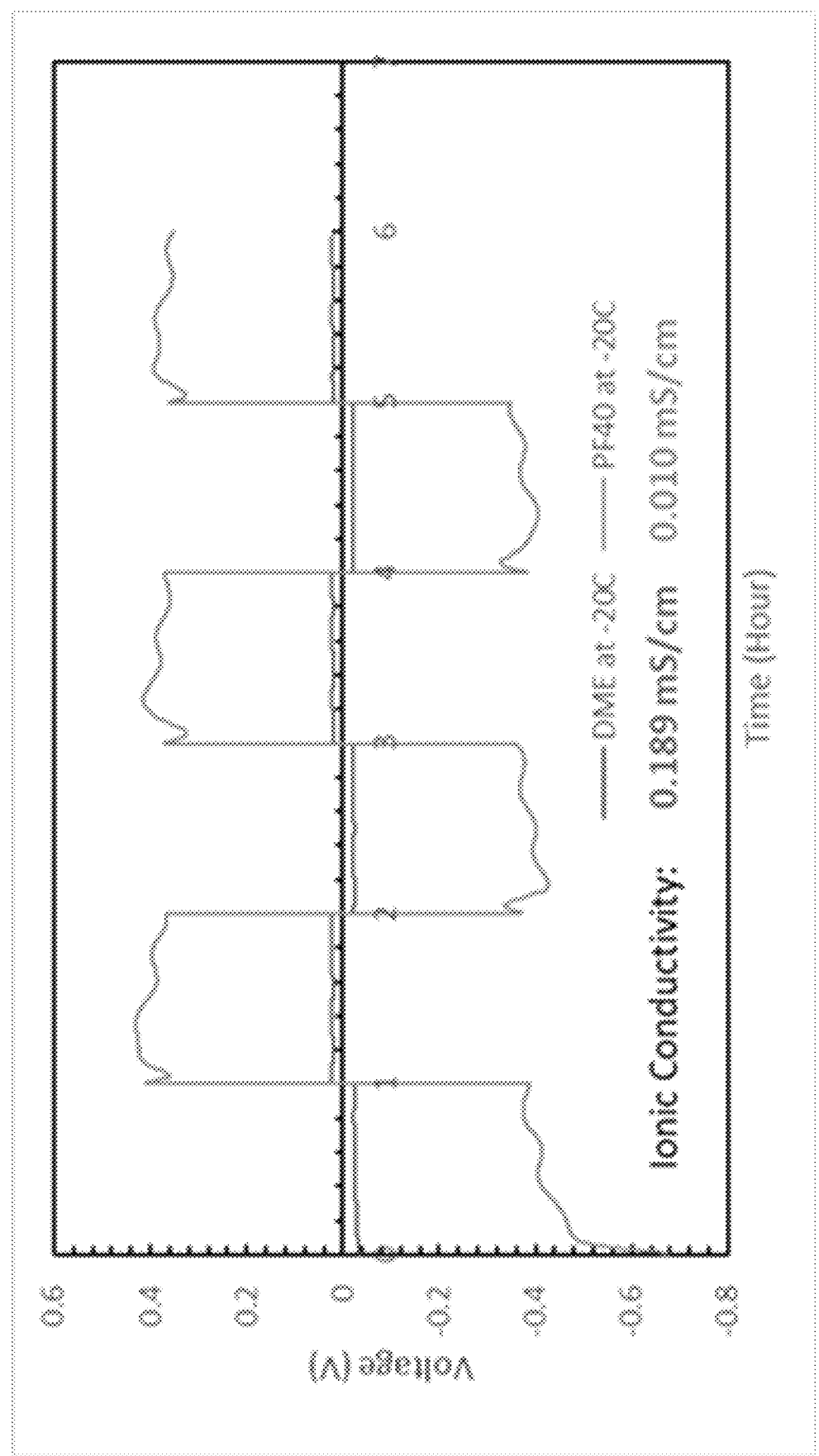
FIG. 2 illustrates Na||Na symmetric cell measurements of the ether based organic electrolyte type A at lower temperature of −20° C. and a reference commercial carbonate-based electrolyte for comparison. Showing superior ionic conductivity of the ether based organic electrolyte in some embodiments.

FIG. 2 illustrates Na∥Na symmetric cell measurements of the ether based organic electrolyte type A at lower temperature of −20° C. and a reference commercial carbonate-based electrolyte for comparison in some embodiments. FIG. 2 shows superior ionic conductivity of the ether based organic electrolyte, resulting in a lower overpotential during Na plating and stripping.

Figure 7:
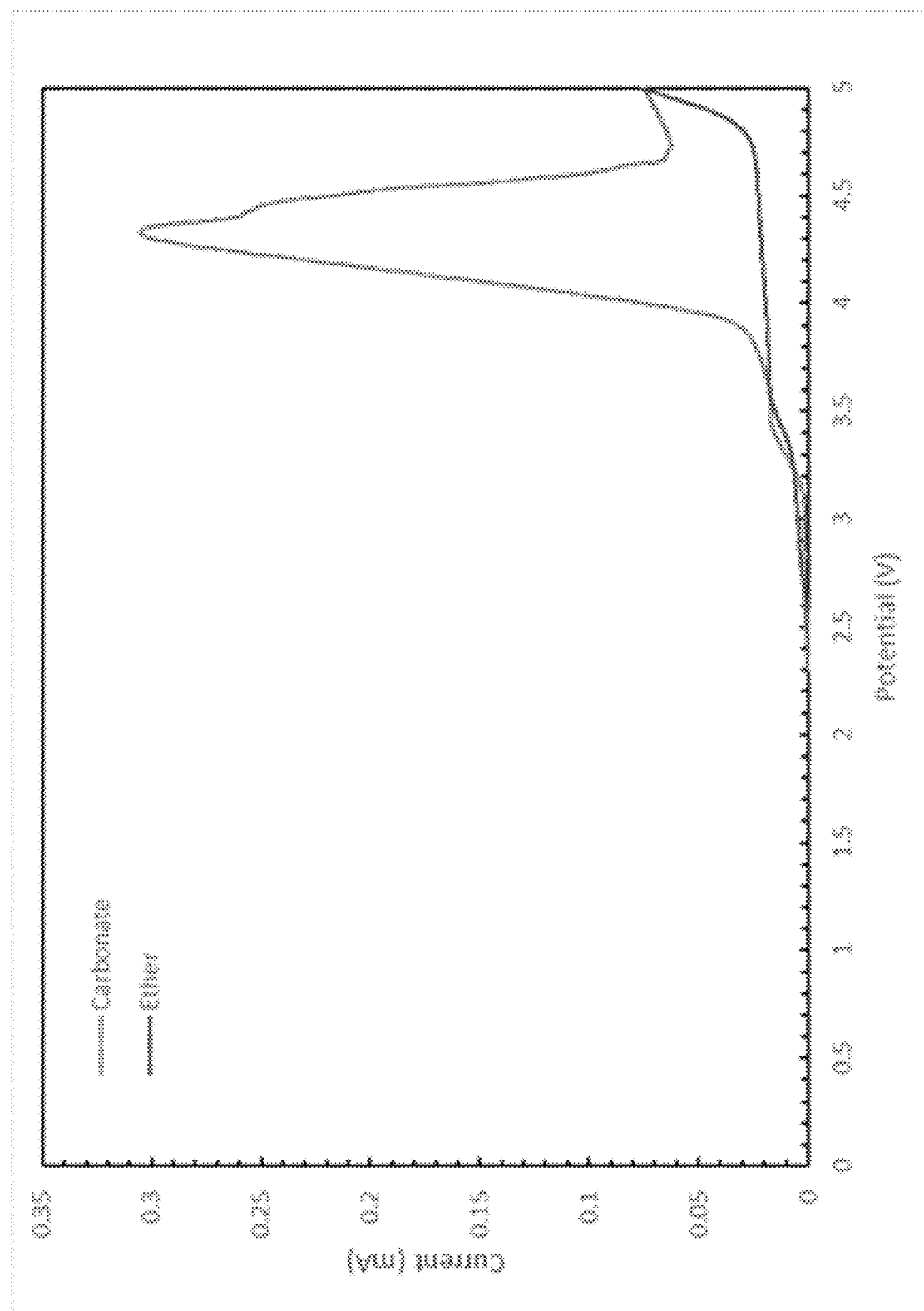
FIG. 7 shows the linear positive sweep of the ether based organic electrolyte type A vs the commercial carbonate-based electrolyte from open circuit voltage up to 5V in some embodiments.

FIG. 7 shows the linear positive sweep of the ether based organic electrolyte type A vs the commercial carbonate-based electrolyte from open circuit voltage up to 5V in some embodiments.

FIG. 7 shows a larger decomposition peak for the carbonate-based electrolyte.

Figure 8:
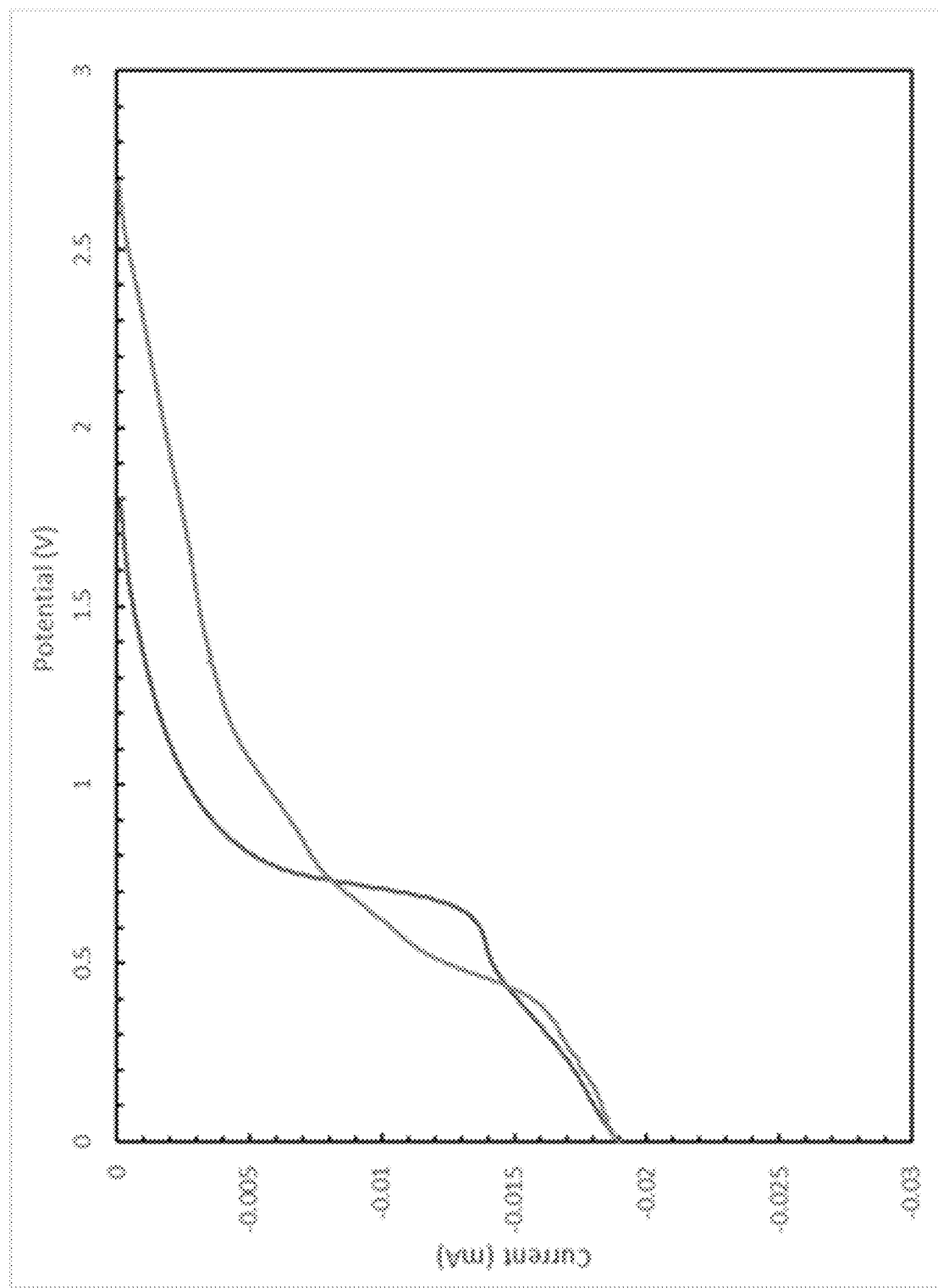
FIG. 8 shows the linear negative sweep of the ether based organic electrolyte type A vs the commercial carbonate-based electrolyte from open circuit voltage up to 0V in some embodiments.

FIG. 8 shows the linear negative sweep of the ether based organic electrolyte type A vs the commercial carbonate-based electrolyte from open circuit voltage up to 0V in some embodiments.

FIG. 8 shows a similar decomposition peak for both electrolytes.

Example 2—Rate Performance

To demonstrate the rate performance of the disclosed battery, an example battery using the disclosed compound/composition was evaluated against a reference battery using a known. electrolyte compound/composition.

Figure 3:
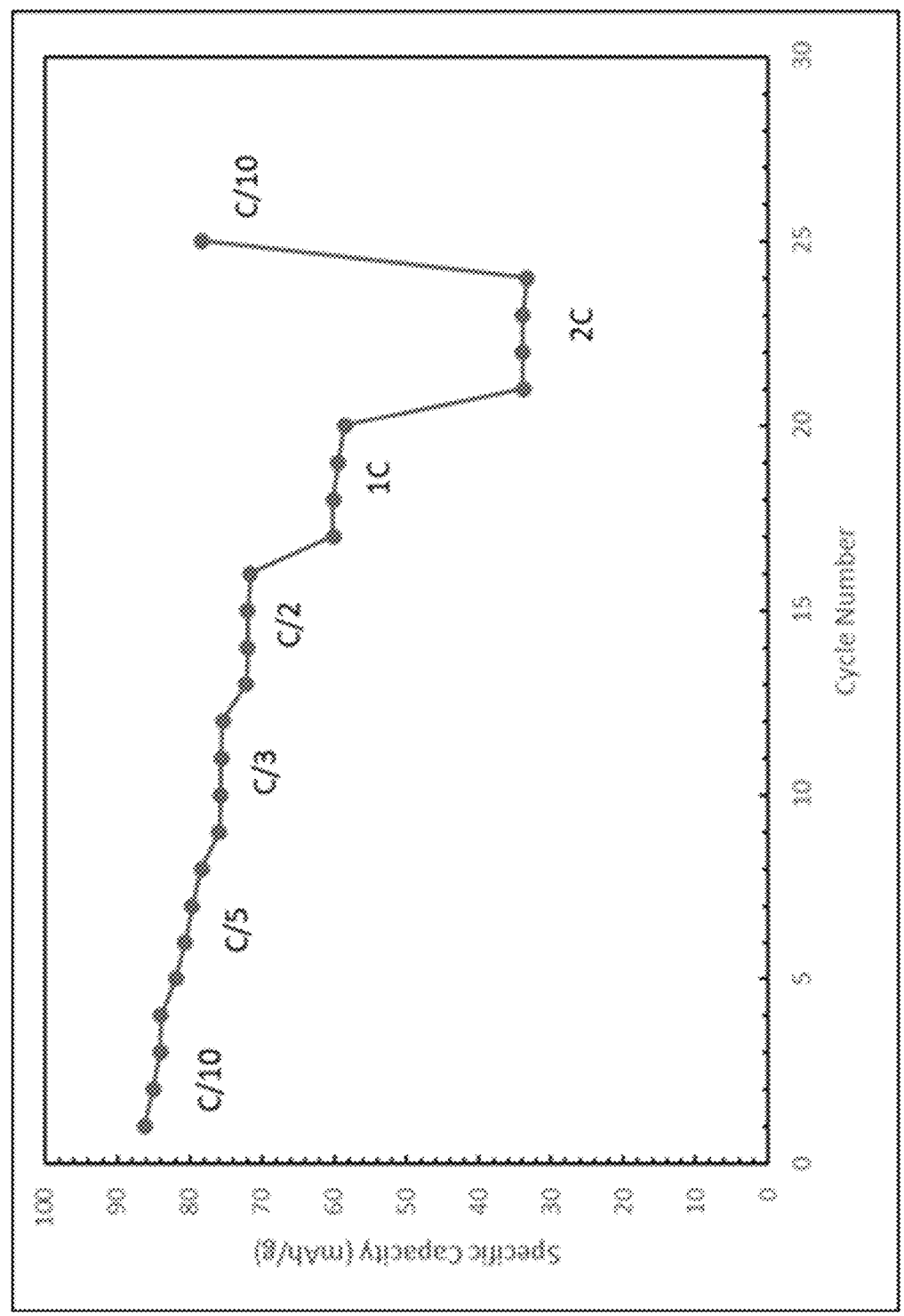
FIG. 3 shows the rate tests of the sodium ion battery full cell at various charge rates while keeping the discharge rate at C/3 fixed using the ether based organic electrolyte type A in some embodiments.

FIG. 3 shows the rate tests of the sodium ion battery full cell at various charge rates while keeping the discharge rate at C/3 fixed using the ether based organic electrolyte type A in some embodiments. FIG. 3 shows good rate capability achieved.

Figure 4:
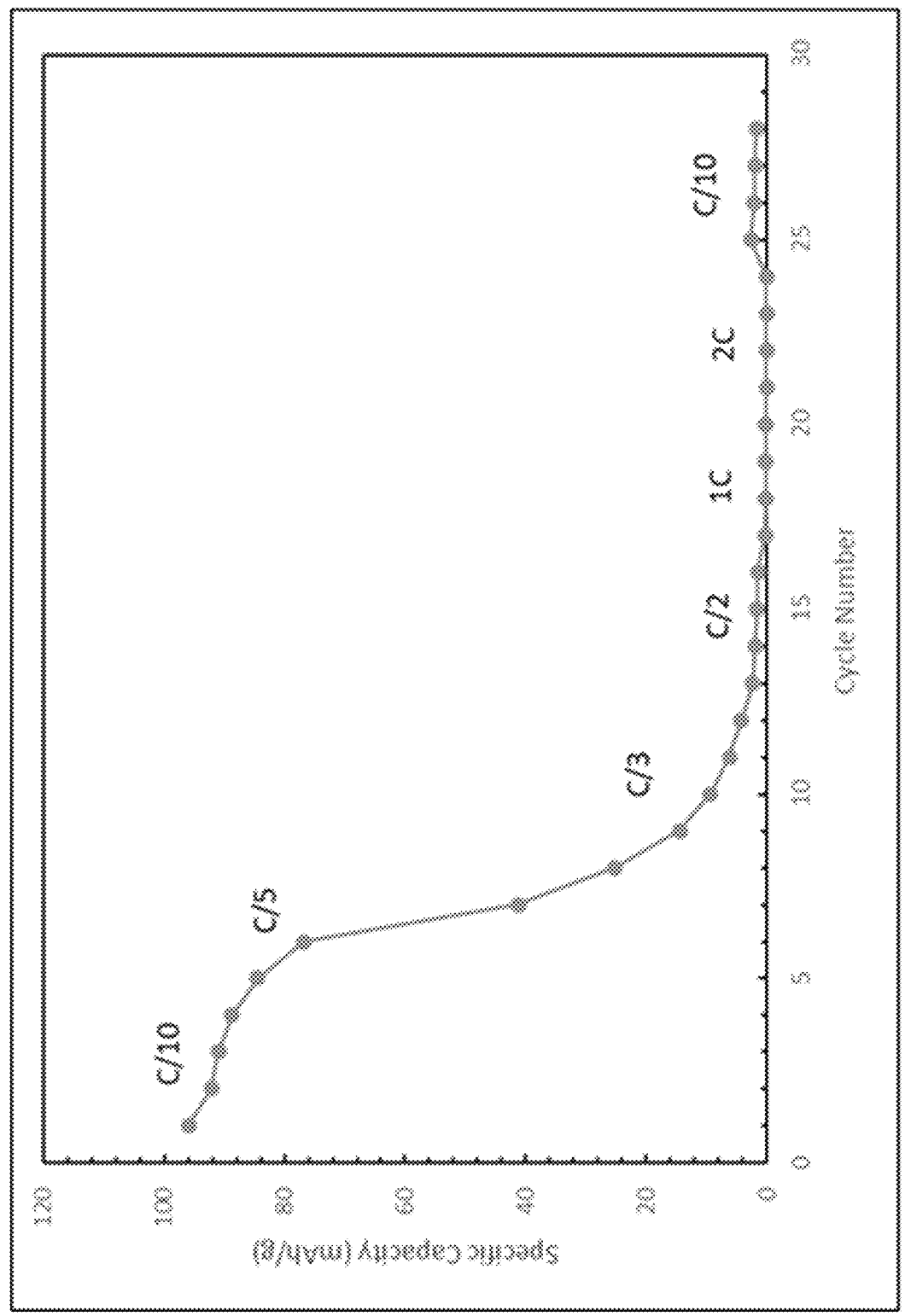
FIG. 4 shows the rate tests of the sodium ion battery full cell at various charge rates while keeping the discharge rate at C/3 fixed using the commercial carbonate-based electrolyte in some embodiments.

FIG. 4 shows the rate tests of the sodium ion battery full cell at various charge rates while keeping the discharge rate at C/3 fixed using the commercial carbonate-based electrolyte in some embodiments. FIG. 4 shows poor rate capability achieved.

Figure 5:
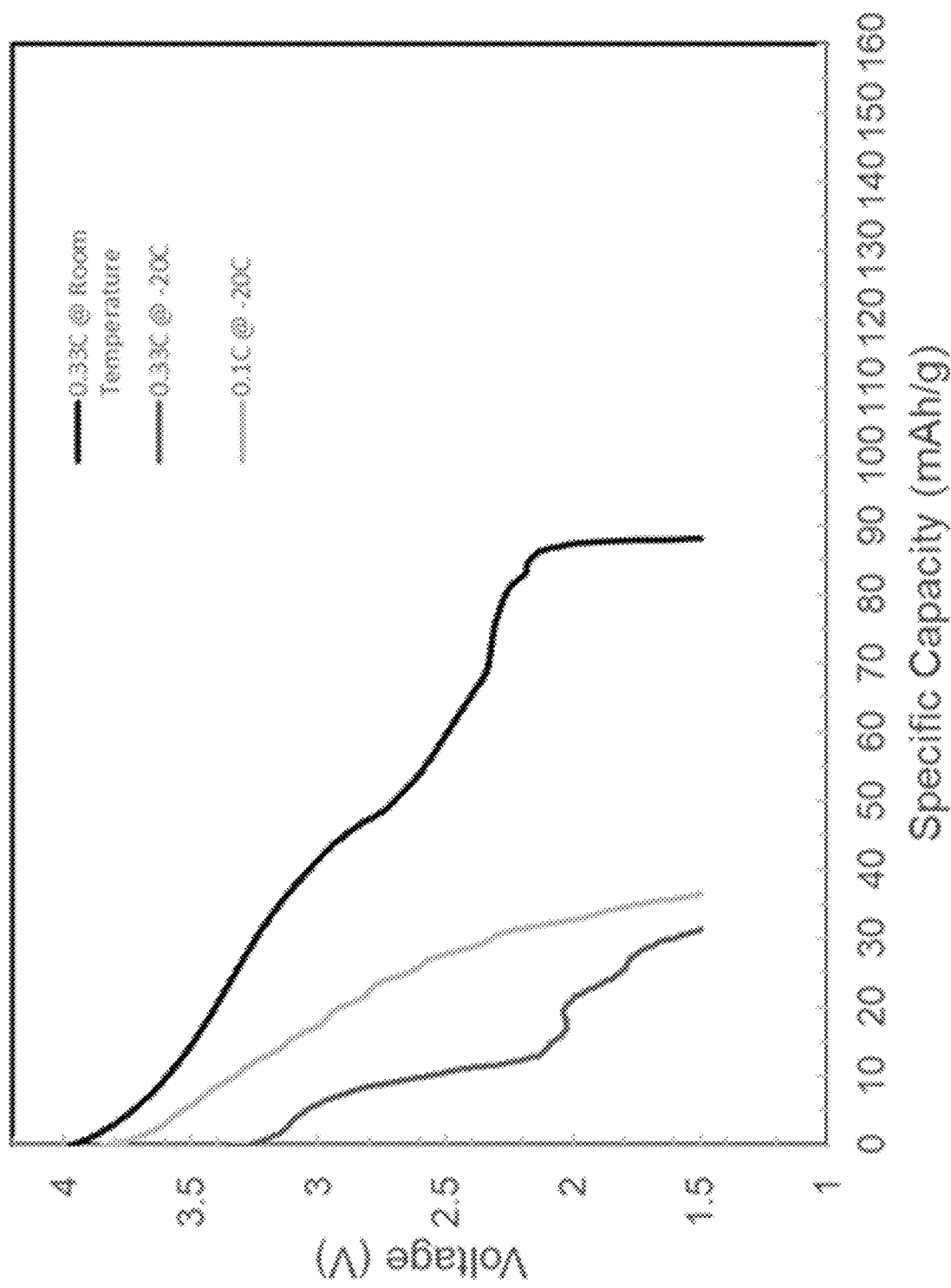
FIG. 5 shows voltage profile of the sodium ion battery full cell using the ether based organic electrolyte type A at room temperature and at −20° C. using a discharge rate of C/3 in some embodiments.

FIG. 5 shows voltage profile of the sodium ion battery full cell using the ether based organic electrolyte type A at room temperature and at −20° C. using a discharge rate of C/3. Showing some capacity utilization when temperature is reduced.

Figure 6:
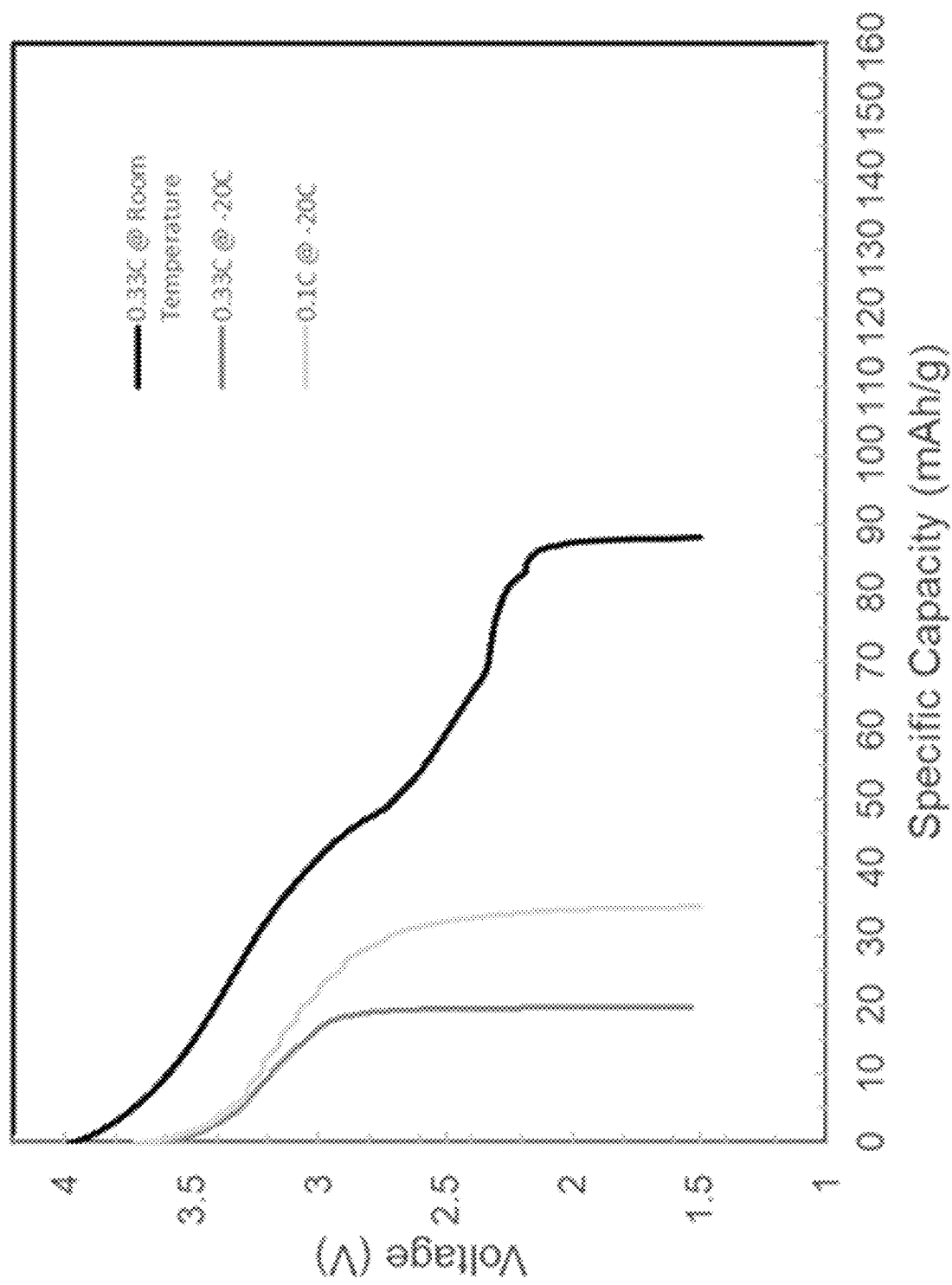
FIG. 6 shows voltage profile of the sodium ion battery full cell using the commercial carbonate-based electrolyte at room temperature and at −20° C. using a discharge rate of C/3 in some embodiments.

FIG. 6 shows voltage profile of the sodium ion battery full cell using the commercial carbonate-based electrolyte at room temperature and at −20° C. using a discharge rate of C/3 in some embodiments. FIG. 6 shows poorer capacity utilization when temperature is reduced.

Example 4—Stability and Reversibility

To demonstrate the stability and reversibility of the disclosed battery, an example battery was evaluated.

Figure 9:
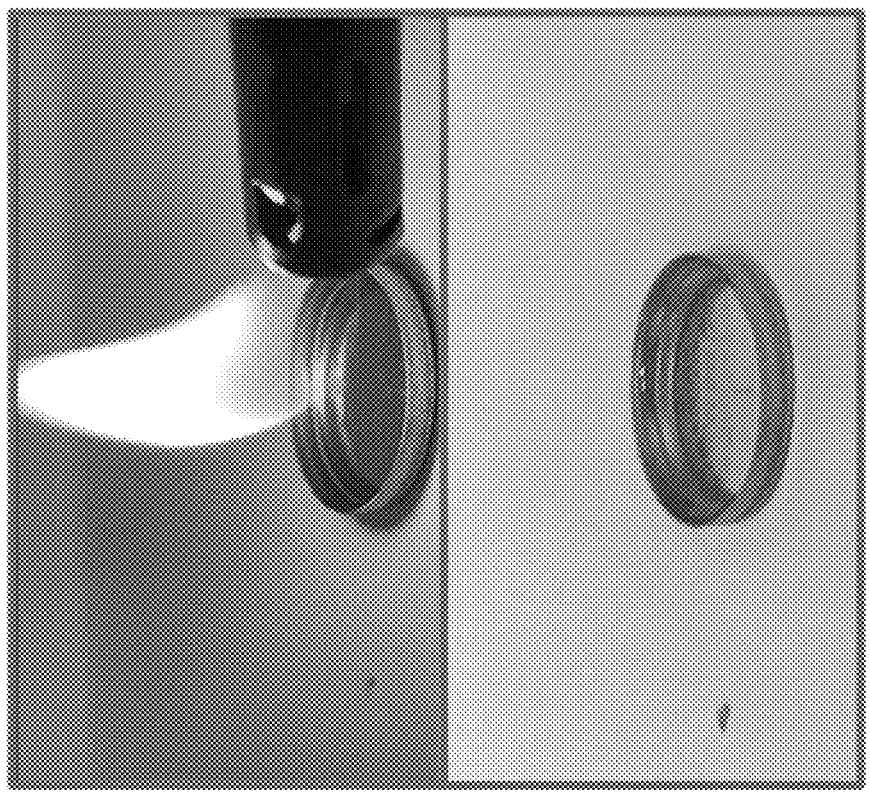
FIG. 9 shows the flammability tests of the ether based organic electrolyte type C vs the commercial carbonate-based electrolyte, where the electrolyte is subjected to an open flame in some embodiments.
Figure 9:
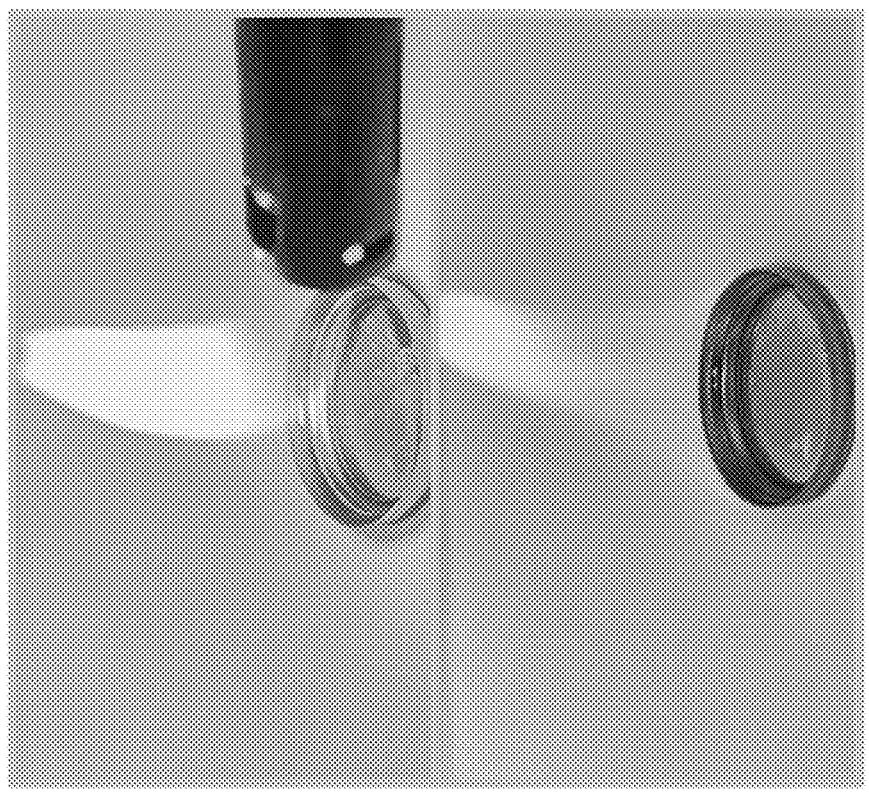

FIG. 9 shows the flammability tests of the ether based organic electrolyte type C vs the commercial carbonate-based electrolyte, where the electrolyte is subjected to an open flame in some embodiments, FIG. 9 shows that only the carbonate-based electrolyte combusts, while the ether electrolyte does not combust.

Figure 10:
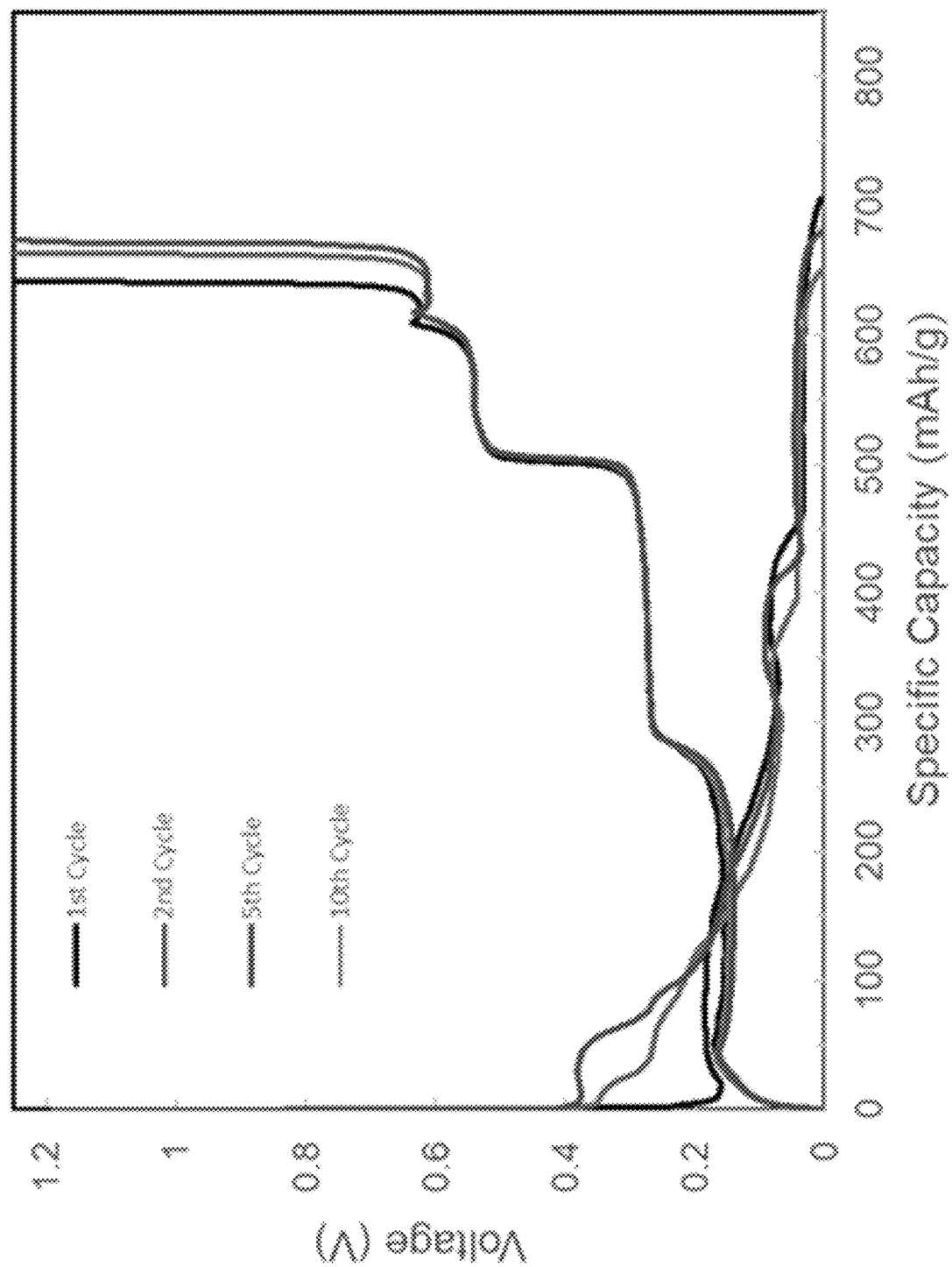
FIG. 10 shows the repeated tin (Sn) half-cell voltage curves using the ether based organic electrolyte type A, cycled at a rate of 0.1 C between 0.05 to 1.25V in some embodiments.

FIG. 10 shows the repeated tin (Sn) half-cell voltage curves using the ether based organic electrolyte type A, cycled at a rate of 0.1 C between 0.05 to 1.25V in some embodiments. FIG. 10 shows good stability and reversibility of this battery using this electrolyte.

Figure 11:
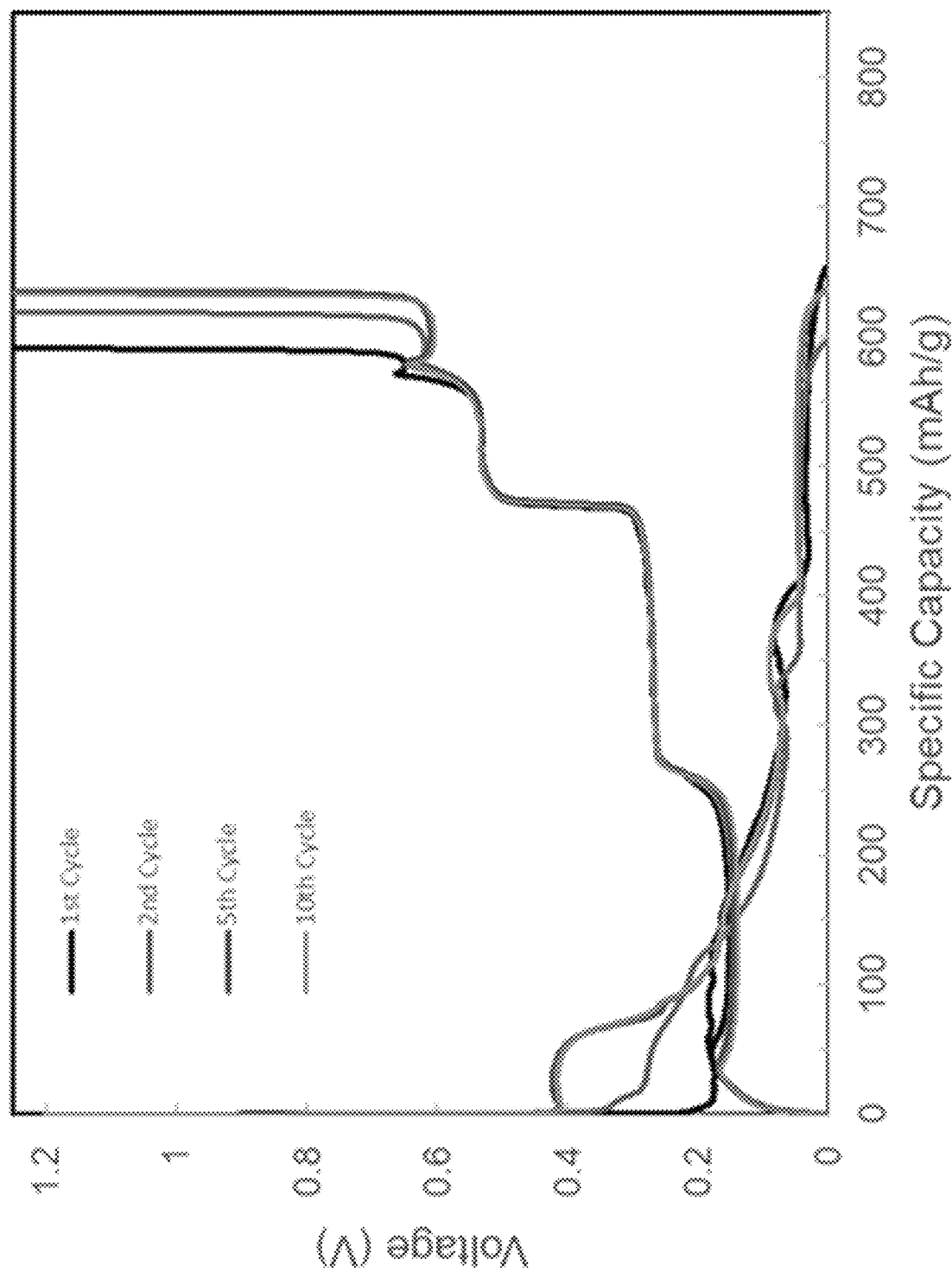
FIG. 11 shows the repeated tin (Sn) half-cell voltage curves using the ether based organic electrolyte type B, cycled at a rate of 0.1 C between 0.05 to 1.25V in some embodiments.

FIG. 11 shows the repeated tin (Sn) half-cell voltage curves using the ether based organic electrolyte type B, cycled at a rate of 0.1 C between 0.05 to 1.25V in some embodiments. FIG. 11 shows good stability and reversibility of this battery using this electrolyte.

Figure 12:
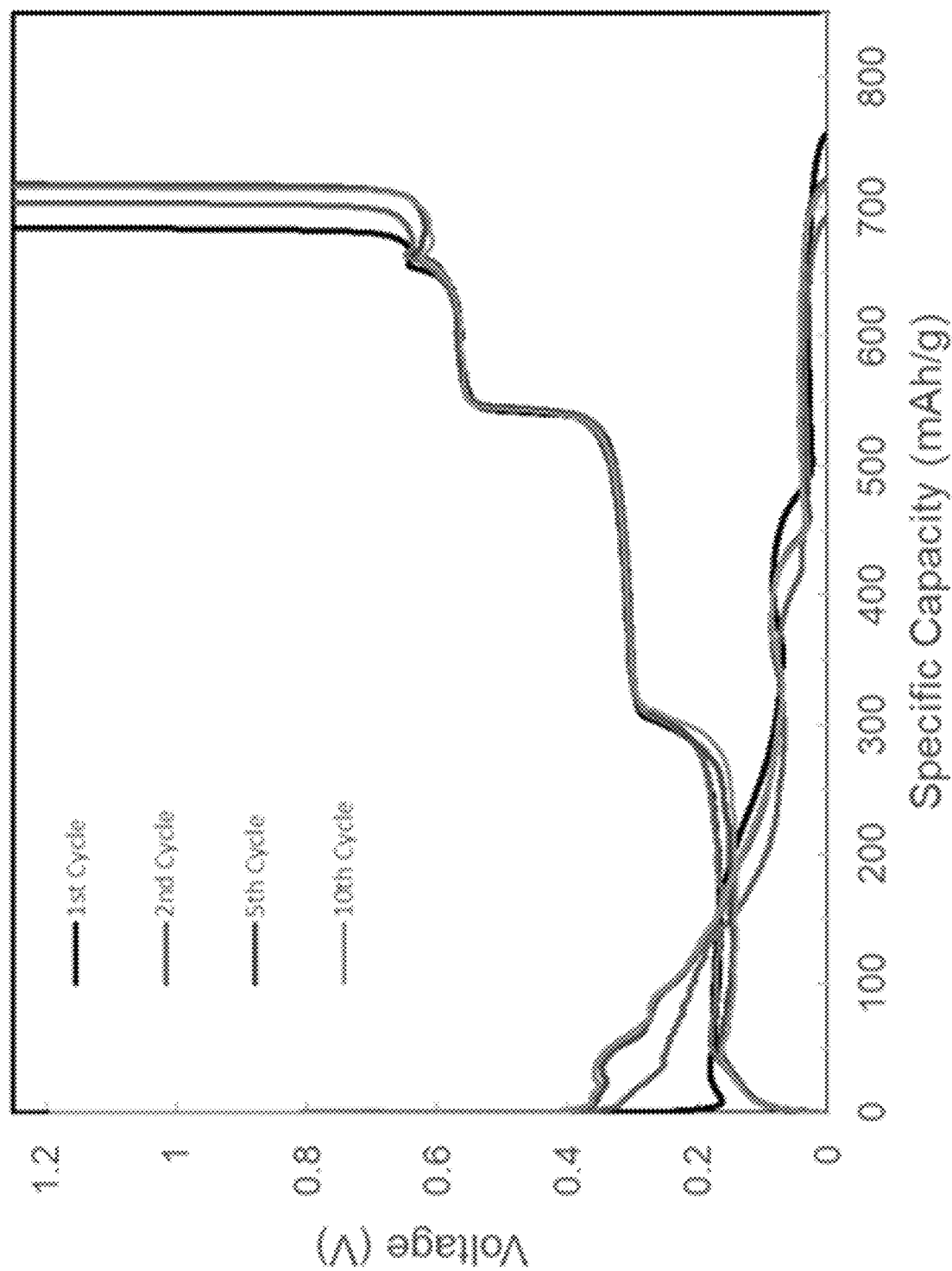
FIG. 12 shows the repeated tin (Sn) half-cell voltage curves using the ether based organic electrolyte type C, cycled at a rate of 0.1 C between 0.05 to 1.25V in some embodiments.

FIG. 12 shows the repeated tin (Sn) half-cell voltage curves using the ether based organic electrolyte type C, cycled at a rate of 0.1 C between 0.05 to 1.25V in some embodiments. FIG. 12 shows good stability and reversibility of this battery using this electrolyte.

Figure 13:
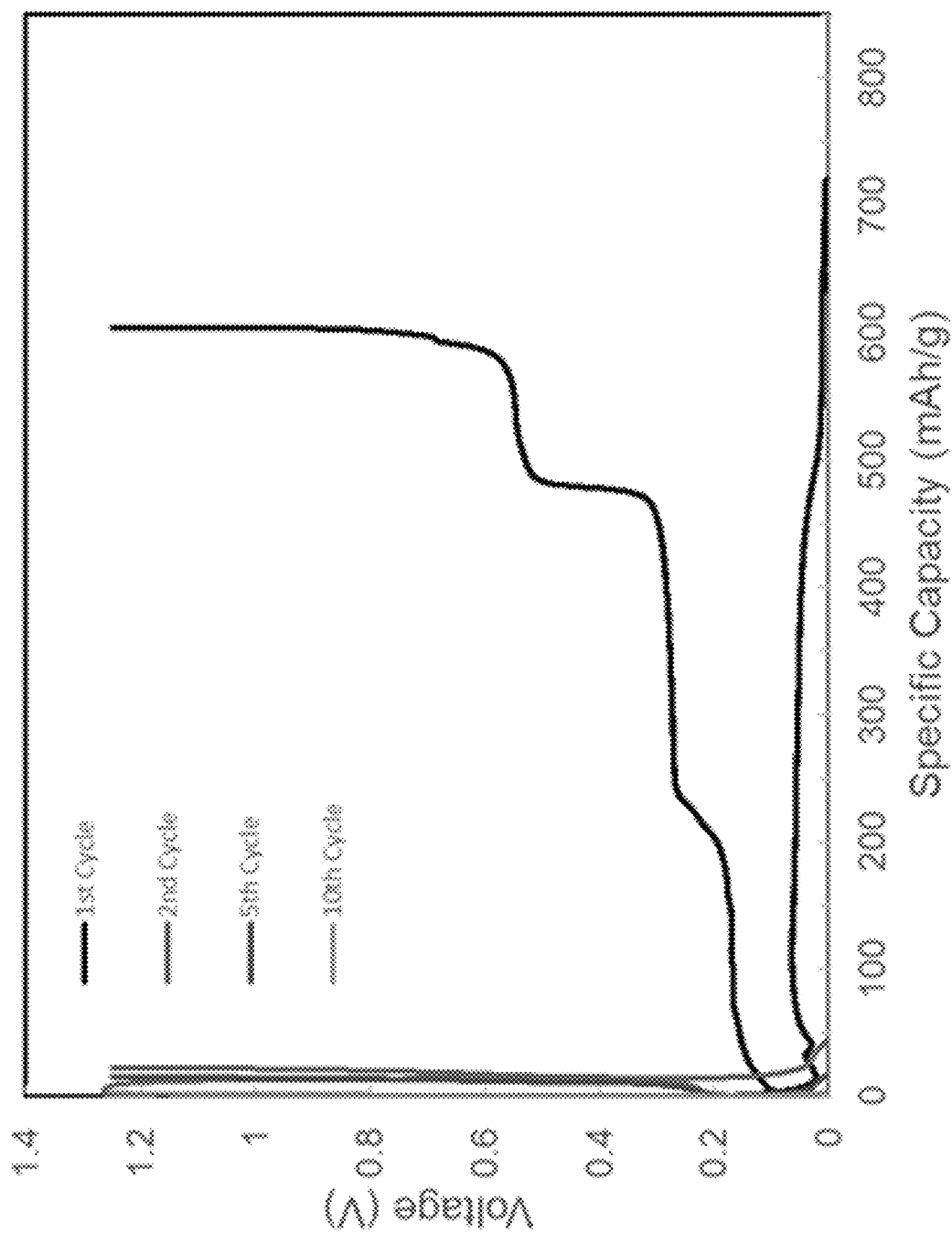
FIG. 13 shows the repeated tin (Sn) half-cell voltage curves using the commercial carbonate-based electrolyte, cycled at a rate of 0.1 C between 0.05 to 1.25V in some embodiments.

FIG. 13 shows the repeated tin (Sn) half-cell voltage curves using the commercial carbonate-based electrolyte, cycled at a rate of 0.1 C between 0.05 to 1.25V in some embodiments.

FIG. 13 shows poor stability and reversibility of this battery using this electrolyte.

Example 5—Cycling Performance

To demonstrate the cycling performance of the disclosed battery, an example battery was evaluated.

Figure 14A:
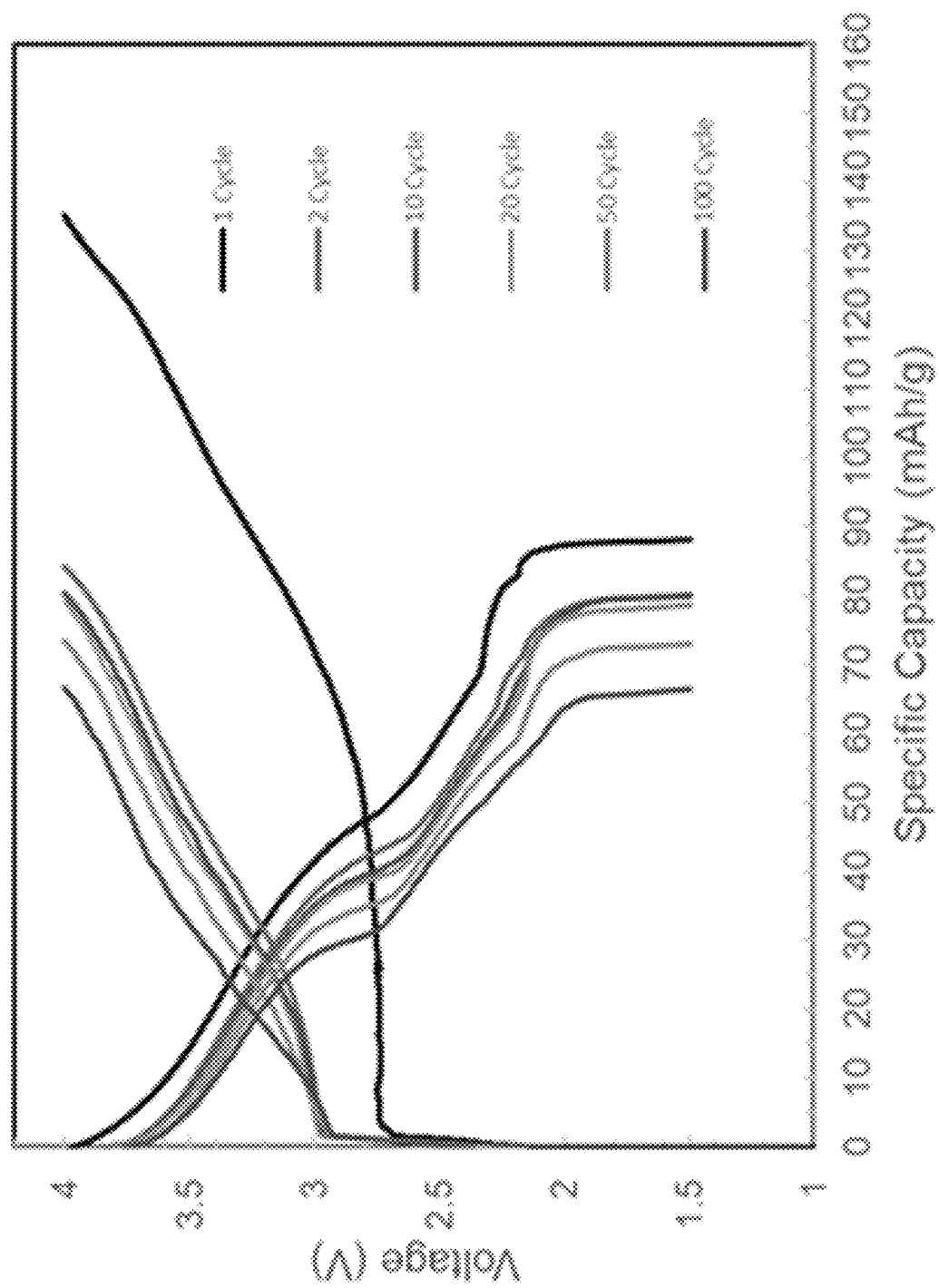
FIGS. 14A and 14B show the full cell voltage curve and first 100 cycles capacity retention of tin (Sn) full cell using the ether based organic electrolyte type A. The first cycle was operating at C/10, and subsequent cycles are operating at 1 C charge rate and C/3 discharge rate in some embodiments.
Figure 14B:
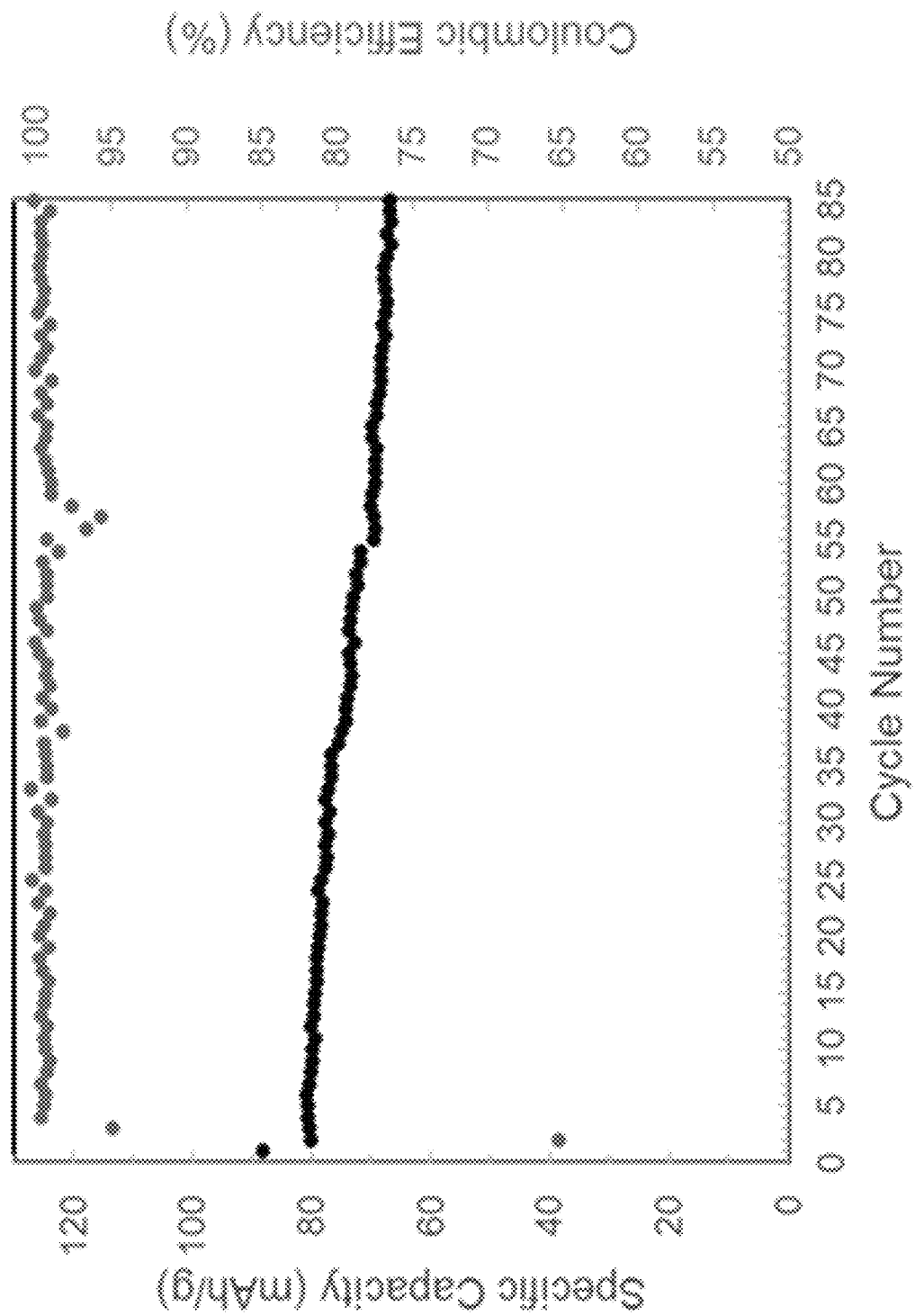

FIGS. 14A and 14B show the full cell voltage curve and first 100 cycles capacity retention of tin (Sn) full cell using the ether based organic electrolyte type A. The first cycle was operating at C/10, and subsequent cycles are operating at 1 C charge rate and C/3 discharge rate in some embodiments. FIGS. 14A and 14B show that the ether-based electrolyte paired with tin (Sn) anode used in this invention does not undergo cell degradation typically seen when commercial carbonate-based electrolytes are used.

Figure 15A:
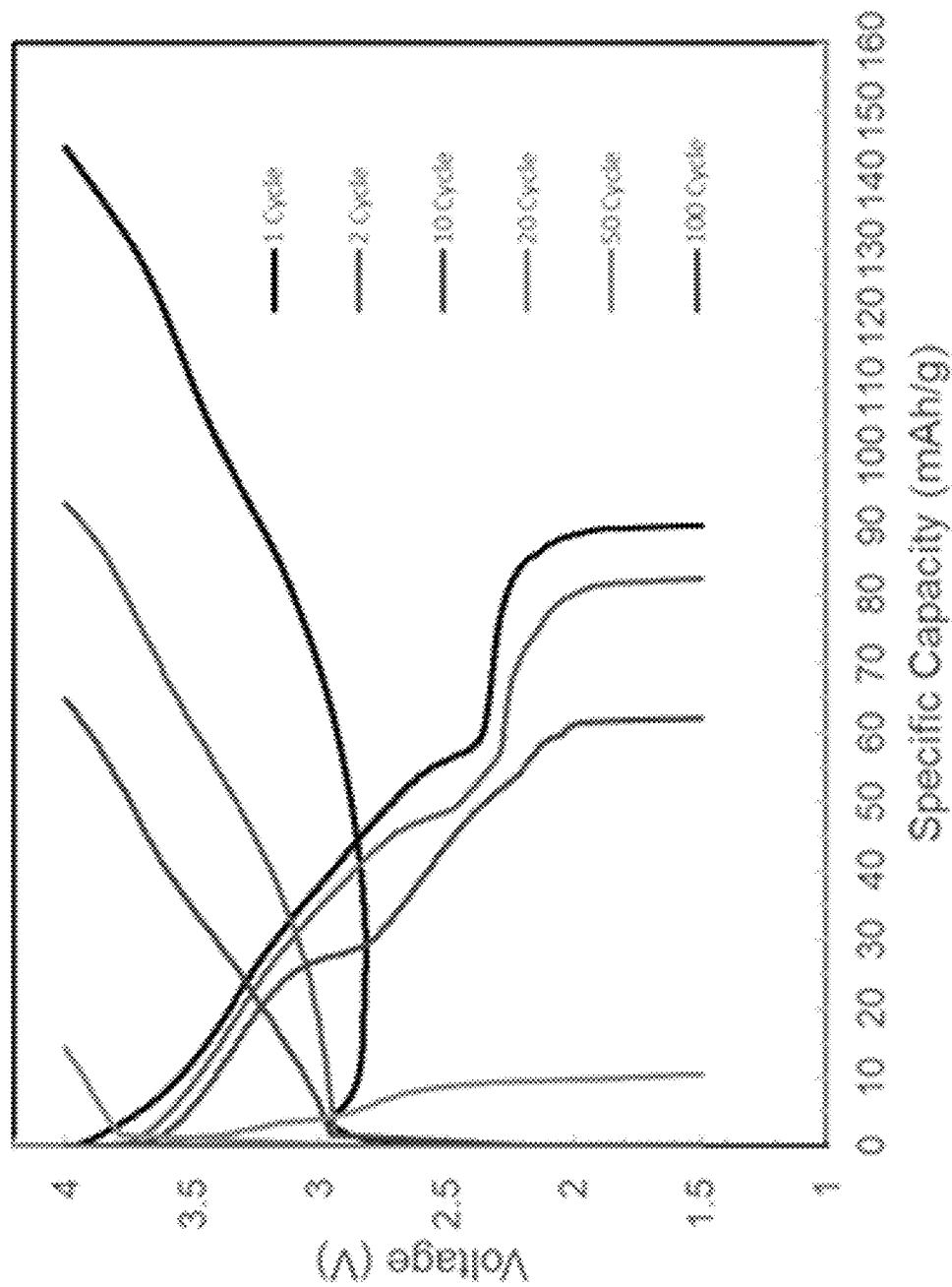
FIGS. 15A and 15B shows the full cell voltage curve and first 100 cycles capacity retention of tin (Sn) full cell using the commercial carbonate-based electrolyte in some embodiments.
Figure 15B:
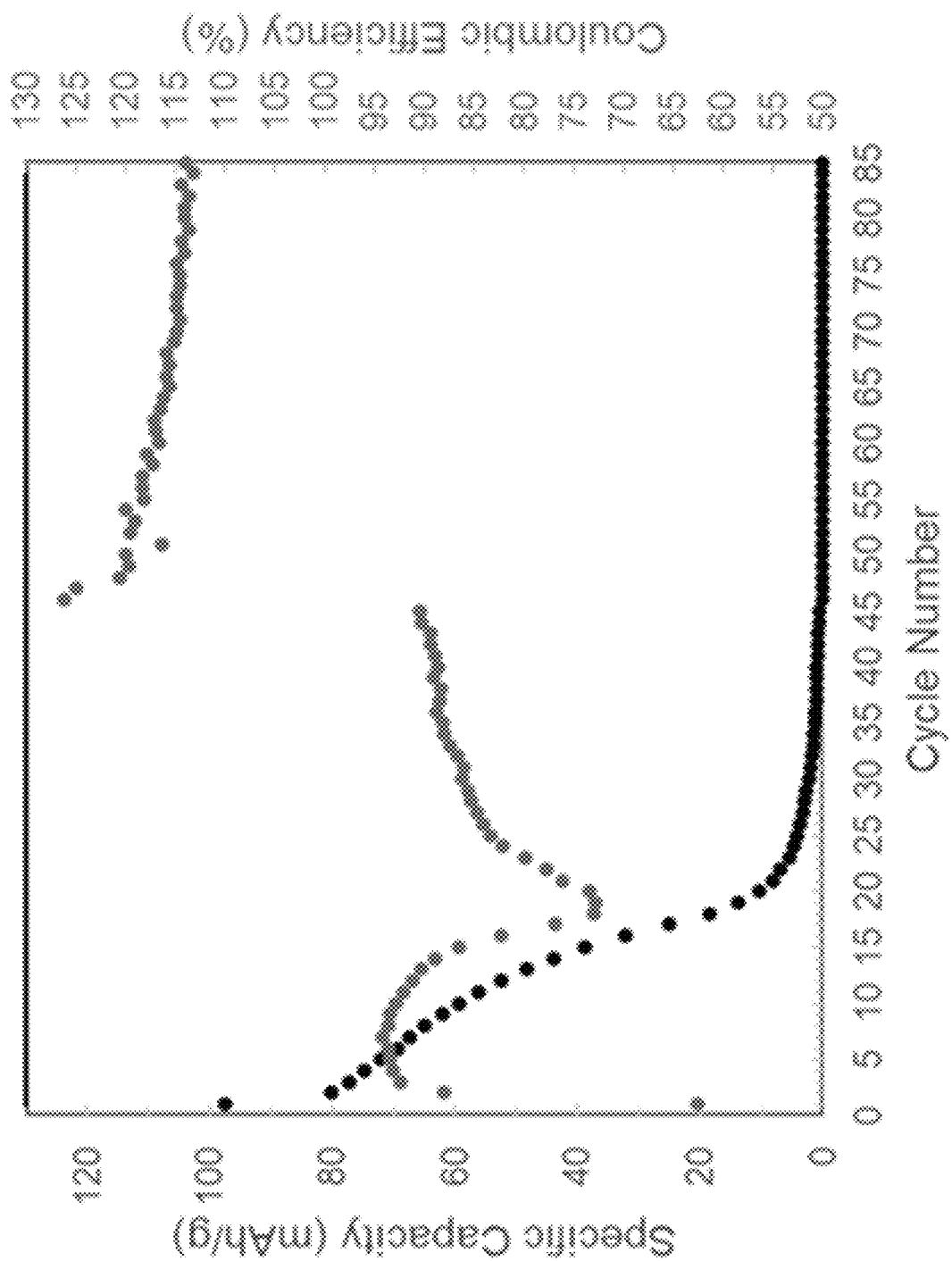

FIGS. 15A and 15B show the full cell voltage curve and first 100 cycles capacity retention of tin (Sn) full cell using the commercial carbonate-based electrolyte in some embodiments. The first cycle was operating at C/10, and subsequent cycles are operating at 1 C charge rate and C/3 discharge rate. FIGS. 15A and 15B show that the commercial carbonate-based electrolytes paired with tin (Sn) anode causes cell degradation.

Of note, the exemplar embodiments of the disclosure described herein do not limit the scope of the invention since these embodiments are merely examples of the embodiments of the invention. Any equivalent embodiments are intended to be within the scope of this invention. Indeed, various modifications of the disclosure, in addition to those shown and described herein, such as alternative useful combinations of the elements described, may become apparent to those skilled in the art from the description. Such modifications and embodiments are also intended to fall within the scope of the appended claims.

What is claimed is:

1. A sodium secondary battery comprising a negative electrode, a positive electrode and an electrolyte including a sodium salt and an ether compound having a chemical structure of R1-O—R2, wherein each of R1 and R2 is independently an alkyl group or an aryl group,
   wherein the negative electrode includes a plurality of tin (Sn) particles,
   wherein the plurality of Sn particles has an average particle size equal to or larger than 1.3 μm and up to 200 μm,
   wherein the electrolyte exhibits an ionic conductivity of from 1 mS cm$^{-1}$ to 10$^2$ mS cm$^{-1}$ at room temperature,
   wherein the sodium secondary battery has an N/P ratio of 0.1 to 30.0.

2. The sodium secondary battery according to claim 1, wherein the electrolyte exhibits an ionic conductivity of from 1 mS cm$^{-1}$ to 10 mS cm$^{-1}$ at room temperature.

3. The sodium secondary battery according to claim 1, wherein the electrolyte exhibits an ionic conductivity of from 2 mS cm$^{-1}$ to 10 mS cm$^{-1}$ at room temperature.

4. The sodium secondary battery according to claim 1, wherein the electrolyte exhibits an ionic conductivity of from 1 mS cm$^{-1}$ to 8 mS cm$^{-1}$ at room temperature.

5. The sodium secondary battery according to claim 1, wherein the electrolyte exhibits an ionic conductivity of from 1 mS cm$^{-1}$ to 7 mS cm$^{-1}$ at room temperature.

6. The sodium secondary battery according to claim 1, wherein the electrolyte exhibits an ionic conductivity of from 1 mS cm$^{-1}$ to 6 mS cm$^{-1}$ at room temperature.

7. The sodium secondary battery according to claim 1, wherein the electrolyte exhibits an ionic conductivity of from 1 mS cm$^{-1}$ to 5 mS cm$^{-1}$ at room temperature.

8. The sodium secondary battery of claim 1, wherein the plurality of Sn particles has an average particle diameter of from 2 μm to 100 μm.

9. The sodium secondary battery of claim 1, wherein the electrolyte is a liquid electrolyte.

10. The sodium secondary battery according to claim 1, wherein the ether compound is selected from the group consisting of Dimethoxyethane (glyme), Diethylene glycol dimethyl ether (diglyme), Triethylene glycol dimethyl ether (triglyme), Ethylene glycol diethyl ether, Ethyl ether, Propyl ether, Butyl ether, Diphenyl ether, Dimethyl ether, Diisopropyl ether, Dibenzyl ether, Isoamyl ether, Diethylene glycol diethyl ether, Dipropylene Glycol Monoethyl Ether, Diethylene glycol dibutyl ether, Diethylene glycol methyl ethyl ether, Tetrahydrofuran, 2-Methyltetrahydrofuran, 3-Methyltetrahydrofuran, Oxacyclohexane, Oxacyclopropane, 1,3-Dioxolane, 1,4 Dioxane, Trioxane, or mixtures thereof.

11. The sodium secondary battery according to claim 1, wherein the ether compound is free of C=O, sulfur, benzene ring, phosphates, C=C, C≡C, and halogen.

12. The sodium secondary battery according to claim 1, wherein the sodium salt comprises NaPF$_6$, NaBF$_4$, NaClO$_4$, NaCF$_3$SO$_3$, sodium closo-borate salt, Sodium bis-(fluorosulfonyl)imide (NaFSI), Sodium trifluoro-methane-sulfonimide (NaTFSI), Sodium Bis(oxalato)borate (NaBOB), Sodium-difluoro(oxalato)borate (NaDFOB), or a combination thereof.

13. The sodium secondary battery according to claim 12, wherein the sodium closo-borate salt comprises NaCB$_9$H$_{10}$, NaCB$_{11}$H$_{12}$, Na$_2$B$_{12}$H$_{12}$, Na$_2$B$_{10}$H$_{10}$, Na[7-CB$_{10}$H$_{13}$], Na[7,8-C$_2$B$_9$H$_{12}$], Na[7,9-C$_2$B$_9$H$_{12}$], or a combination thereof.

14. The sodium secondary battery according to claim 1, wherein a total dissolved salt concentration in the electrolyte with respect to a total amount of solvents used in the electrolyte is from 0.01 M to 10.0 M.

15. The sodium secondary battery according to claim 1, wherein the electrolyte exhibits an oxidative electrochemical stability window of more than 3.0 V vs Na/Na$^+$, based on an onset of an oxidative peak in a linear sweep voltammetry.

16. The sodium secondary battery according to claim 1, wherein the electrolyte exhibits an oxidative electrochemical stability window of more than 4.7 V vs Na/Na$^+$, based on an onset of an oxidative peak in a linear sweep voltammetry.

17. The sodium secondary battery according to claim 1, wherein the electrolyte exhibits a reductive electrochemical stability window of less than 2.5 V vs Na/Na$^+$, based on an onset of a reductive peak in a linear sweep voltammetry.

18. The sodium secondary battery according to claim 1, wherein the electrolyte exhibits a reductive electrochemical stability window of less than 0.5 V vs Na/Na$^+$, based on an onset of a reductive peak in a linear sweep voltammetry.

19. The sodium secondary battery of claim 1, wherein the battery has a Coulombic efficiency of at least 60% for the first 80 cycles.

20. The sodium secondary battery of claim 1, wherein the battery has a Coulombic efficiency of at least 90% for the first 30 cycles.

* * * * *